US009734550B1

(12) United States Patent
Archambault et al.

(10) Patent No.: US 9,734,550 B1
(45) Date of Patent: Aug. 15, 2017

(54) METHODS AND APPARATUS FOR EFFICIENTLY DETERMINING RUN LENGTHS AND IDENTIFYING PATTERNS

(71) Applicant: ACCUSOFT CORPORATION, Tampa, FL (US)

(72) Inventors: Michael Archambault, Tampa, FL (US); John Reynolds, Tampa, FL (US)

( * ) Notice: Subject to any disclaimer, the term of this patent is extended or adjusted under 35 U.S.C. 154(b) by 19 days.

(21) Appl. No.: 14/711,678

(22) Filed: May 13, 2015

(51) Int. Cl.
*G09G 5/36* (2006.01)
*G06T 1/60* (2006.01)
*G06T 7/00* (2017.01)

(52) U.S. Cl.
CPC .............. *G06T 1/60* (2013.01); *G06T 7/0002* (2013.01); *G06T 2207/10004* (2013.01)

(58) Field of Classification Search
CPC ...... H04N 19/43; H04N 19/182; H04N 19/93; G06T 2207/10016; G06T 7/2013; G09G 2320/103
See application file for complete search history.

(56) References Cited

U.S. PATENT DOCUMENTS 6,212,303 B1 * 4/2001 Doran .................. H04N 1/403
358/426.16

* cited by examiner

*Primary Examiner* — Hau Nguyen
(74) *Attorney, Agent, or Firm* — Michael P. Straub; Stephen T. Straub; Ronald P. Straub

(57) ABSTRACT

Methods and apparatus for efficiently computing vertical run length values corresponding to an image and/or identifying image patterns, e.g., bar codes and QR codes, where binary image data is stored sequentially in memory, e.g., according to a horizontal row by row basis, are described. A set of detected pixel value change location information is initialized for each column of the image and is updated as processing occurs, e.g., recording row numbers in which a pixel value change was detected between the current row and the previous row. Scanning horizontally across each row, the bitmap is processed in a horizontal fashion, the same way bitmap pixels are laid out in memory. In accordance with a feature of various embodiments of the current invention, the order of bitmap accesses is such that the spatial locality of the code is vastly improved, and the cache performance increases in comparison to a traditional approach.

15 Claims, 43 Drawing Sheets

METHODS AND APPARATUS FOR EFFICIENTLY DETERMINING RUN LENGTHS AND IDENTIFYING PATTERNS

FIELD

Various embodiments relate to image processing, and more particularly to efficiently determining run length values, e.g., vertical run length values, in an image.

BACKGROUND

Image pattern recognition is used in a variety of application such as identifying bar codes and/or other image based codes such as QR codes. One feature of such codes is that they often comprise a pattern of black or white portions. The pattern results in a black or white image portion extending in a direction some length before it changes, e.g., to the opposite value in the case of binary image values.

How long a black or white portion of an image continues can be used in determining the pattern to which an image corresponds. An efficient way of representing how long of a sequence occurs in which an image pixel remains the same is by representing the information as a run length, e.g., for a given pixel value the run length indicates how long, in terms of the number of pixel locations, the pixel value remains unchanged.

In processing images representing bar codes, QR codes and/or other binary patterns for pattern recognition purposes it may be desirable to compute vertical pixel value run lengths for the full set of pixel values in an image.

In a naïve approach to calculate vertical run lengths in a binary image, pixels are compared vertically against one another for a first individual vertical column in the image until the comparisons for the first individual column are completed. Then, pixels are compared vertically against one another for a next individual vertical column in the image until the comparisons for the next individual column are completed. The process is repeated until each of the columns of the image have been processed to obtain vertical run lengths for the image.

This approach results in vertical run lengths for a first column being computed before the vertical run lengths for the next column are computed. While this approach can be effective in ultimately computing vertical run lengths, it has several technical disadvantages associated with the memory access process and may result in a large amount of data being moved in and out of cache memory as the vertical run lengths are computed given that binary bitmaps of pixel values are normally stored horizontally in memory and the cache memory is often unable to store all the row and columns of image data in the cache memory at once. Given the horizontal storage of pixel values, data corresponding to a row of pixels can normally be read out using sequential reads by sequentially incrementing the read address used to control readout of data from memory. In the case of reading out of data corresponding to different rows of a column the data is often spaced further apart in memory than the data corresponding to a row of pixel values. In fact, the data corresponding to the last row of pixel values may not fit in a cache memory with the data corresponding to the first row of pixel values of an image when row data is stored in sequential memory location as is normally the case.

This approach can result in long processing delays in determining vertical run lengths as rows of pixel values are moved in and out of cache memory to allow for computation of the vertical run lengths corresponding to the first row before proceeding to computing vertical run lengths for the next row of pixel values.

In image processing devices with relatively small caches, e.g., low cost handheld devices, the cache memory may exhibit thrashing as the memory location accesses, performed in the vertical run length determinations, jump by large steps for each iteration potentially requiring image data to be moved in and out of cache memory.

Based on the above discussion, there is a need for new methods and apparatus for efficiently determining vertical run lengths of pixel values. It would be desirable if the new methods and/or apparatus were well suited for devices with limited caches, e.g., handheld devices, which may not be able to fit the entire contents of an image of a code upon which pattern recognition is to be formed in the cache at the same time.

BRIEF DESCRIPTION OF THE FIGURES

FIG. 1 comprises the combination of FIG. 1A, FIG. 1B, FIG. 1C, FIG. 1D, FIG. 1E, and FIG. 1F.

FIG. 5 illustrates an image representation in computer memory corresponding to the example image of FIG. 4.

Figure 7:
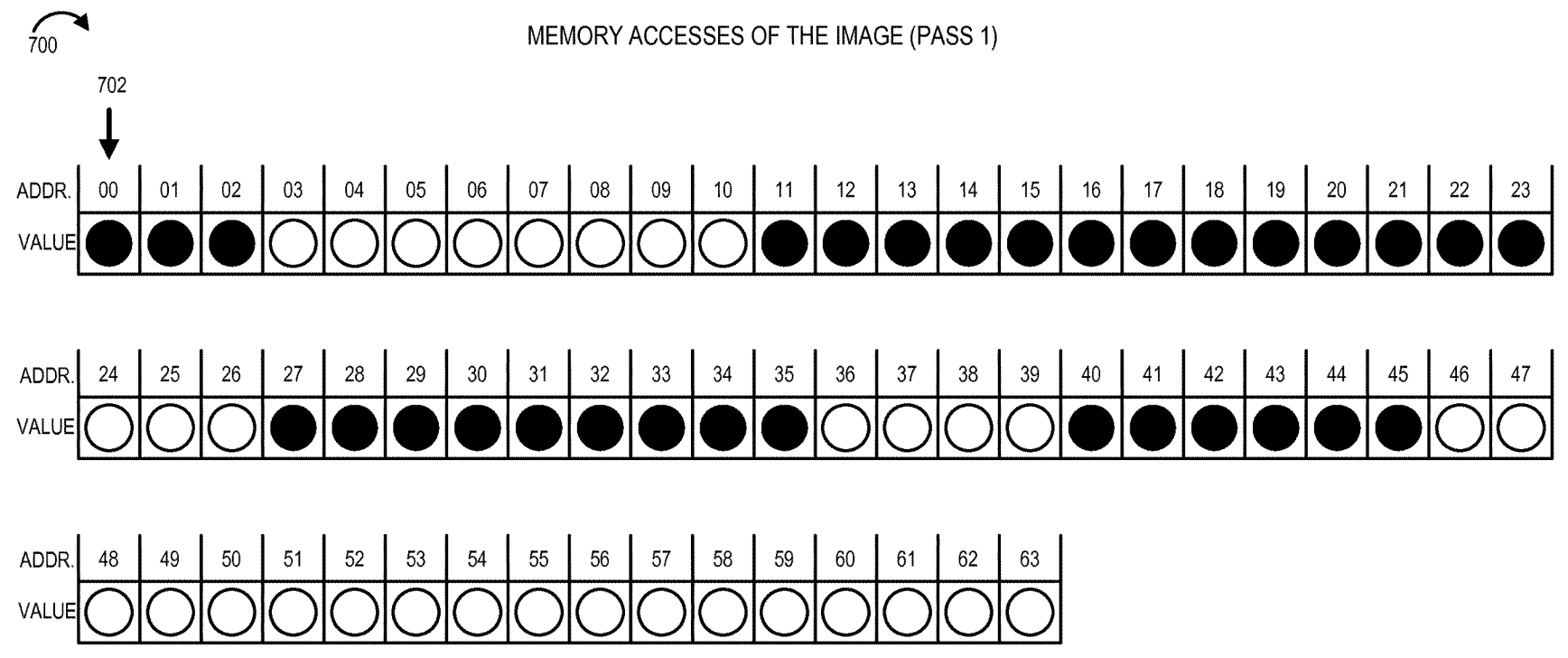

FIG. 7 is a drawing which identifies memory accesses of the exemplary image, corresponding to FIG. 5, for pass 1 using the novel approach.

Figure 8:
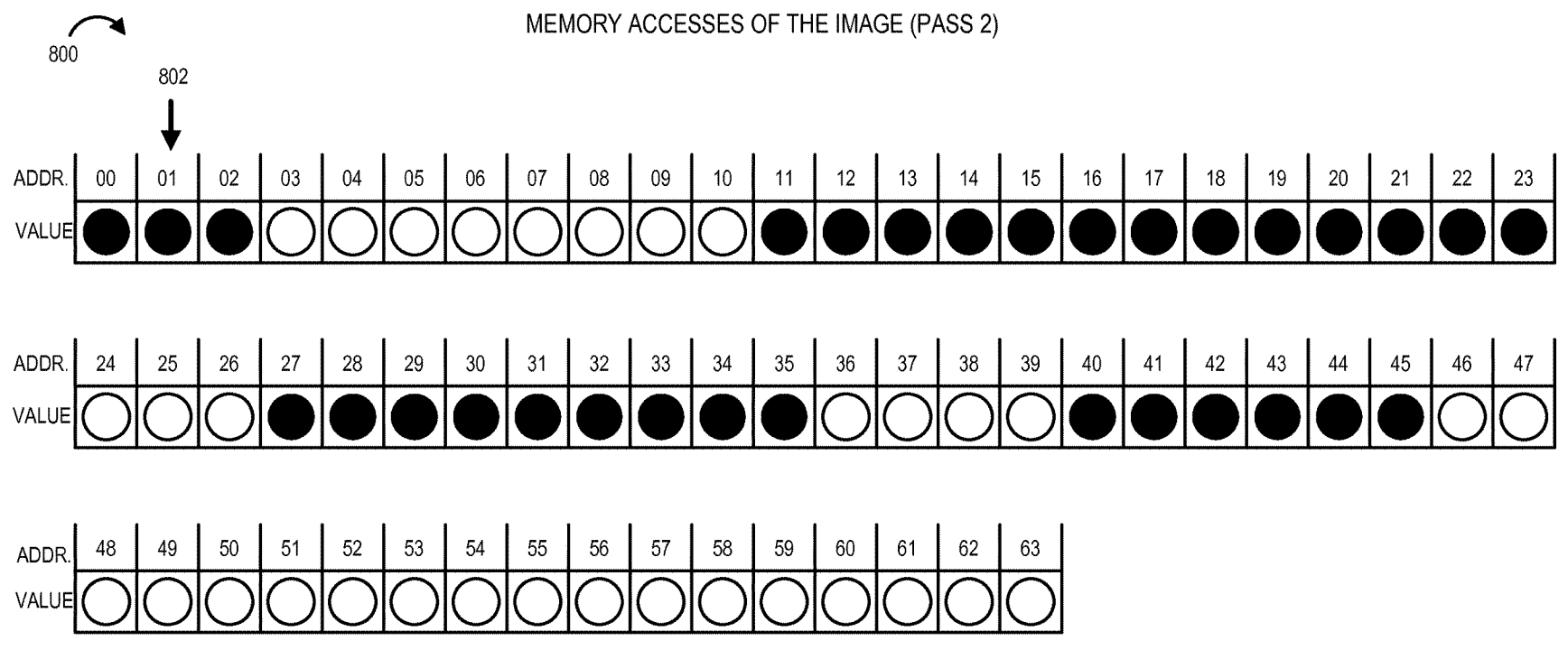

FIG. 8 is a drawing which identifies memory accesses of the exemplary image, corresponding to FIG. 5, for pass 2 using the novel approach.

Figure 9:
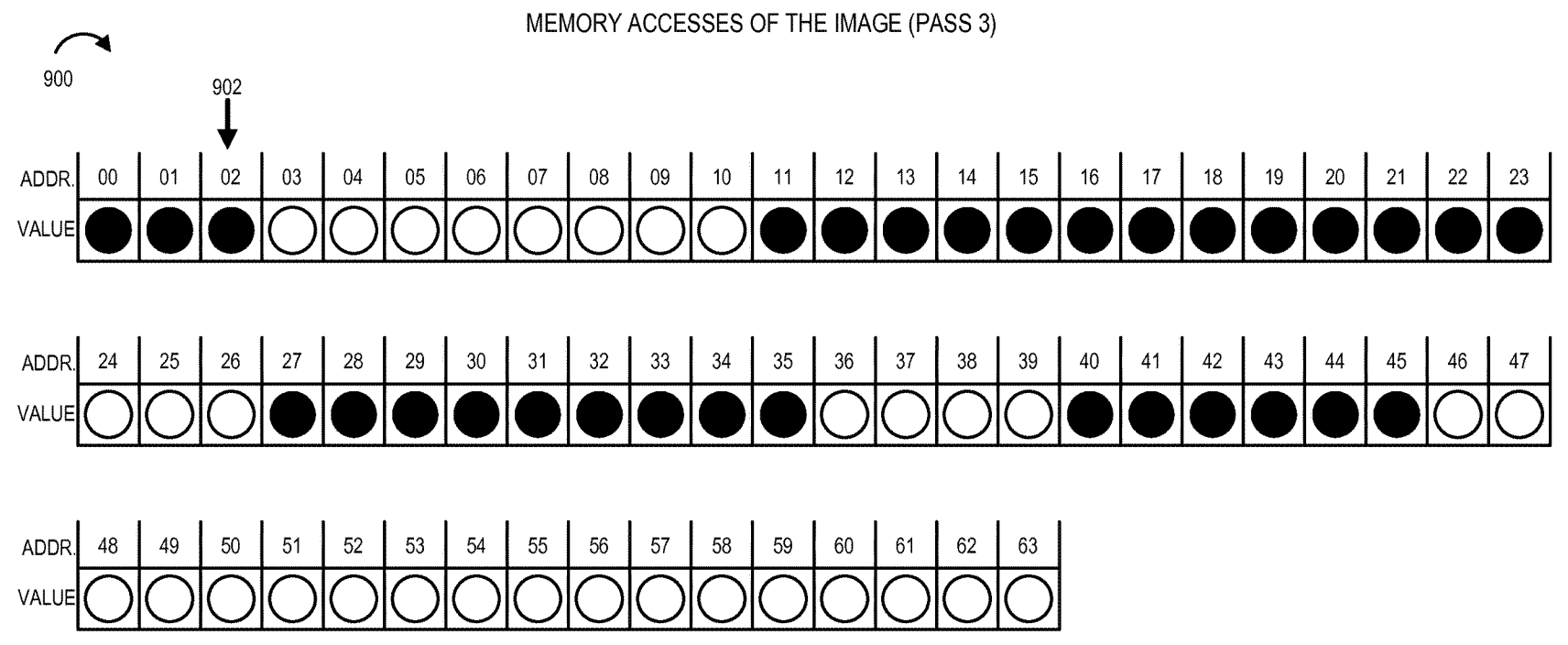

FIG. 9 is a drawing which identifies memory accesses of the exemplary image, corresponding to FIG. 5, for pass 3 using the novel approach.

Figure 11:
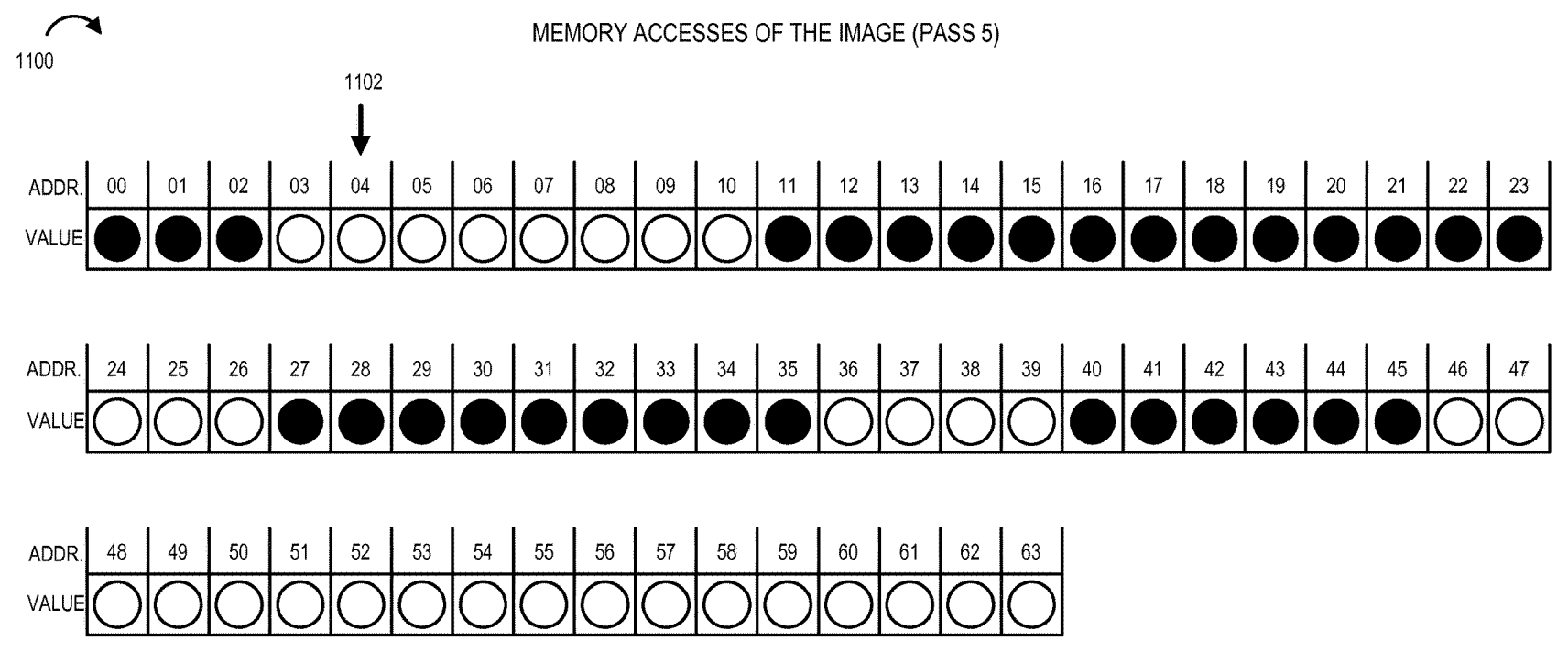

FIG. 11 is a drawing which identifies memory accesses of the exemplary image, corresponding to FIG. 5, for pass 5 using the novel approach.

Figure 12:
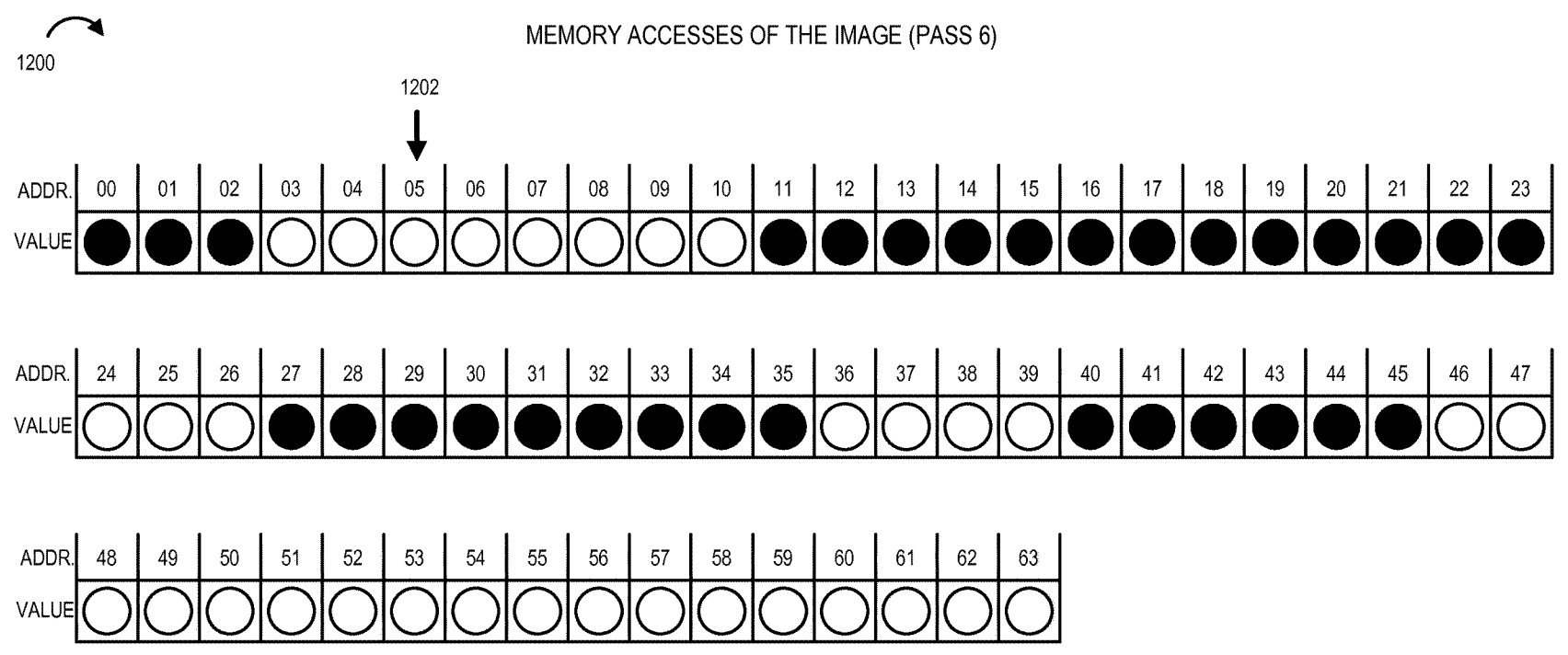

FIG. 12 is a drawing which identifies memory accesses of the exemplary image, corresponding to FIG. 5, for pass 6 using the novel approach.

Figure 16:
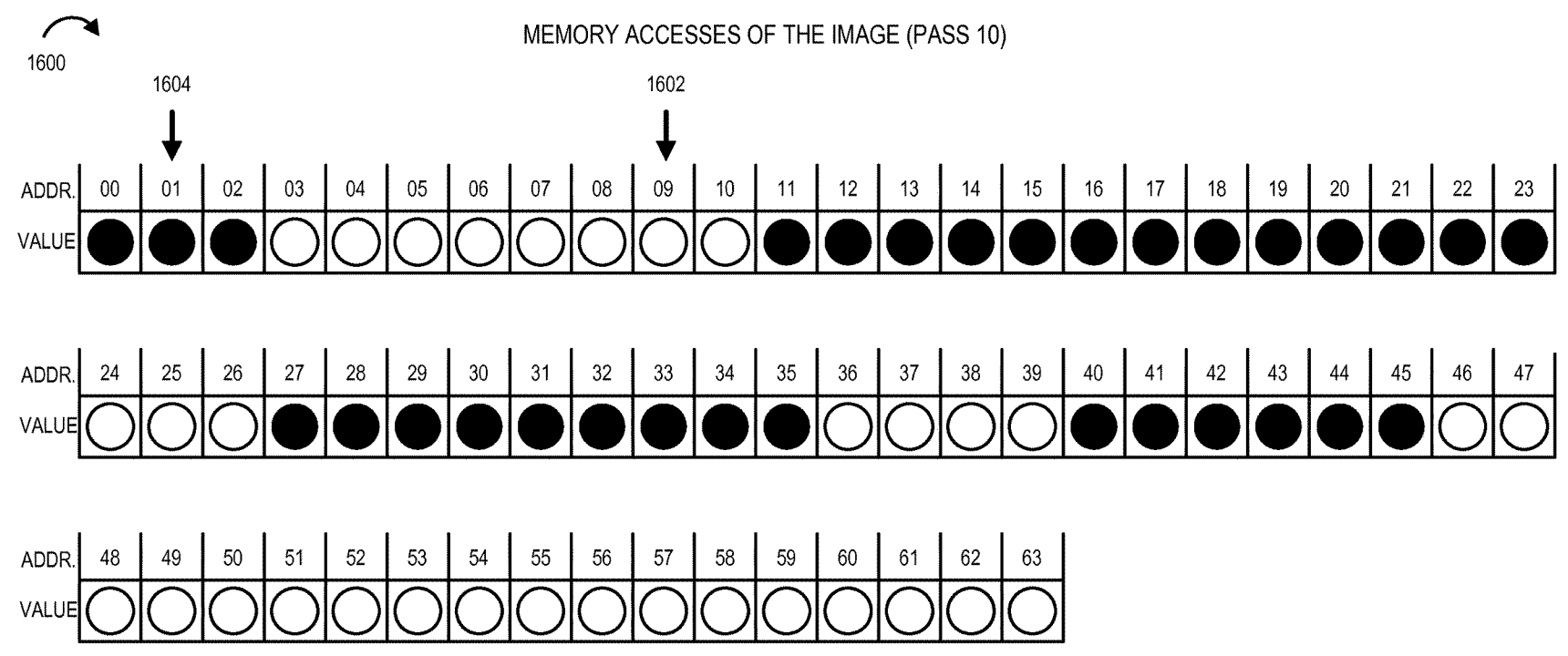

FIG. 16 is a drawing which identifies memory accesses of the exemplary image, corresponding to FIG. 5, for pass 10 using the novel approach.

SUMMARY

Figure 1A:
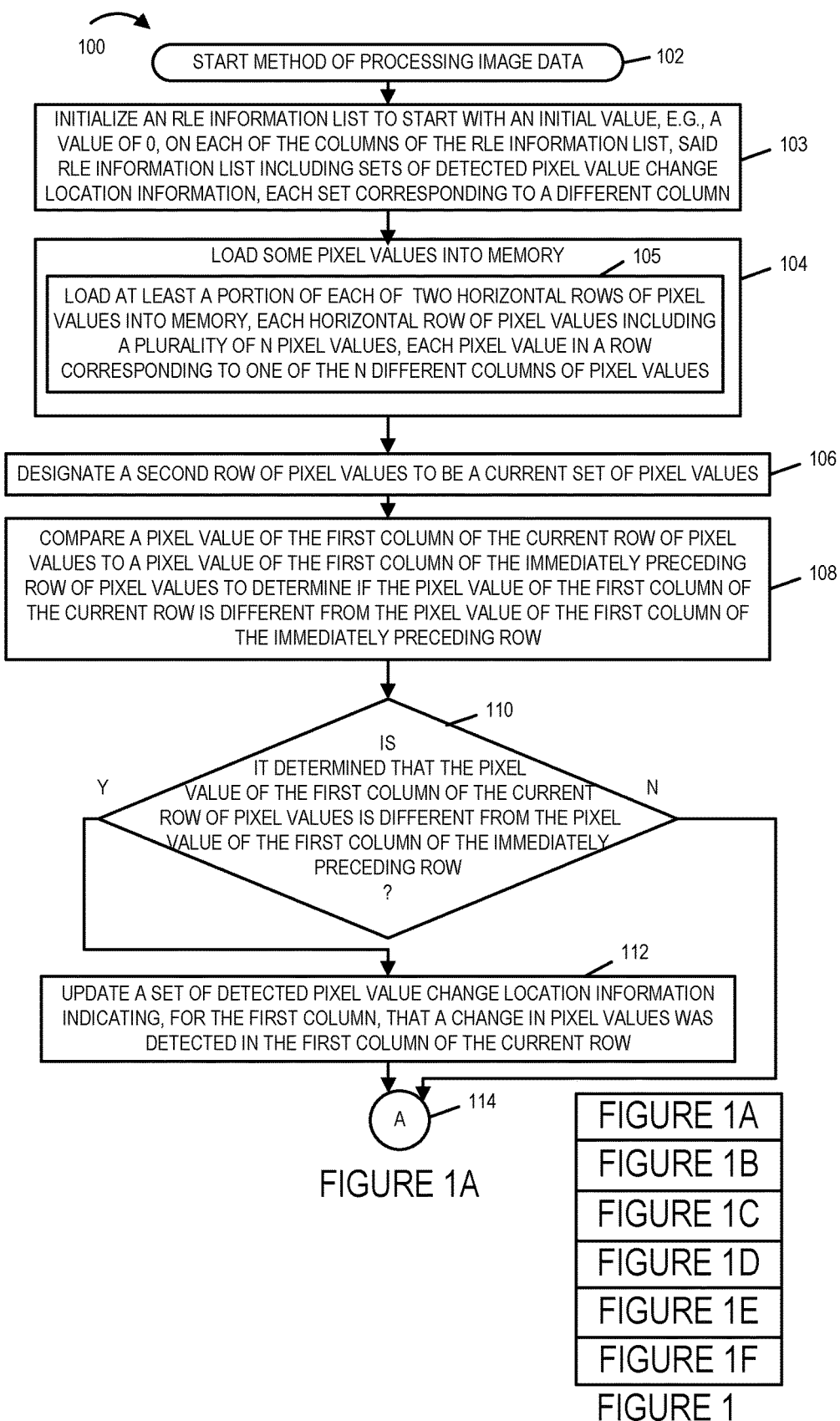
FIG. 1A is a first part of a flowchart of an exemplary method of processing image data in accordance with an exemplary embodiment.
Figure 1B:
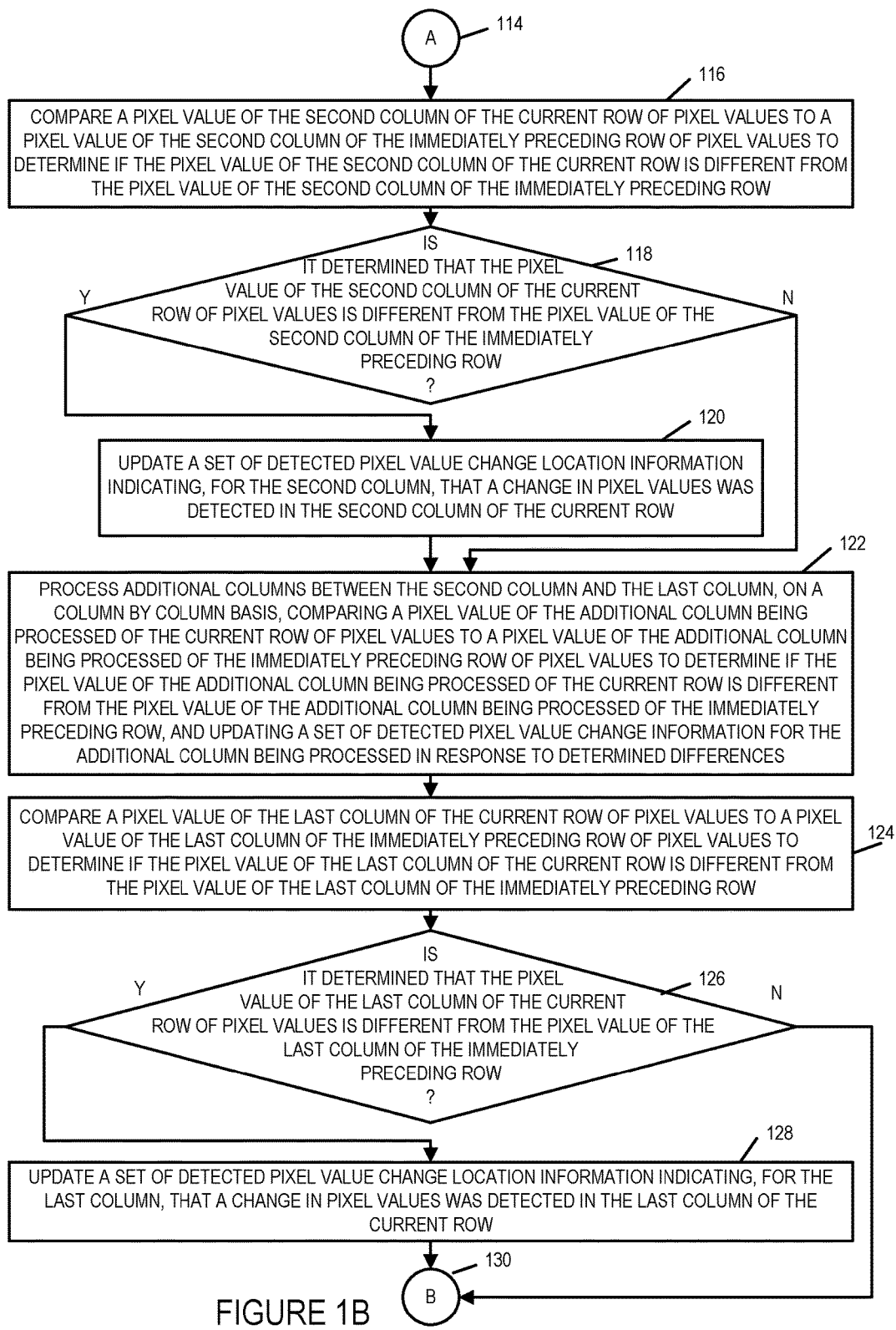
FIG. 1B is a second part of a flowchart of an exemplary method of processing image data in accordance with an exemplary embodiment.
Figure 1C:
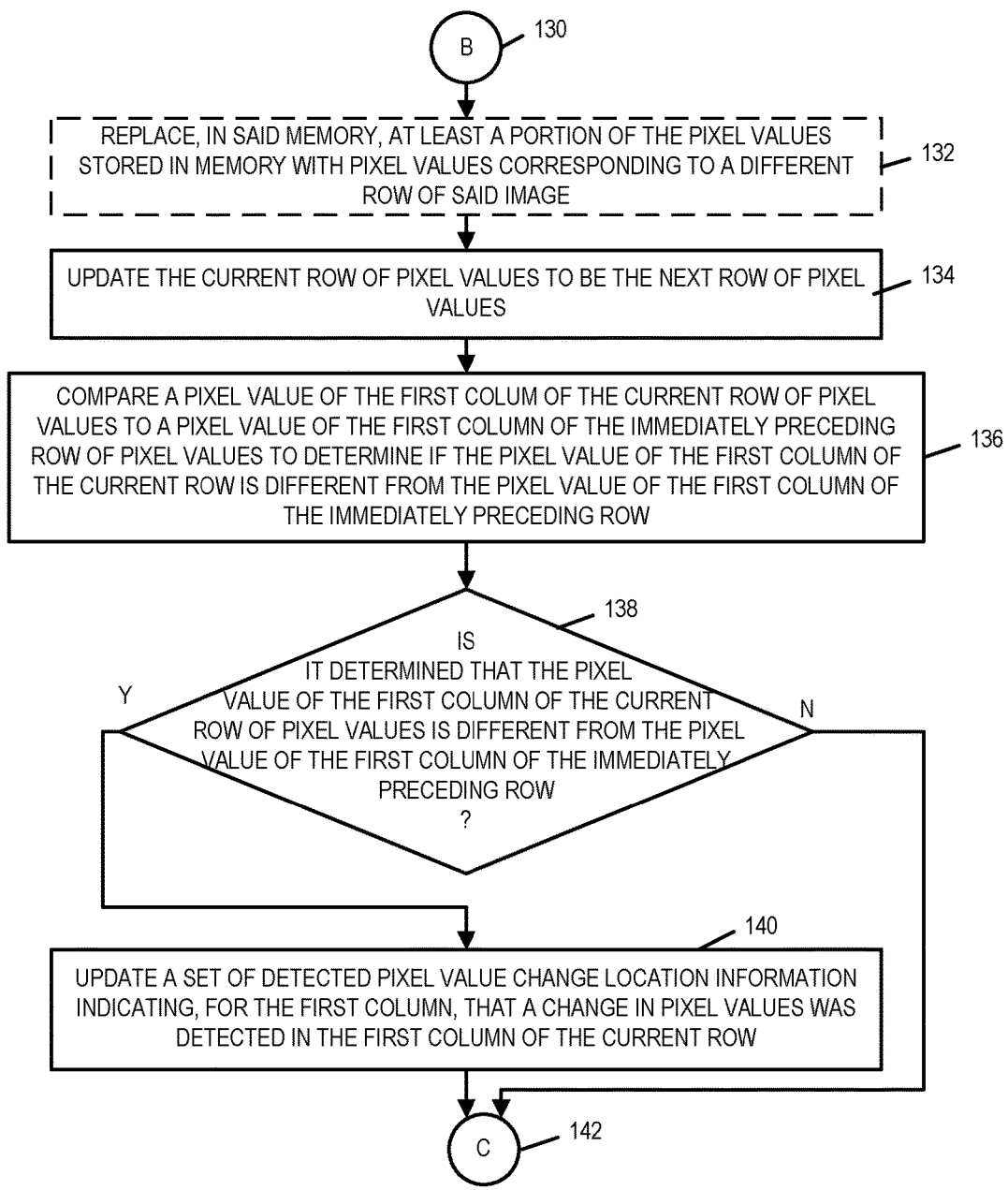
FIG. 1C is a third part of a flowchart of an exemplary method of processing image data in accordance with an exemplary embodiment.
Figure 1D:
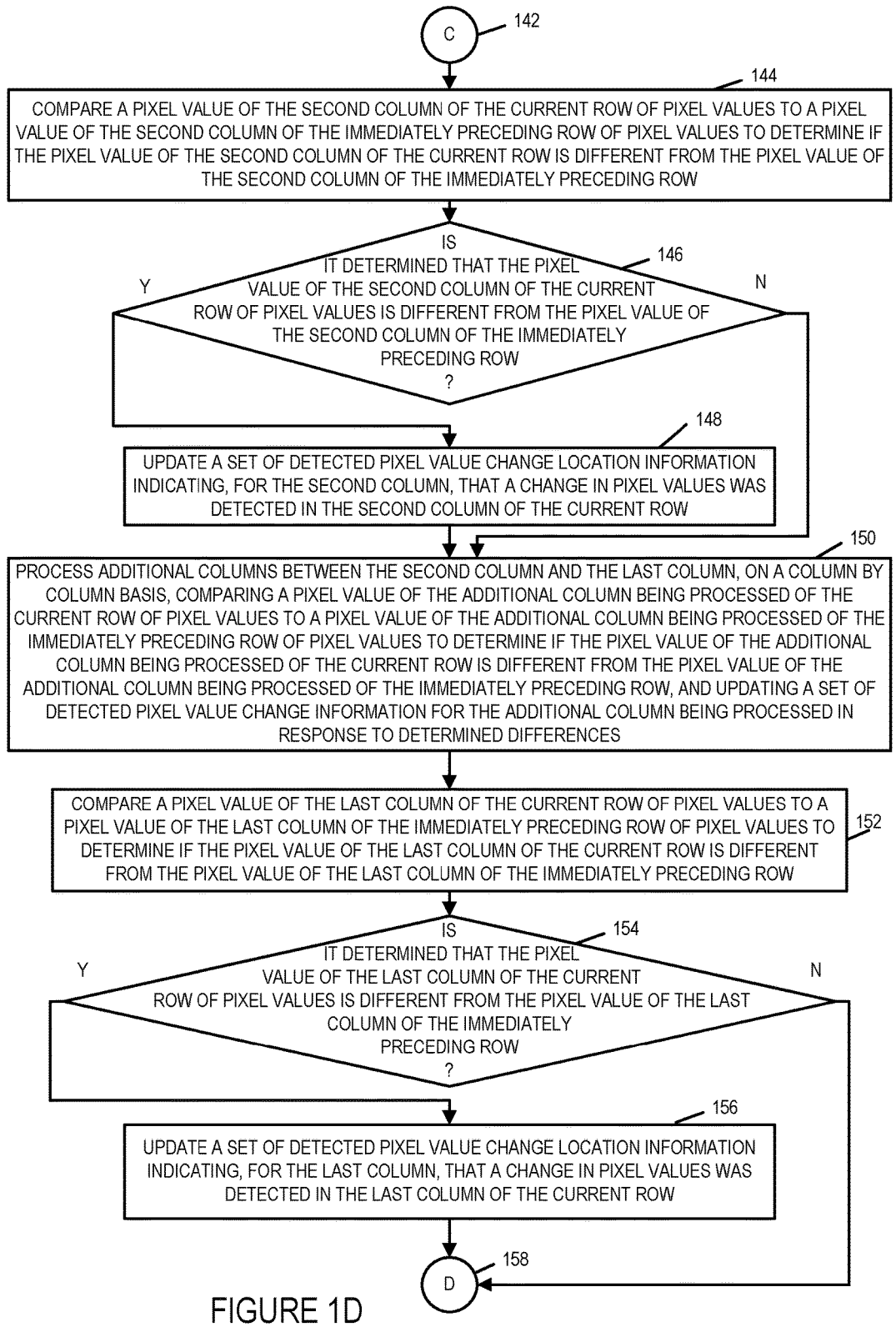
FIG. 1D is a fourth part of a flowchart of an exemplary method of processing image data in accordance with an exemplary embodiment.
Figure 1E:
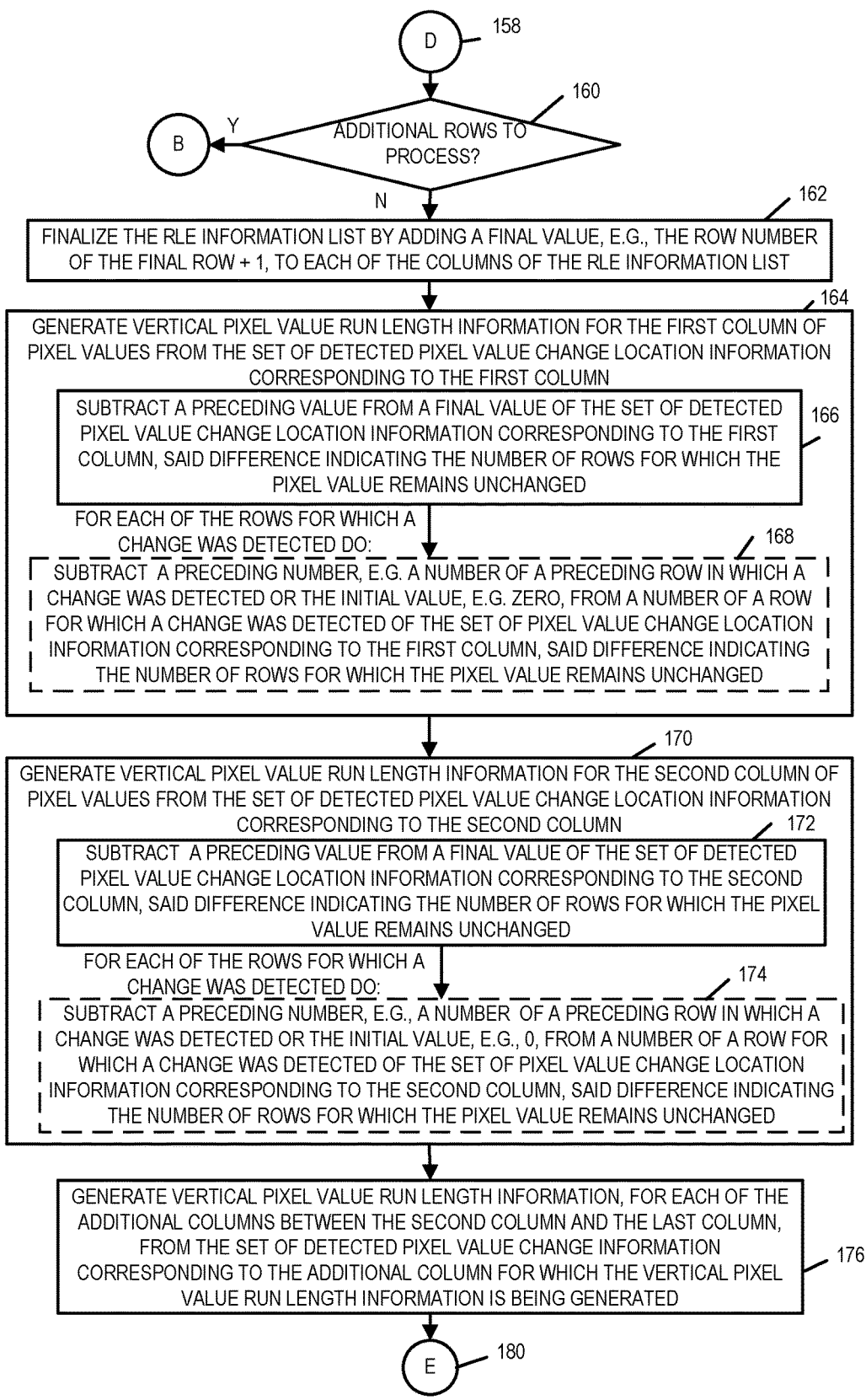
FIG. 1E is a fifth part of a flowchart of an exemplary method of processing image data in accordance with an exemplary embodiment.
Figure 1F:
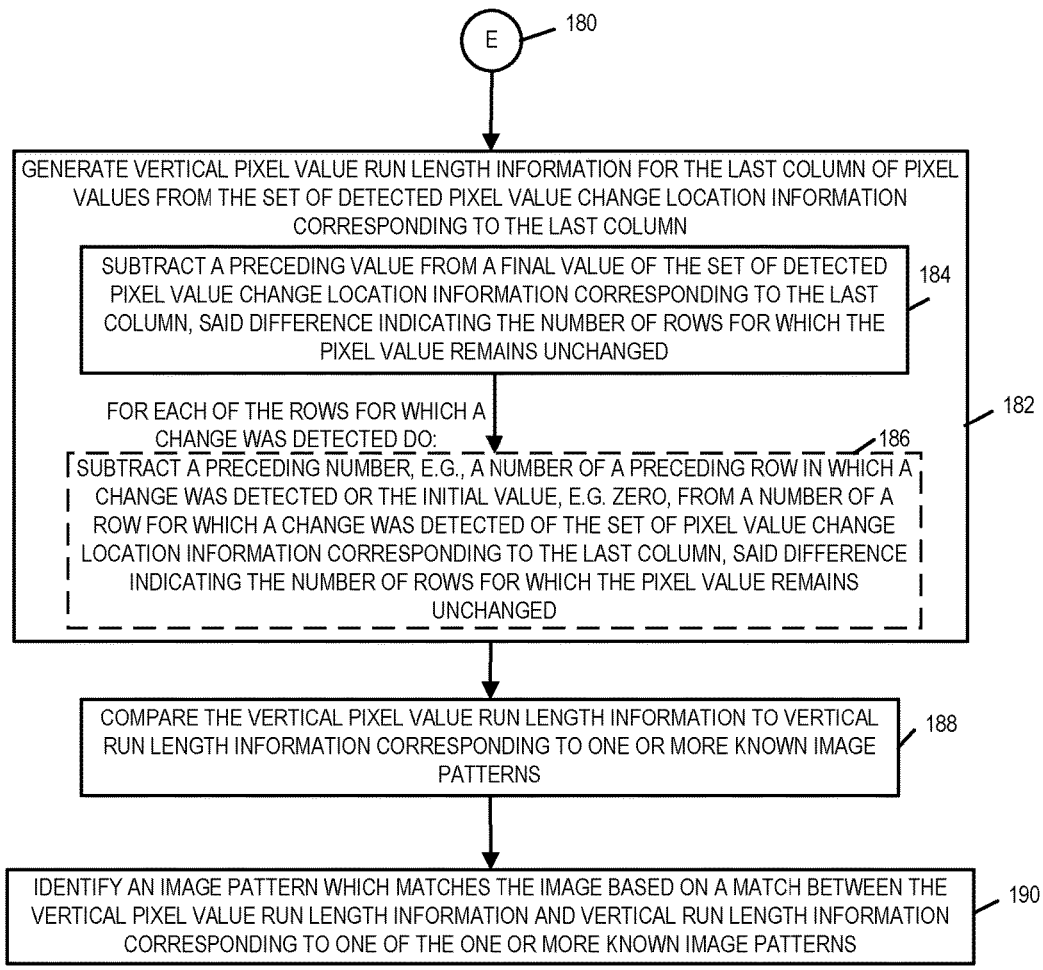
FIG. 1F is a sixth part of a flowchart of an exemplary method of processing image data in accordance with an exemplary embodiment.

Methods and apparatus for processing images in an efficient manner are described. The methods and apparatus may be used to detect bar codes and/or other images. The methods are particularly useful for facilitating detection of patterns with a predictable sequence of lines or blocks in a vertical direction when an image is scanned. The pattern in the vertical direction may be considered alone or in combination with a pattern in the horizontal direction.

To detect a pattern in the vertical direction of an image, e.g., a binary image of a scanned object which may include a bar code, QR code or some other code represented using a pattern of light and dark areas, pixel values corresponding to the vertical direction of the image are processed.

In various embodiments, to detect which of a plurality of possible patterns is in a scanned image, the scanned image is processed. The binary image being processed includes a rows and columns of pixel values. Vertical run length information is generated for each column of pixel values by processing the values in row order. The row order allows for the pixel values to be read out in a manner that allows for efficient memory access since the pixel values are stored in memory, e.g., cache memory, in row order rather than vertical column order.

By performing row order processing rather than processing pixel values by going straight down a column, the memory readouts are relatively close together allowing for more efficient memory access than might otherwise be the case. To facilitate rapid image processing the pixel values to be processed are often loaded into cache memory for processing. Unfortunately, given the limited amount of cache memory available in many cases it is not possible to store all the rows of pixel values in an image particularly in the case of high resolution images. This can lead to having to swap out rows of pixel data to processes a full image. The passing of rows of pixel data in and out of cache memory can be relatively time consuming as compared to the processing of values which are in cache memory. Swapping is minimized or reduced as compared to vertical column processing of pixel values since rows are processed in the order in which they are stored without the need to swap the same rows of pixel values in and out of memory multiple times as might be the case if each column of pixel values was processed before moving on to processing of the next column.

By storing and processing pixels values in row order the number of times a row of pixel values needs to be swapped in and out of cache memory can be minimized or reduced as compared to sequential processing of columns of pixel values even in cases where the cache memory can not store the full image at a given time due to memory constraints.

By comparing the pixel value in one row to the pixel value of the same column in the next row, for a given column the row where a change in pixel values occurs can and is detected. The position in each column where a change occurs is determined in some embodiments. The change information is used as intermediate information to determine the vertical run length for a pixel value, i.e., the number of rows for which the same pixel value repeats in the column before a change. While all the change locations maybe determined for an image before the final run lengths are computed for the individual columns, for each given column once the location, e.g., row, where a change occurs is determined the run length value for the pixel value preceding the change can be determined. The run length for a pixel value can be determined by subtracting the row location of the last change in the row when there was a previously detected change or by using the row number of the row number where the change was detected in the column as the run length if the change is the first detected change in the column.

After computing the location and length of vertical run lengths for all or a portion of an image they can be, and sometimes are, compared to an expected pattern of vertical run lengths to determine if the image includes a bar code or other pattern, e.g., QR code, communicating information. Given that QR and other block based image codes are often designed so that the information repeats in both the vertical and horizontal directions. The vertical run length information generated by processing an image in accordance with the invention can be used to detect a wide range of different types of codes and bar patterns.

As should be appreciated the methods and apparatus described herein address technical problems concerning the ability of memory, e.g. cache memory, to efficiently store pixel data. The methods and/or apparatus provide for access of such data in a way that overcomes or avoids many of the disadvantages of accessing pixel values to compute run lengths on a vertical column basis when the pixels values are stored in row order in memory.

An exemplary method of processing image data, in accordance with some embodiments, includes loading at least a portion of each of two horizontal rows of pixel values into memory, each horizontal row of pixel values including a plurality of N pixel values, each pixel value in a row corresponding to one of N different columns of pixel values; designating a second row of pixel values to be a current set of pixel values; and comparing a pixel value of the first column of the current row of pixel values to a pixel value of the first column of the immediately preceding row of pixel value to determine if the pixel value of the first column of the current row is different from the pixel value of the first column of the immediately preceding row, and if it is determined that the pixel value of the first column of the current row of pixel values is different from the pixel value of the first column of the immediately preceding row, updating a set of detected pixel value change location information indicating, for the first column, that a change in pixel values was detected in the first column at the current row. In various embodiments, the exemplary method further includes: comparing a pixel value of the second column of the current row of pixel values to a pixel value of the second column of the immediately preceding row of pixel value to determine if the pixel value of the second column of the current row is different from the pixel value of the second column of the immediately preceding row; and if it is determined that the pixel value of the second column of the current row of pixel values is different from the pixel value of the second column of the immediately preceding row, updating a set of detected pixel value change location information indicating, for the second column, that a change in pixel values was detected in the second column at the current row.

Numerous embodiments and features are discussed in the detailed description which follows.

DETAILED DESCRIPTION

FIG. 1, comprising the combination of FIG. 1A, FIG. 1B, FIG. 1C, FIG. 1D, FIG. 1E, and FIG. 1F is a flowchart 100 of an exemplary method of processing image data in accordance with an exemplary embodiment. The exemplary method of flowchart 100 may be performed by an image processing device, e.g., image processing device 200 of FIG. 2. Operation starts in step 102 in which the image processing device is powered on and initialized. Operation proceeds from step 102 to step 103.

In step 103, the image processing device initializes an RLE information list to start with an initial value, e.g., 0, on each of the columns of the RLE information list, said RLE information list including sets of detected pixel value change location information, each set corresponding to a different column. In some embodiments, the initial value is the index number corresponding to the first row of the image. Operation proceeds from step 103 to step 104, in which the image processing device loads some pixel values into memory, e.g., a cache memory. Step 104 includes step 105. In step 105 the image processing device loads at least a portion of each of two horizontal rows of pixel values into memory, e.g., cache memory, each horizontal row of pixel values including a plurality of N pixel values, each pixel value in a row corresponding to one of N different columns of pixel values. In one embodiment the N different columns of pixel values are numbered such that the first column has column index number=0 and the last column has column index number=N−1. In various embodiments, the memory into which the at least two rows of pixel values is loaded is a cache memory. Operation proceeds from step 105 to step 106.

In step 106 the image processing device designates a second row of pixel values to be a current set of pixel values. In one embodiment, the first row has row index number=0; therefore, the second row has row index number=1. Operation proceeds from step 106 to step 108, in which the image processing device compares a pixel value of the first column of the current row of pixel values to a pixel value of the first column of the immediate preceding row of pixel values to determine if the pixel value of the first column of the current row is different from the pixel value of the first column of the immediately preceding row. Operation proceeds from step 108 to step 110.

In step 110 if it is determined that the pixel value of the first column of the current row of pixel values is different than the pixel value of the first column of the immediately preceding row, then operation proceeds from step 110 to step 112; otherwise operation proceeds from step 110, via connecting node A 114, to step 116.

Returning to step 112, in step 112, the image processing device updates a set of detected pixel value change location information indicating, for the first column, that a change in pixel values was detected in the first column of the current row. Operation proceeds from step 112, via connection node A 114, to step 116.

In step 116 the image processing device compares a pixel value of the second column of the current row of pixel values to a pixel value of the second column of the immediate preceding row of pixel values to determine if the pixel value of the second column of the current row is different from the pixel value of the second column of the immediately preceding row. Operation proceeds from step 116 to step 118.

In step 118 if it is determined that the pixel value of the second column of the current row of pixel values is different than the pixel value of the second column of the immediately preceding row, then operation proceeds from step 118 to step 120; otherwise, operation proceeds from step 118 to step 122.

Returning to step 120, in step 120, the image processing device updates a set of detected pixel value change location information indicating, for the second column, that a change in pixel values was detected in the second column of the current row. Operation proceeds from step 120 to step 122.

In step 122 the image processing device processes additional columns between the second column and the last column, on a column by column basis, comparing a pixel value of the additional column being process of the current row of pixel values to a pixel value of the additional column being processed of the immediately preceding row of pixel values to determine if the pixel value of the additional column being processed of the current row is different from the pixel value of the additional column being processed of the immediately preceding row, and updates a set of detected pixel level change information for the additional column being processed in response to determined differences. Operation proceeds from step 122 to step 124.

In step 124 the image processing device compares a pixel value of the last column of the current row of pixel values to a pixel value of the last column of the immediate preceding row of pixel values to determine if the pixel value of the last column of the current row is different from the pixel value of the last column of the immediately preceding row. Operation proceeds from step 124 to step 126.

In step 126 if it is determined that the pixel value of the last column of the current row of pixel values is different than the pixel value of the last column of the immediately preceding row, then operation proceeds from step 126 to step 128; otherwise, operation proceeds from step 126, via connecting node B 130, to step 132 or step 134.

Returning to step 128, in step 128 the image processing device updates a set of detected pixel value change location information indicating for the last column, that a change in pixel values was detected in the last column of the current row. Operation proceeds from step 128, via connecting node B 130, to step 132.

In step 132, the image processing device replaces, in said memory, e.g., cache memory, at least a portion of the pixel values stored in memory with pixel values corresponding to a different row of said image. In some embodiments, in step 132 the image processing device replaces in memory, e.g., in cache memory, at least a portion of the pixel values corresponding to said at least a portion of each of two horizontal rows of pixel values with pixel values corresponding to a different row of said image. In various embodiments, step 132 is performed for some iterations and bypassed for other iterations, e.g., as a function of the number of horizontal rows of pixel values being stored in cache and the extent to which the stored rows have been processed. In various embodiments, the image processing device replaces in memory, e.g., cache memory, at least a portion of the pixel values corresponding to said at least a portion of each of two horizontal rows of pixel values with pixel values corresponding to a different row of said image prior to processing a last row of pixel values of said image. In various embodiments, the cache memory is not large enough to store all of the pixel values of said image at the same time. However, the exemplary method of flowchart 100 is useful, even if this is not the case, since sequential access can be more efficient than access to different memory locations when the pixel values of a row are stored in consecutive memory locations of the memory.

Although step 132 is shown as occurring at a fixed point in the sequence, e.g., after a row has been processed, in some embodiments, updating of cache memory is performed on a demand per pixel access fashion under the control of a processor, e.g., a CPU. In some embodiments a CPU may, and sometimes does, load multiple rows or a single row into cache memory. In some embodiments, the CPU may, and sometimes does, load a partial row into cache memory. In some embodiments, e.g., for especially long rows of pixel values, there may be multiple times the CPU will fetch the RAM memory into cache memory during a single row processing.

Operation proceeds from step 132 to step 134 in which the image processing device updates the current row of pixel values to be the next row of pixel value, e.g., designates the next row of pixels values as the new current row of pixel values, e.g., current row=current row+1. Operation proceeds from step 134 to step 136.

In step 136 the image processing device compares a pixel value of the first column of the current row of pixel values to a pixel value of the first column of the immediate preceding row of pixel values to determine if the pixel value of the first column of the current row is different from the pixel value of the first column of the immediately preceding row. Operation proceeds from step 136 to step 138.

In step 138 if it is determined that the pixel value of the first column of the current row of pixel values is different than the pixel value of the first column of the immediately preceding row, then operation proceeds from step 138 to step 140; otherwise, operation proceeds from step 138, via connecting node C 142, to step 144.

Returning to step 140, in step 140, the image processing device updates the set of detected pixel value change location information indicating, for the first column, that a change in pixel values was detected in the first column of the current row. Operation proceeds from step 140, via connection node C 142, to step 144.

In step 144 the image processing device compares a pixel value of the second column of the current row of pixel values to a pixel value of the second column of the immediate preceding row of pixel values to determine if the pixel value of the second column of the current row is different from the pixel value of the second column of the immediately preceding row. Operation proceeds from step 144 to step 146.

In step 146 if it is determined that the pixel value of the second column of the current row of pixel values is different than the pixel value of the second column of the immediately preceding row, then operation proceeds from step 146 to step 148; otherwise, operation proceeds from step 146 to step 150.

Returning to step 148, in step 148, the image processing device updates the set of detected pixel value change location information indicating, for the second column, that a change in pixel values was detected in the second column of the current row. Operation proceeds from step 148 to step 150.

In step 150 the image processing device processes additional columns between the second column and the last column, on a column by column basis, comparing a pixel value of the additional column being processed of the current row of pixel values to a pixel value of the additional column being processed of the immediately preceding row of pixel values to determine if the pixel value of the additional column being processed of the current row is different from the pixel value of the additional column being processed of the immediately preceding row, and updates a set of detected pixel level change information for the additional column being processed in response to determined differences. Operation proceeds from step 150 to step 152.

In step 152 the image processing device compares a pixel value of the last column of the current row of pixel values to a pixel value of the last column of the immediate preceding row of pixel values to determine if the pixel value of the last column of the current row is different from the pixel value of the last column of the immediately preceding row. In one embodiment, the last column is the column with column index number=N−1 since the first column has column index number=0. In various embodiments, comparing a pixel value of the last column of a current row to a pixel value of the last column of the immediately preceding row of pixel values is performed prior to processing the next row of pixel values to determine if it includes pixel values with different values from the preceding row of pixel values. Operation proceeds from step 152 to step 154.

In step 154 if it is determined that the pixel value of the last column of the current row of pixel values is different than the pixel value of the last column of the immediately preceding row, then operation proceeds from step 154 to step 156; otherwise, operation proceeds from step 154, via connecting node D 158, to step 160. Returning to step 156, in step 156 the image processing device updates a set of detected pixel value change location information indicating, for the last column, that a change in pixel values was detected in the last column of the current row. Operation proceeds from step 156, via connecting node D 158, to step 160.

In step 160 the image processing device determines if there are more rows to process. If there are more rows to process, then operation proceeds from step 160, via connecting node B 130 to step 132, in which at least of portion of the pixel values in memory are replaced, or step 134, in which updating is performed to designate a new row as the current row.

However, if in step 160 the image processing device determines that there are not any more rows of pixel values in the image to process, then operation proceeds from step 160 to step 162. In step 162 the image processing device finalizes the RLE information list by adding, a final value, e.g., the row number of the final row in the image+1, to each of the columns of the RLE information list. For example, if the image includes eight rows with row index numbers (0, 1, 2, 3, 4, 5, 6, 7), the value 8 is added to the end of each column of RLE information. Thus in step 162 each set of detected pixel value change information in the RLE information list is finalized with the same value, e.g., a value which indicates the total number of rows in the image for some embodiments in which the first row index number is 0. Operation proceeds from step 162 to step 164.

In step 164 the image processing device generates vertical pixel value run length information for the first column of pixel values from the set of detected pixel value change location information corresponding to the first column. Step 164 includes step 166, and further includes step 168 if the set of detected pixel value change information corresponding to the first column includes 3 or more values. In step 166 the image processing device subtracts a preceding value from a final value of the set of detected pixel value change location information corresponding to the first column, said difference indicating the number or rows for which the pixel value remains unchanged. For example, in the example corresponding to FIG. 38, in step 166 the value of 6 is subtracted from 8 to obtain 2. Step 168 is performed for each of the rows of the first column for which a change was detected. In step 168 the image processing device subtracts a preceding number, e.g., a number of a preceding row for which a change was detected or the initial value, e.g., zero, from a number of a row for which a change was detected, of the set of detected pixel value change location information corresponding to the first column, said difference indicating the number of rows for which the pixel value remains unchanged corresponding to the first column. For example, in the example corresponding to FIG. 38, in a one iteration of step 168, 4 is subtracted from 6 to obtain 2; in another iteration of step 168, 2 is subtracted from 3 to obtain 1; in still another iteration of step 168, 1 is subtracted from 2 to obtain 1; and in yet another iteration of step 168, initial value 0 is subtracted from 1 to obtain 1. Operation proceeds from step 164 to step 170.

In step 170 the image processing device generates vertical pixel value run length information for the second column of pixel values from the set of detected pixel value change location information corresponding to the second column. Step 170 includes step 172, and further includes step 174 if the set of detected pixel value change information corresponding to the second column includes 3 or more values. In step 172 the image processing device subtracts a preceding value from a final value of the set of detected pixel value change location information corresponding to the second column, said difference indicating the number or rows for which the pixel value remains unchanged. Step 174 is performed for each of the rows of the second column for which a change was detected. In step 174 the image processing device subtracts a proceeding number, e.g., a number of a preceding row in which a change was detected or the initial value, e.g., zero, from a number of a row for which a change was detected of the set of detected pixel value change location information corresponding to the second column, said difference indicating the number of rows for which the pixel value remains unchanged corresponding to the second column. Operation proceeds from step 170 to step 176.

In step 176, the image processing device generates vertical pixel value run length information, for each of the additional columns between the second column and the last column, from the set of detected pixel value change information corresponding to the additional column for which the vertical pixel value run length information is being generated.

Operation proceeds from step 176, via connecting node E 180 to step 182. In step 182 the image processing device generates vertical pixel value run length information for the last column of pixel values from the set of detected pixel value change location information corresponding to the last column. Step 182 includes step 184, and further includes step 186 if the set of detected pixel value change information corresponding to the last column includes 3 or more values. In step 184 the image processing device subtracts a preceding value from a final value of the set of detected pixel value change location information corresponding to the last column, said difference indicating the number or rows for which the pixel value remains unchanged. Step 186 is performed for each of the rows of the last column for which a change was detected. In step 186 the image processing device subtracts a preceding number, e.g., a number of a preceding row in which a change was detected or the initial value, e.g., zero, from a number of a row for which a change was detected of the set of detected pixel value change location information corresponding to the last column, said difference indicating the number of rows for which the pixel value remains unchanged corresponding to the last column. Operation proceeds from step 182 to step 188.

In step 188 the image processing device compares the vertical pixel value run length information, e.g., the output from steps 164, 170, 176 and 182, to vertical run length information corresponding to one or more known image patterns, e.g., a stored database of vertical run length information corresponding to known patterns. In various embodiments, the vertical pixel value run length information includes information indicating the number of consecutive rows a pixel value remains unchanged in the vertical column of pixel values to which the vertical pixel run length information corresponds. Operation proceeds from step 188 to step 190, in which the image processing device identifies an image pattern which matches the image based on a match between the vertical pixel value run length information and vertical run length information corresponding to one of the one or more known image patterns. In some embodiments, the image pattern is one of a bar pattern and a QR code. In various embodiments, the match is a probabilistic match exceeding a predetermined acceptance value and being the best match of the tested comparison image patterns. In some embodiments, the identification further includes performing horizontal pixel value run length information matching to stored horizontal run length information corresponding to one or more known image patterns.

Figure 2:
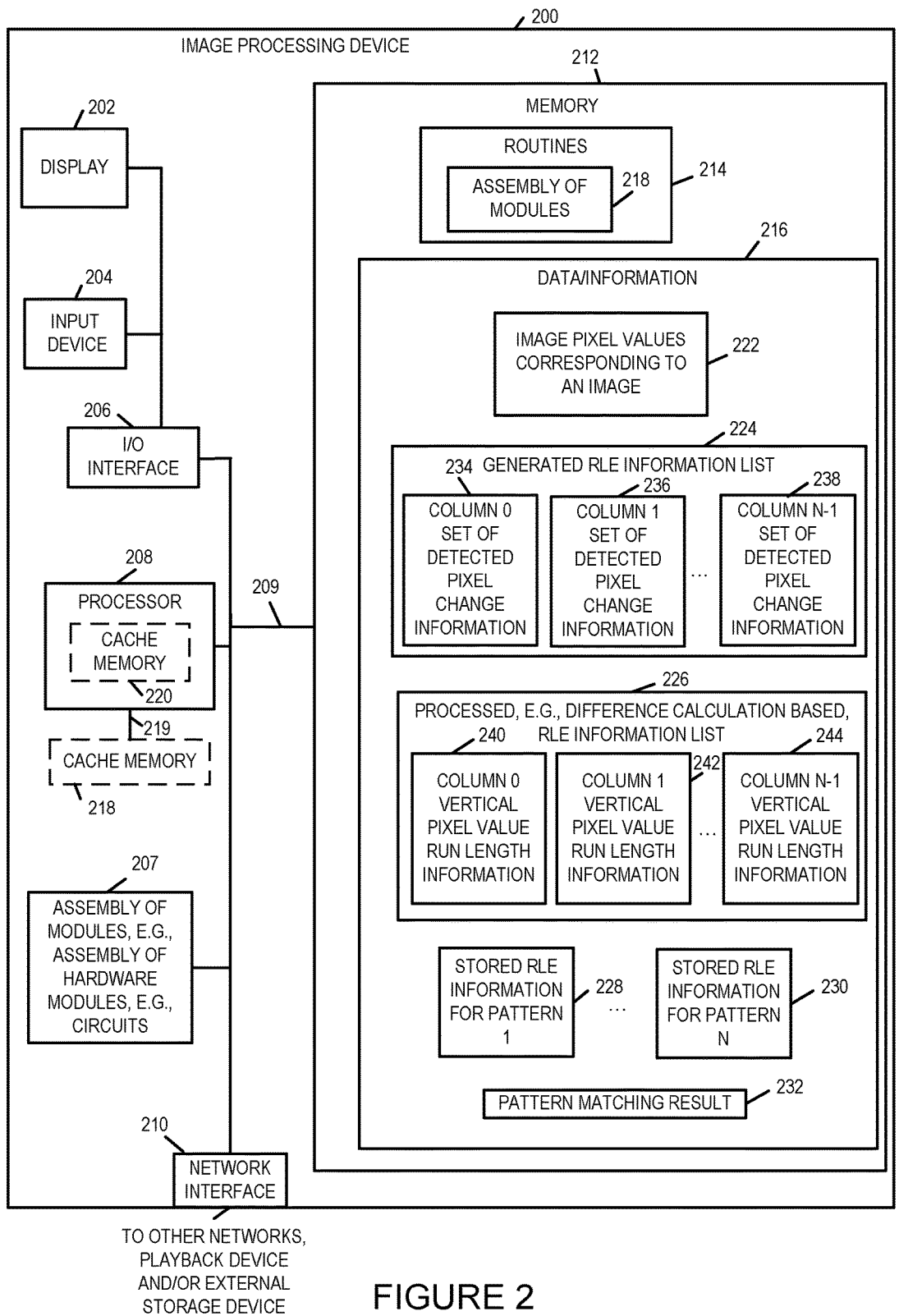
FIG. 2 is an exemplary image processing device which may implement the method of the flowchart of FIG. 1.

FIG. 2 illustrates an exemplary image processing device 200, capable of processing data, e.g., image data, in accordance with the present invention. In some embodiments, the image processing device 200 is a portable device, e.g., a handheld portable device. The image processing device 200 includes various modules for performing the steps of methods of the present invention, e.g., such as the methods of flowchart 100 of FIG. 1.

As shown in FIG. 2, the image processing device includes a display 202, an input device 204, an input/output interface 206, an assembly of modules 207, e.g., an assembly of hardware modules, e.g., circuits, a processor 208, a network interface 210 and a memory 212 coupled together by a bus 209 over which the various elements may exchange data and information. Memory 212 includes routines 214 including assembly of modules 218, e.g., an assembly of software modules, and data/information 216. The display 202 can be used to display an input image and to display results, e.g., determined vertical pixel value run length information, an identified pattern, etc. The user can control the image processing device to receive and/or select an input image to be processed using the input device 204 which may be, e.g., a keyboard or other input device. In some embodiments, the input device c204 includes a camera and/or a scanner for capturing an image to be processed. The I/O interface 210 includes transmitters and receivers for transmitting and receiving information, e.g., input images to be processed, information to be used for comparison checking in performing pattern matching, e.g., RLE information corresponding to known bar codes and known QR codes, and determined results.

In various embodiments, the image processing device 200 includes one or both of cache memory 218 and cache memory 220. Cache memory 218 is external to processor 208 and coupled to processor 208 via bus 219. Cache memory 220 is included as part of processor 208.

Figure 3:
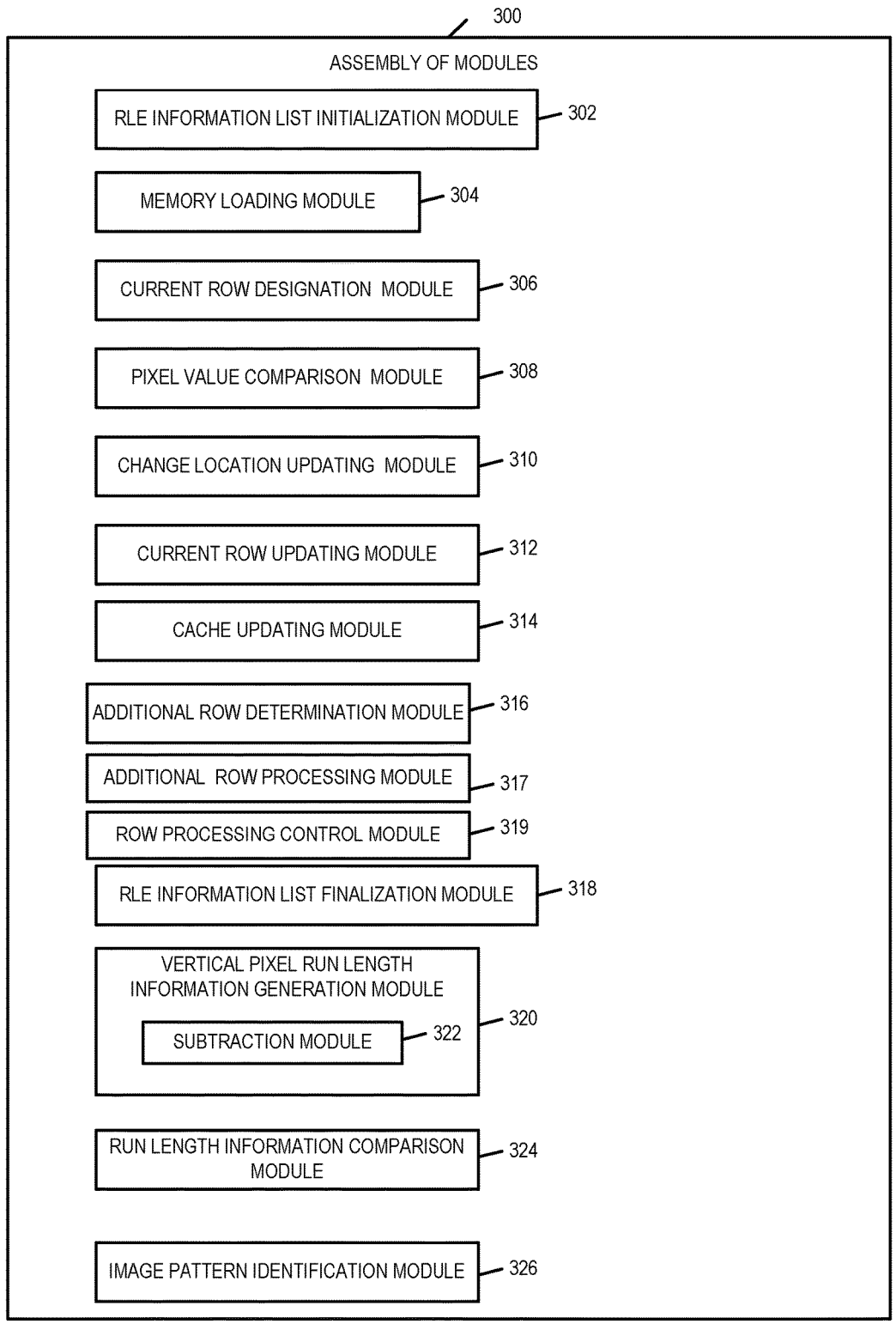
FIG. 3 is a drawing of an assembly of modules which may be included in the image processing device of FIG. 3.

The processor 208, e.g., a CPU, performs various operations in accordance with the invention, e.g., under direction of routines 214 and/or one or more of the modules stored in the assembly of modules 218. In some embodiments, each of the modules in the assembly of modules 300 of FIG. 3 are included in assembly of modules 218 in routines 214. Routines 214, in some embodiments, includes, e.g., main routines and subroutines. While the assembly of modules 218 includes various software modules, the modules in assembly of modules 300 may and in some embodiments are, implemented in hardware, e.g., in assembly of modules 207 and/or within processor 208. In some embodiments, some modules in the assembly of modules 300 are implemented in hardware and other modules in the assembly of modules 300 are implemented in software.

Figure 5:
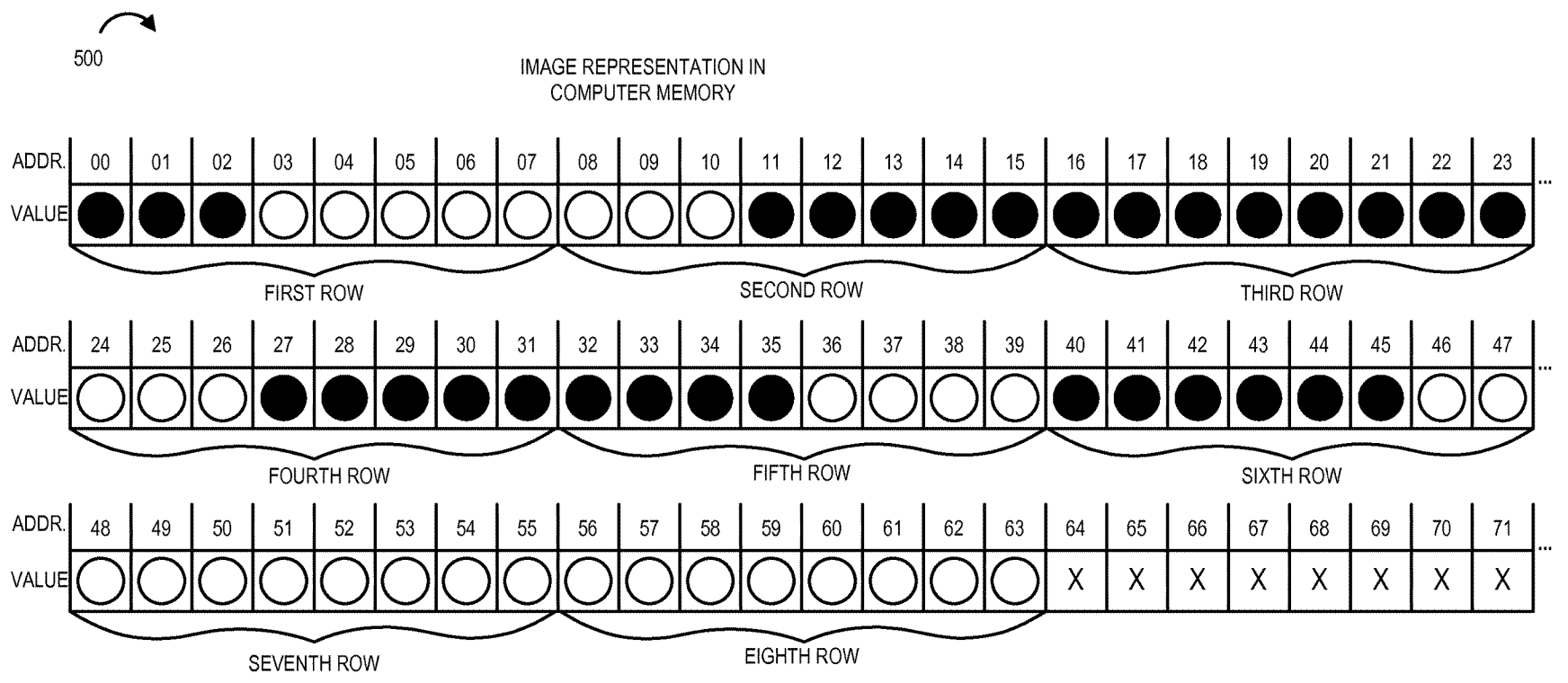
Figure 21:
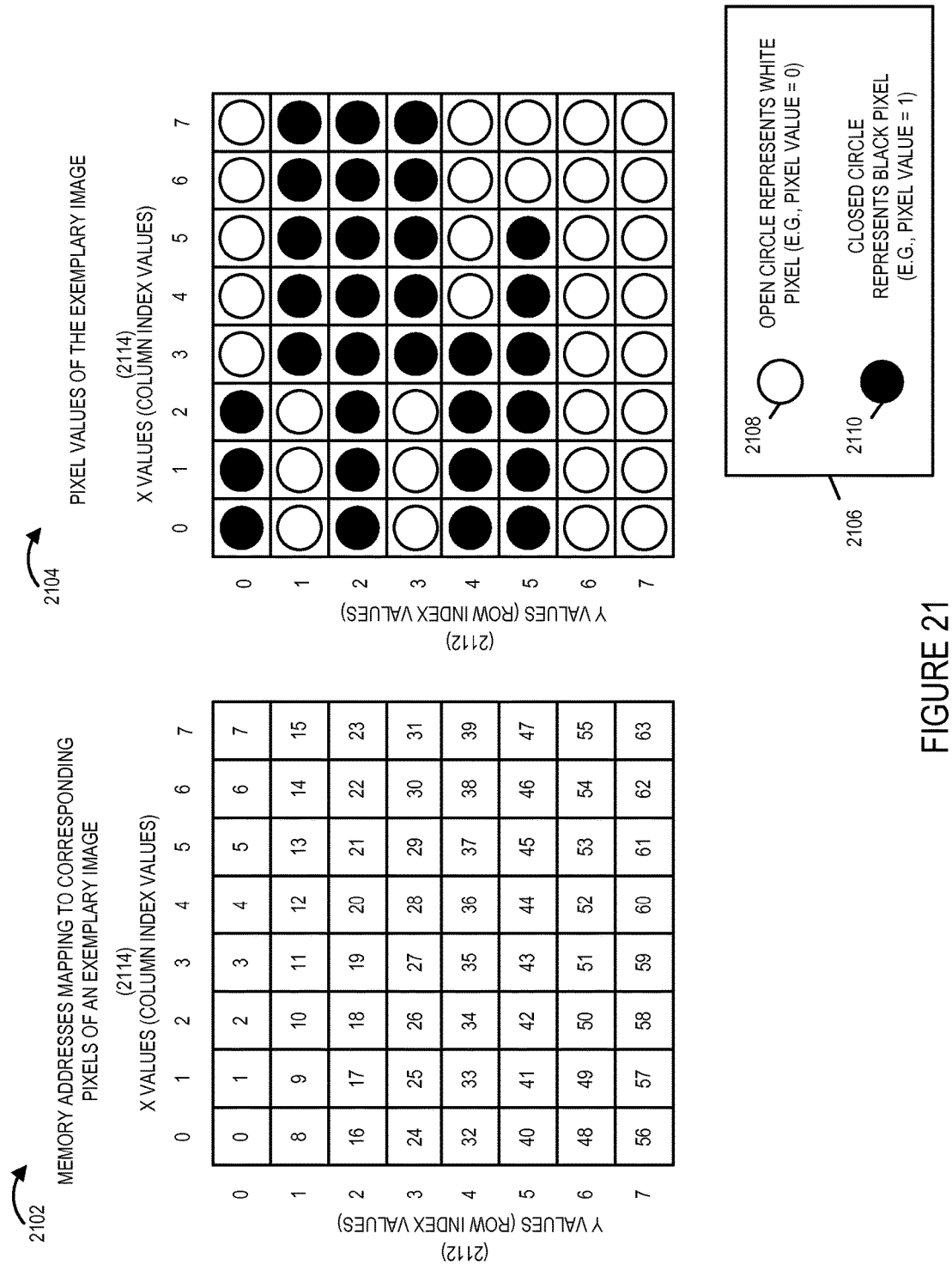
FIG. 21 includes a drawing which illustrates 64 memory addresses mapping to the 64 corresponding pixels of an exemplary 8×8 pixel image, a drawing illustrating exemplary pixel values of the exemplary 8×8 pixel image, and a corresponding legend.
Figure 38:
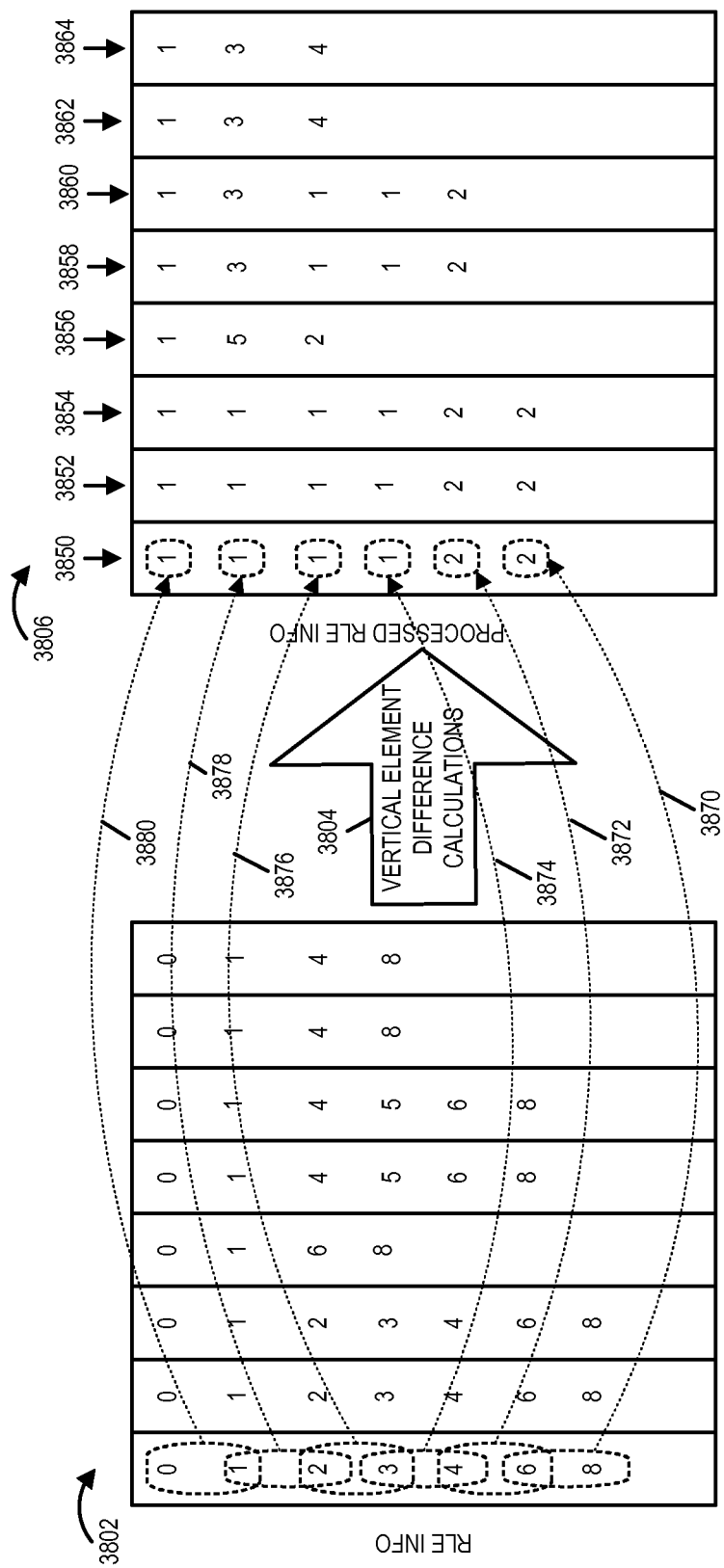
FIG. 38 illustrates that filled out RLE information list is subjected to processing including difference calculations of each subsequent element (vertically) in each column of the list to generate vertical run length value information for the exemplary image.

Data/information 216 includes image pixel values corresponding to an image 222, a generated RLE information list 224, a processed RLE information list 226, a plurality of stored RLE information corresponding to different known image patterns, e.g., known bar codes and/or QR codes (stored RLE information for pattern 1 228, . . . , stored RLE information for pattern N 230), and a pattern matching result 232. Pixel values corresponding to an image 222 includes, e.g., an image representation in computer memory such as shown in FIG. 5 or FIG. 21. Generated RLE information list 224 includes a plurality of sets of detected pixel change information (column 0 set of detected pixel change information 234, column 1 set of detected pixel change information 236 . . . column N−1 set of detected pixel change information 238. Drawing 3802 of FIG. 38 illustrates an exemplary generated RLE information list. Processed RLE information list 226 is a processed version of generated RLE information list 224, wherein the processing includes difference calculations in accordance with the present invention. Drawing 3850 of FIG. 38 illustrates an exemplary processed RLE information list. Processed RLE information list 226 includes a plurality of columns of vertical pixel value run length information (column 0 vertical pixel value run length information 240, column 1 vertical pixel value run length information 242, . . . , column N−1 vertical pixel value run length information 244). Pattern matching information 232 includes information identifying which one of the known patterns corresponding to information (228, . . . , 230) matches the processed RLE information list 226.

FIG. 3, illustrates an assembly of modules 300 which can, and in some embodiments is, used in the exemplary image processing device 200 illustrated in FIG. 2, e.g., as assembly of modules 218 and/or 207. Assembly of modules 300 can be implemented in hardware within the processor 208 of the image processing device 200, e.g., as individual circuits. The modules in the assembly 300 can, and in some embodiments are, implemented fully in hardware within the processor 208, e.g., as individual circuits. In other embodiments some of the modules are implemented, e.g., as circuits, within the processor 208 with other modules being implemented, e.g., as circuits in assembly of modules 207, external to and coupled to the processor 208. As should be appreciated the level of integration of modules on the processor and/or with some modules being external to the processor may be one of design choice. Alternatively, rather than being implemented as circuits, all or some of the modules 300 may be implemented in software and stored in the memory 212 of the image processing device 200 with the modules controlling operation of the image processing device 200 to implement the functions corresponding to the modules when the modules are executed by a processor, e.g., processor 208. In some such embodiments, the assembly of modules 300 is included in the memory 212, e.g., as assembly of modules 218. In still other embodiments, various modules are implemented as a combination of hardware and software, e.g., with another circuit external to the processor providing input to the processor 208 which then under software control operates to perform a portion of a module's function. While shown in the FIG. 2 embodiment as a single processor, e.g., computer, it should be appreciated that the processor 208 may be implemented as one or more processors, e.g., computers.

When implemented in software the modules include code, which when executed by the processor 208, configure the processor 208 to implement the function corresponding to the module. In embodiments where the assembly of modules 300 is stored in the memory 212, the memory 212 is a computer program product comprising a computer readable medium comprising code, e.g., individual code for each module, for causing at least one computer, e.g., processor 208, to implement the functions to which the modules correspond.

Completely hardware based or completely software based modules may be used. However, it should be appreciated that any combination of software and hardware, e.g., circuit implemented modules may be used to implement the functions. As should be appreciated, the modules illustrated in FIG. 3 control and/or configure the image processing device 200 or elements therein such as the processor 208, to perform the functions of the corresponding steps illustrated in the method of flowchart 100 of FIG. 1. Thus the assembly of modules 300 includes various modules that perform functions of the corresponding steps of the method shown in FIG. 1.

FIG. 3 is a drawing of an exemplary assembly of modules 300 in accordance with an exemplary embodiment. Assembly of modules 300 includes an RLE information list initialization module 302, a memory loading module 304, a current row designation module 306, a pixel value comparison module 308, a change location updating module 310, a current row updating module 312, a cache updating module 314, an additional row identification module 316, an additional row processing module 317, a row processing control module 319, a RLE information list finalization module 318, a vertical pixel run length information generation module 320 including a subtraction module 322, a run length information comparison module 324, and an image pattern identification module 326.

RLE information list initialization module 302 is configured to initialize an RLE information list to start with an initial value, e.g., 0, for each of the columns of the RLE information list, said RLE information list including sets of detected pixel value change location information, each set corresponding to a different column. Memory loading module 304 is configured to load some pixel values into memory, e.g., into cache memory. In various embodiments, memory loading module 304 is configured to load at least a portion of each of two horizontal rows of pixel values into memory, each horizontal row of pixel values included a plurality of N pixel values, each pixel value in a row corresponding to one of the N different columns of pixel values. In various embodiments, the columns of the image are numbered 0 to N−1, with column number 0 being the first column.

Current row designation module 306 is configured to designate a second row of pixel values of the image to be processed to be a current set of pixel values e.g., for starting pixel value comparisons. In various embodiment, the second row has row index value=1, and the first row has row index value=0.

Pixel value comparison module 308 is configured to compare a pixel value of the first column of the current row of pixel values to a pixel value of the first column of the immediately preceding row of pixel values to determine if the pixel value of the first column of the current row is different from the pixel value of the first column of the immediately preceding row. Pixel value comparison module 308 is further configured to compare a pixel value of the second column of the current row of pixel values to a pixel value of the second column of the immediately preceding row of pixel value to determine if the pixel value of the second column of the current row is different from the pixel value of the second column of the immediately preceding row. Pixel value comparison module 308 is further configured to compare a pixel value of the last, e.g. N−1 column index number, column of the current row of pixel values to a pixel value of the last column of the immediately preceding row of pixel values to determine if the pixel value of the last column of the current row is different from the pixel value of the last column of the immediately preceding row. Pixel value comparison module 308 is configured to compare a pixel value of the last column of a current row of pixel values to a pixel value of the last column of the immediately preceding row of pixel value prior to processing the next row of pixel values to determine if it includes pixel values with different values from the preceding row of pixel values.

Change location updating module 310 is configured to update a set of detected pixel value change location information indicating, for the first column, that a change in pixel values was detected in the first column at the current row, if it is determined that the pixel value of the first column of the current row of pixel values is different from the pixel value of the first column of the immediately preceding row. Change location updating module 310 is further configured to update the set of detected pixel value change location information indicating, for the second column, that a change in pixel values was detected in the second column at the current row, if it is determined that the pixel value of the second column of the current row of pixel values is different from the pixel value of the second column of the immediately preceding row. Change location updating module 310 is further configured to update a set of detected pixel value change location information indicating, for the last column, that a change in pixel values was detected in the last column at the current row, if it is determined that the pixel value of the last column of the current is different from the pixel value of the last column of the immediately preceding row.

Current row updating module 312 is configured to update the current row of pixel values to be the next row of pixel values, e.g., current row=current row+1.

Cache updating module 314 is configured to replace, in said memory, which is a cache memory, at least a portion of the pixel values corresponding to said at least a portion of said two horizontal rows of pixel values with pixel values corresponding to a different row of said image prior to processing a last row of pixel values of said image. In some embodiments, said cache memory is not large enough to store all of the pixel values of said image at the same time. In various embodiments, cache updating module 314 is configured to update cache memory in an on-demand per pixel access fashion.

Additional row determination module 316 is configured to determine whether or not there are additional rows of the input image to be processed and to control operation as a function of the determination, e.g., controlling operation to proceed to update the current row to the next row in the image and then perform subsequent pixel values comparisons and updating of pixel value change location information, as required, or to control operation to proceed to RLE information list finalization.

Additional row processing module 317 is configured to control the pixel value comparison module 308 and the change location updating module 310 to repeat their operations for a new current row, when it is determined that additional rows are to be processed.

Row processing control module 319 is configured to control other modules, e.g., pixel value comparison module, change location updating module 310, current row updating module, and additional row determination module 316, to iterate through the rows of the image until the image is fully processed.

RLE information list finalization module 318 is configured to finalize the RLE information list by adding a final value, e.g., the row number of the final row in the image+1, to each of the columns of the RLE information list. Thus module 306 and module 316 are used to initialize, e.g., with 0 values, and finalize with a value, e.g., a value equal to the number of rows in the image, each set of pixel value change information which is being generated to form an RLE information list. The initialization and finalization values facilitate difference determination calculations, which are subsequently performed, e.g., to obtain a desirable format for the RLE information.

Vertical pixel value run length information generation module 320 is configured to generate vertical pixel value run length information for the first column of pixel values from the set of detected pixel value change location information corresponding to the first column. Vertical pixel value run length generation module 320 is further configured to generate vertical pixel value run length information for the second column of pixel values from the set of detected pixel value change location information corresponding to the second column. Vertical pixel value run length generation module 320 is further configured to generate vertical pixel value run length information for the last column of pixel values from the set of detected pixel value change location information corresponding to the last column.

In various embodiments, the vertical pixel value run length information includes information indicating the number of consecutive rows a pixel value remains unchanged in the vertical column of pixel values to which the vertical pixel run length information corresponds.

Subtraction module 322 is configured to subtract a number of a preceding row in which a change was detected from a number of a row in which a change was detected, said difference indicating the number of rows for which the pixel value remained unchanged. Subtraction module 322 is configured to subtract a preceding value from a final value of the set of detected pixel value change location information corresponding to the first column, said difference indicating the number of rows for which the pixel value remains unchanged. Subtraction module 322 is further configured to subtract a preceding number, e.g., a number of a preceding row for which a change was detected or the initial value, e.g., zero, from a number of a row for which a change was detected, of the set of detected pixel value change location information corresponding to the first column, said difference indicating the number of rows for which the pixel value remains unchanged corresponding to the first column. Subtraction module 322 is further configured to subtract a preceding value from a final value of the set of detected pixel value change location information corresponding to the second column, said difference indicating the number or rows for which the pixel value remains unchanged. Subtraction module 322 is further configured to subtract a proceeding number, e.g., a number of a preceding row in which a change was detected or the initial value, e.g., zero, from a number of a row for which a change was detected in the set of detected pixel value change location information corresponding to the second column, said difference indicating the number of rows for which the pixel value remains unchanged corresponding to the second column. Subtraction module 322 is configured to subtract a preceding value from a final value of the set of detected pixel value change location information corresponding to the last column, said difference indicating the number of rows for which the pixel value remains unchanged. Subtraction module 322 is further configured to subtract a preceding number, e.g., a number of a preceding row in which a change was detected or the initial value, e.g., zero, from a number of a row for which a change was detected in the set of detected pixel value change location information corresponding to the last column, said difference indicating the number of rows for which the pixel value remains unchanged corresponding to the last column.

Run length information comparison module 324 is configured to compare the vertical pixel value run length information to vertical run length information corresponding to one or more known image patterns. In various embodiments, the one or more known image patterns include bar patterns and/or QR codes.

Image pattern identification module 326 is configured to identify an image pattern which matches the image based on a match between the vertical pixel value run length information and vertical run length information corresponding to one of the one or more known image patterns. In various embodiments, the image pattern is one of a bar pattern, e.g., a bar code pattern, and a QR code pattern.

Figure 4:
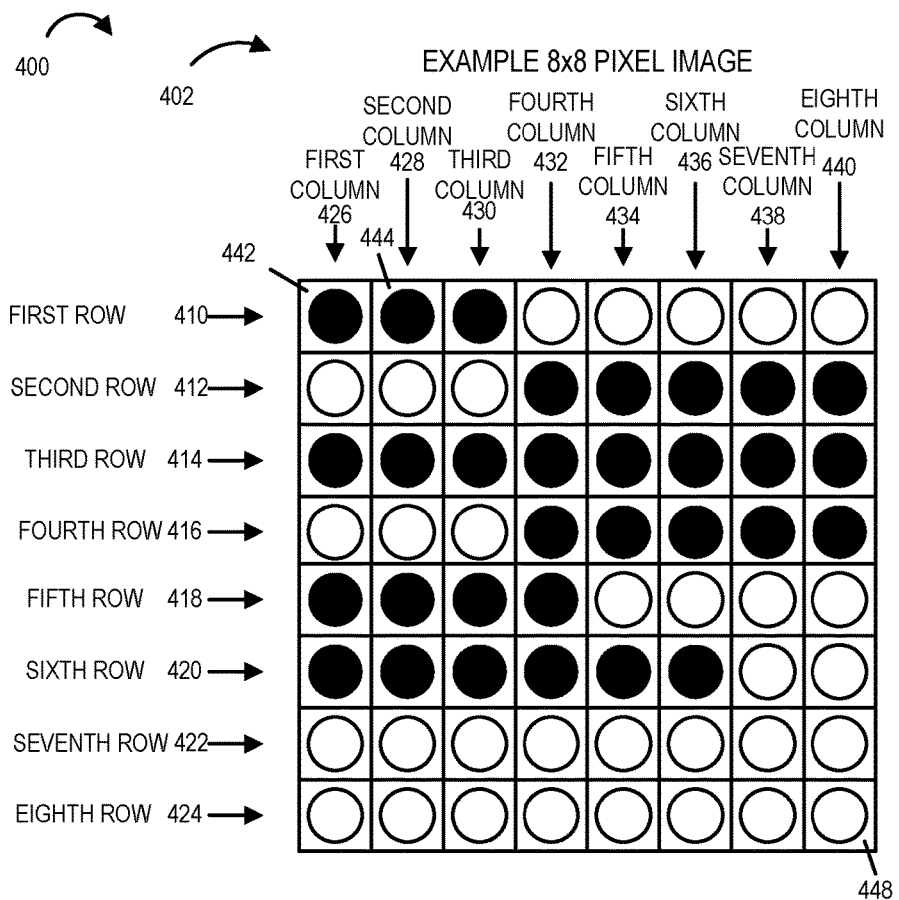
FIG. 4 is a drawing including an exemplary pixel image which may be processed in accordance with the method of the present invention.
Figure 4:
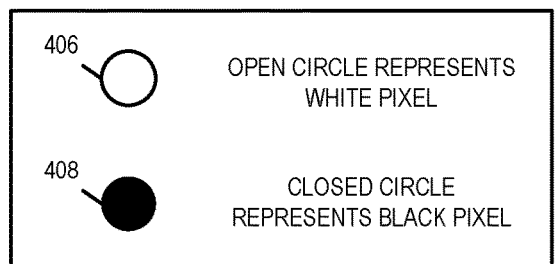

FIG. 4 is a drawing 400 including an example 8×8 pixel image 402, which may be processed in accordance with the method of the present invention, a corresponding legend 404. Example pixel image 402 includes eight rows (first row 410, second row 412, third row 414, fourth row 416, fifth row 418, sixth row 420, seventh row 422, eighth row 423) and eight columns (first column 426, second column 428, third column 430, fourth column 432, fifth column 434, sixth column 436, seventh column 438, and eight column 440.

Legend 404 indicates than an open circle 406 is used to indicate that a pixel in the image 402 is a white pixel. Legend 404 further indicates that a closed circle 408 is used to indicate that a pixel in the image 402 is a black pixel. In one embodiment, a white pixel corresponds to a first value and a black pixel corresponds to a second value, wherein said second value is different from said first value.

The pixels of image 402 may be represented as values and stored in memory, e.g., stored in memory corresponding to 64 sequential address locations. In one example, the address ordering corresponding to image 402 goes from left to right across the columns of each row, starting with the first row and proceeding row by row. For example, pixel 442 corresponds to address 00 and is represented in memory by the second value which corresponds to a black pixel; pixel 444 corresponds to address 02 and is represented in memory by the second value which corresponds to a black pixel; and pixel 448 corresponds to address 63 and is represented in memory by the first value which corresponds to a white pixel.

FIG. 5 illustrates an image representation in computer memory 500 corresponding to the example 8×8 pixel image 402 of FIG. 4. The memory addresses, corresponding to the image 402 are in the range of address=00 to address=63, and each memory address is shown to have a corresponding pixel value, a first value, corresponding to a white pixel indicated by the open circle symbol or a second value, corresponding to a black pixel indicated by a closed circle. The memory addresses in the range of address=64 to address=71, do not correspond to the image 402, and the corresponding pixel values are shown using the symbol X, indicating don't care.

The values for the first row 410 of pixel image 402 are stored in memory locations corresponding to addresses (00, 01, 02, 03, 04, 05, 06, 07), as shown. The values for the second row 412 of pixel image 402 are stored in memory locations corresponding to addresses (08, 09, 10, 11, 12, 13, 14, 15), as shown. The values for the third row 414 of pixel image 402 are stored in memory locations corresponding to addresses (16, 17, 18, 19, 20, 21, 22, 23), as shown. The values for the fourth row 416 of pixel image 402 are stored in memory locations corresponding to addresses (24, 25, 26, 27, 28, 29, 30, 31), as shown. The values for the fifth row 418 of pixel image 402 are stored in memory locations corresponding to addresses (32, 33, 34, 35, 36, 37, 38, 39), as shown. The values for the sixth row 420 of pixel image 402 are stored in memory locations corresponding to addresses (40, 41, 42, 43, 44, 45, 46, 47), as shown. The values for the seventh row 422 of pixel image 402 are stored in memory locations corresponding to addresses (48, 49, 50, 51, 52, 53, 54, 55), as shown. The values for the eighth row 424 of pixel image 402 are stored in memory locations corresponding to addresses (56, 57, 58, 59, 60, 61, 62, 63), as shown.

Figure 6:
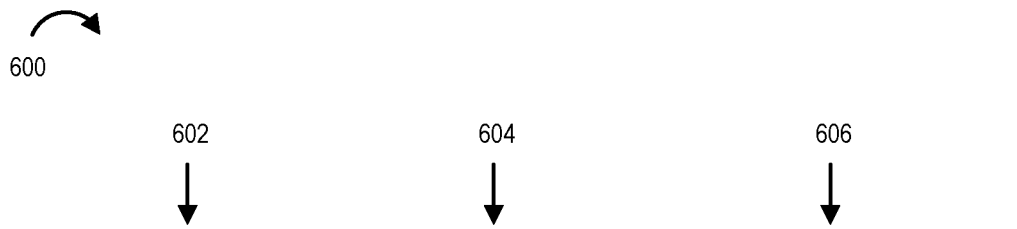
FIG. 6 is a drawing of a memory access comparison table, which compares memory locations which are accessed for an exemplary image using a tradition approach used in vertical run length determinations to memory locations which are accessed for the exemplary image for a novel approach used in vertical run length determinations in accordance with some exemplary embodiments of the present invention.

FIG. 6 is a drawing of a memory access comparison table 600 which compares memory locations which are accessed for an exemplary image using a traditional approach used in vertical run length determinations to memory locations which are accessed for the exemplary image for a novel approach used in vertical run length determination in accordance with an exemplary embodiment of the present invention. First column 602 identifies the iteration through an approach being used. The second column 604 identifies memory locations which are accessed for each iteration for the traditional/naïve approach. The third column 606 identifies memory locations which are accessed for each iteration for the novel approach in accordance with a method of the present invention.

In the traditional approach, each iteration requires large jumps to the next location. In the novel approach memory is accessed sequentially. Sequential memory accesses increase the likelihood that the memory being accessed will be in cache memory.

Figure 10:
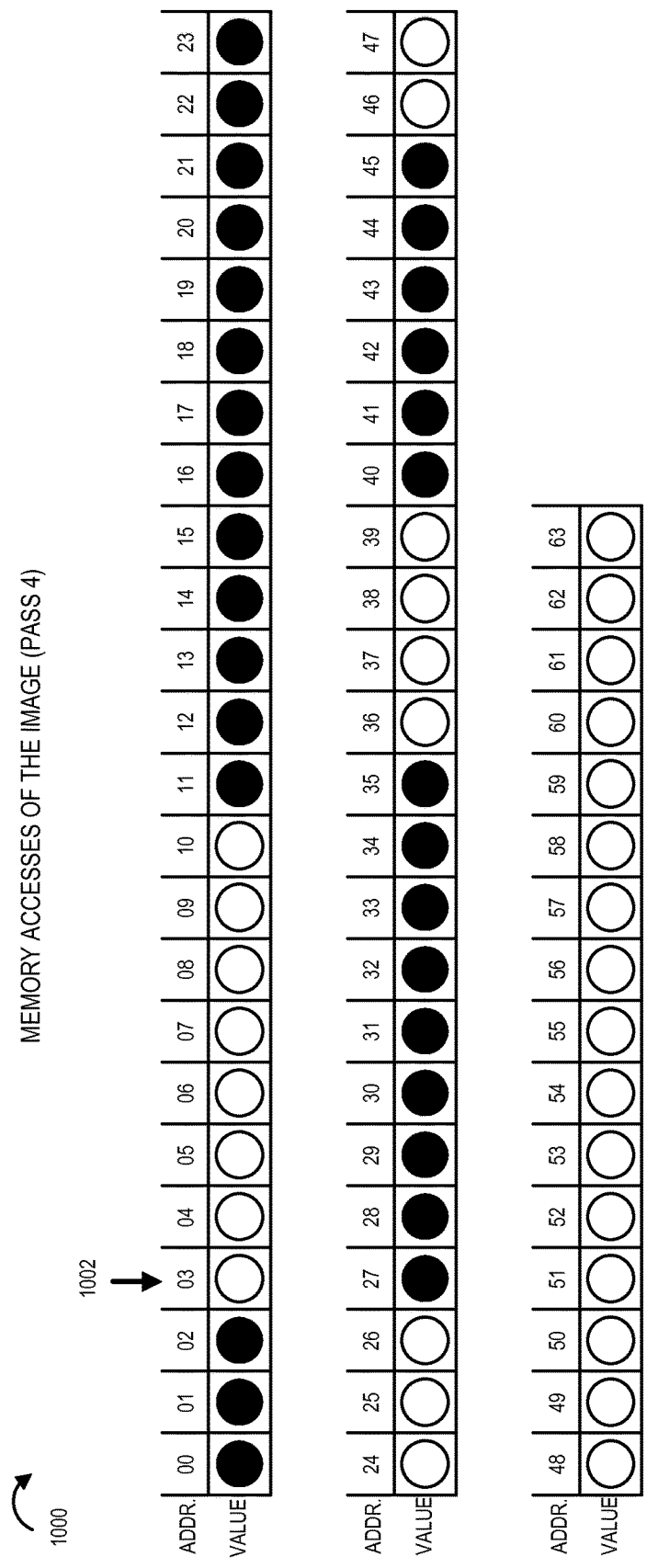
FIG. 10 is a drawing which identifies memory accesses of the exemplary image, corresponding to FIG. 5, for pass 4 using the novel approach.
Figure 13:
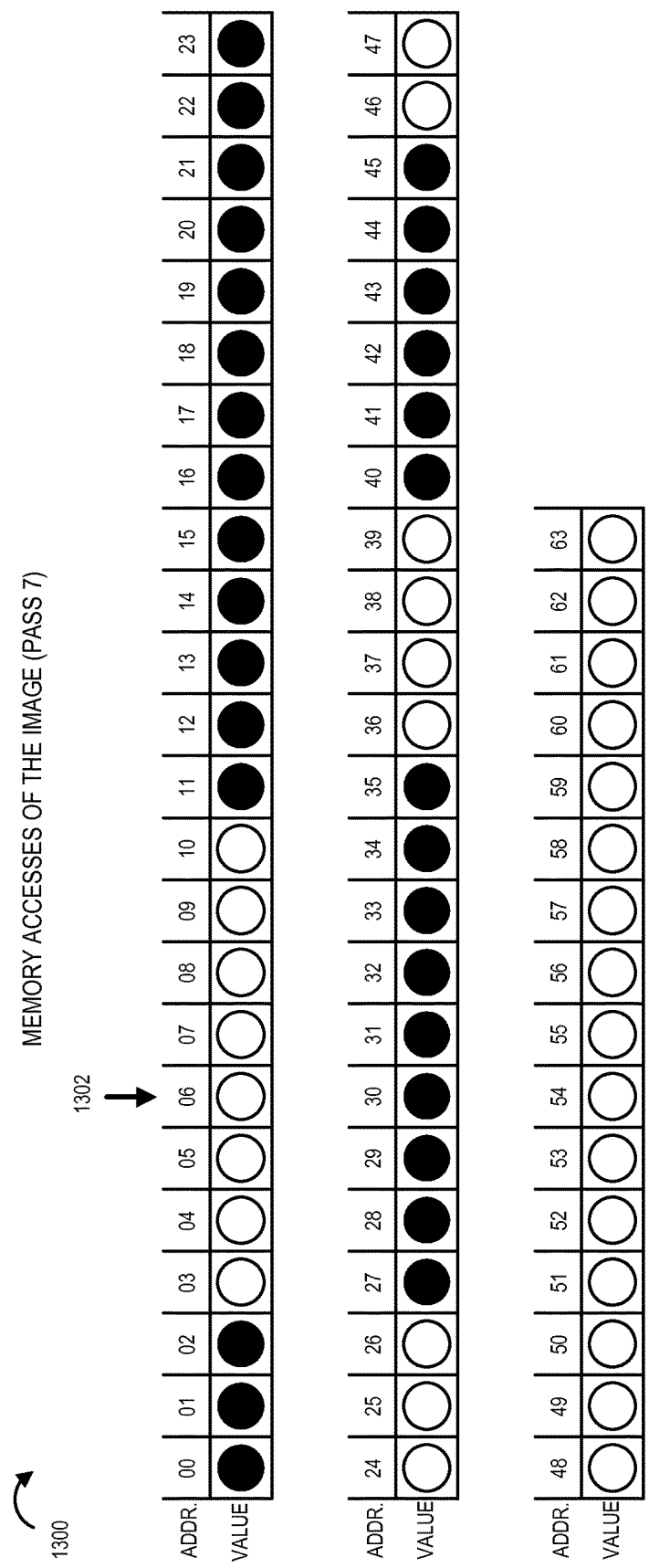
FIG. 13 is a drawing which identifies memory accesses of the exemplary image, corresponding to FIG. 5, for pass 7 using the novel approach.
Figure 14:
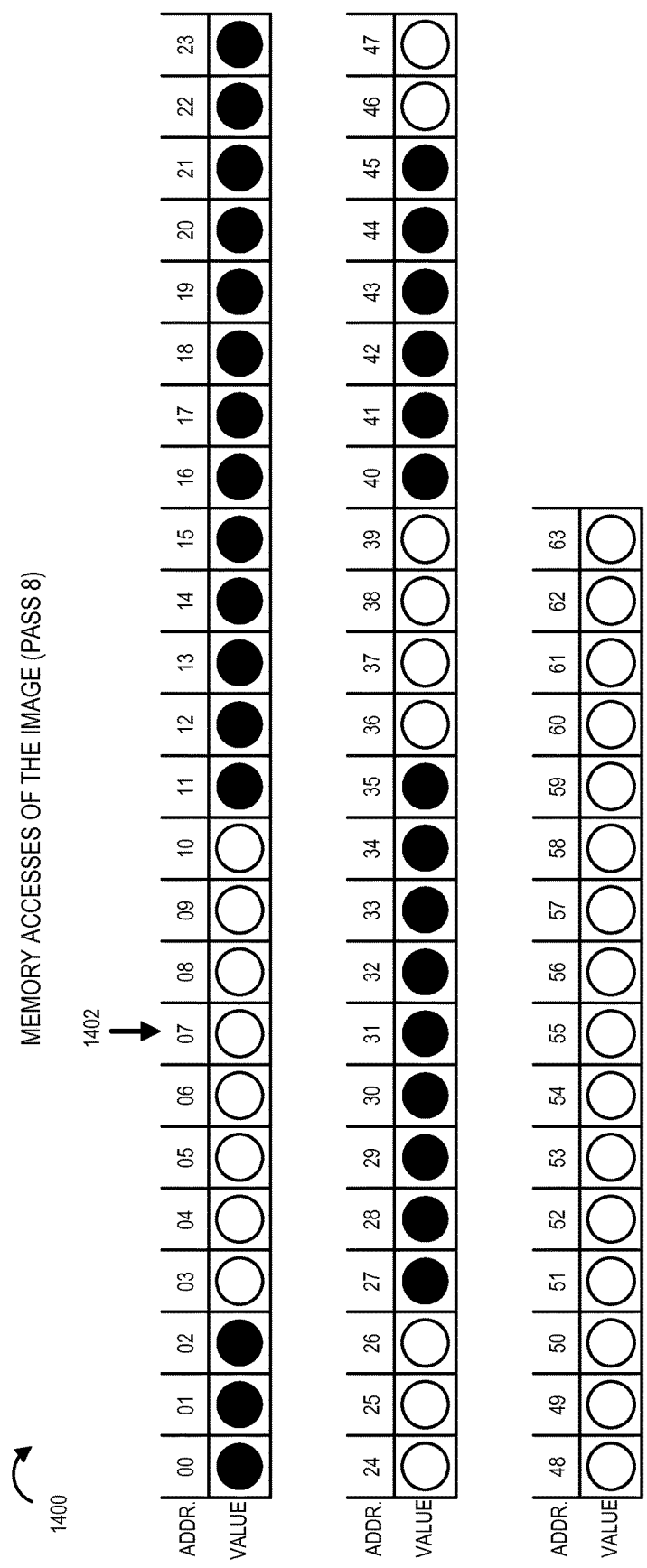
FIG. 14 is a drawing which identifies memory accesses of the exemplary image, corresponding to FIG. 5, for pass 8 using the novel approach.
Figure 15:
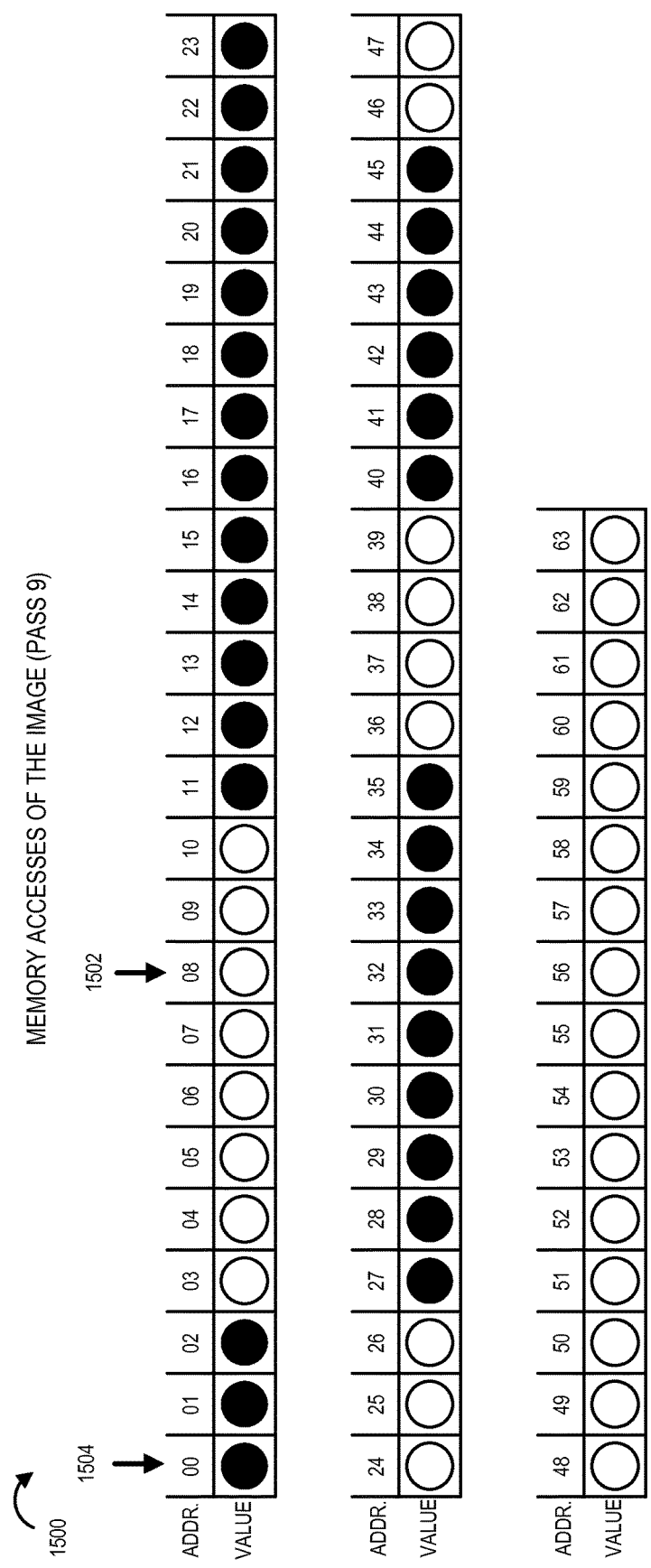
FIG. 15 is a drawing which identifies memory accesses of the exemplary image, corresponding to FIG. 5, for pass 9 using the novel approach.
Figure 17:
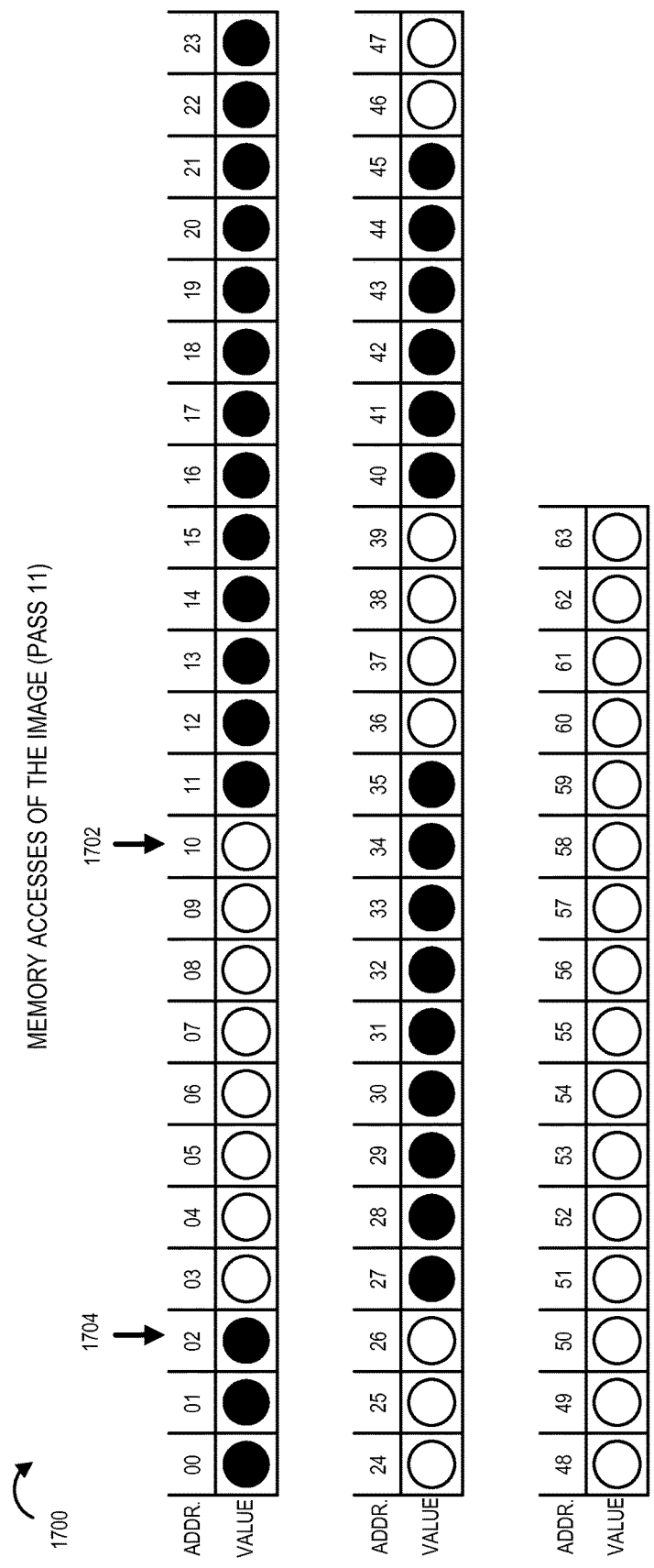
FIG. 17 is a drawing which identifies memory accesses of the exemplary image, corresponding to FIG. 5, for pass 11 using the novel approach.
Figure 18:
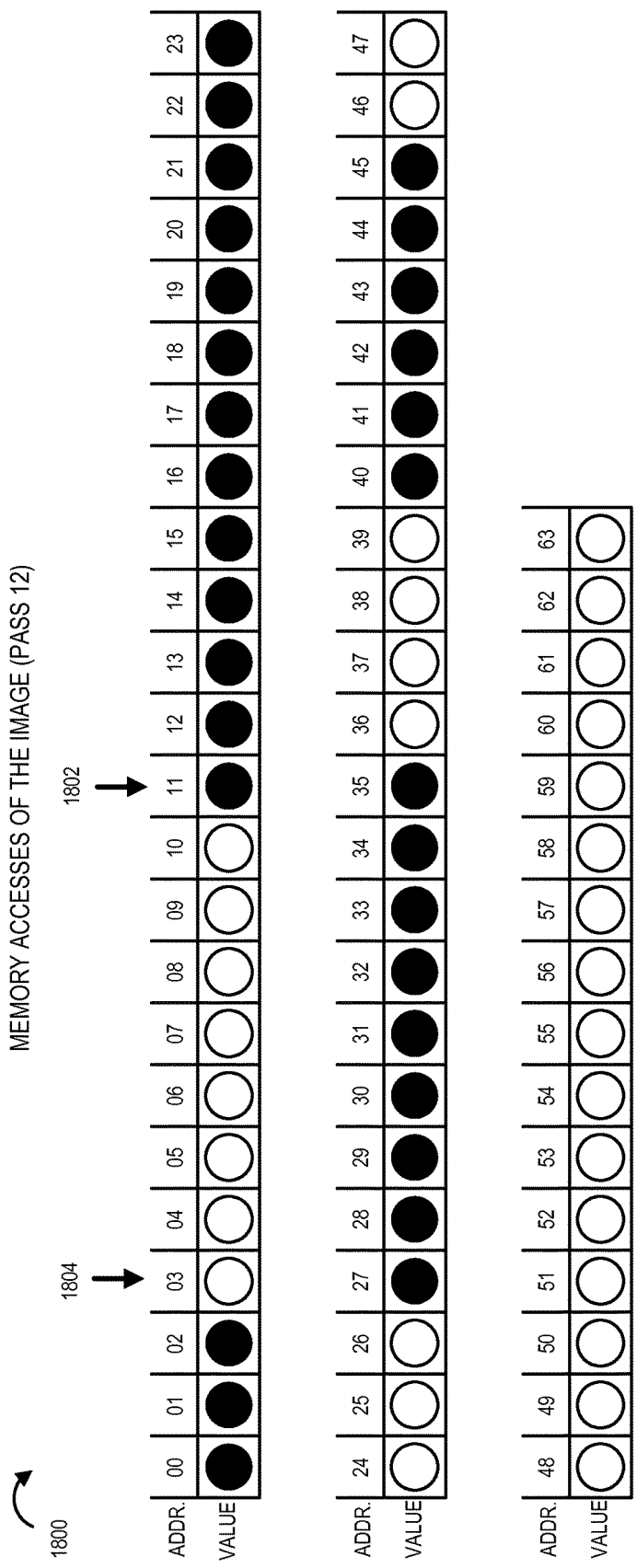
FIG. 18 is a drawing which identifies memory accesses of the exemplary image, corresponding to FIG. 5, for pass 12 using the novel approach.
Figure 19:
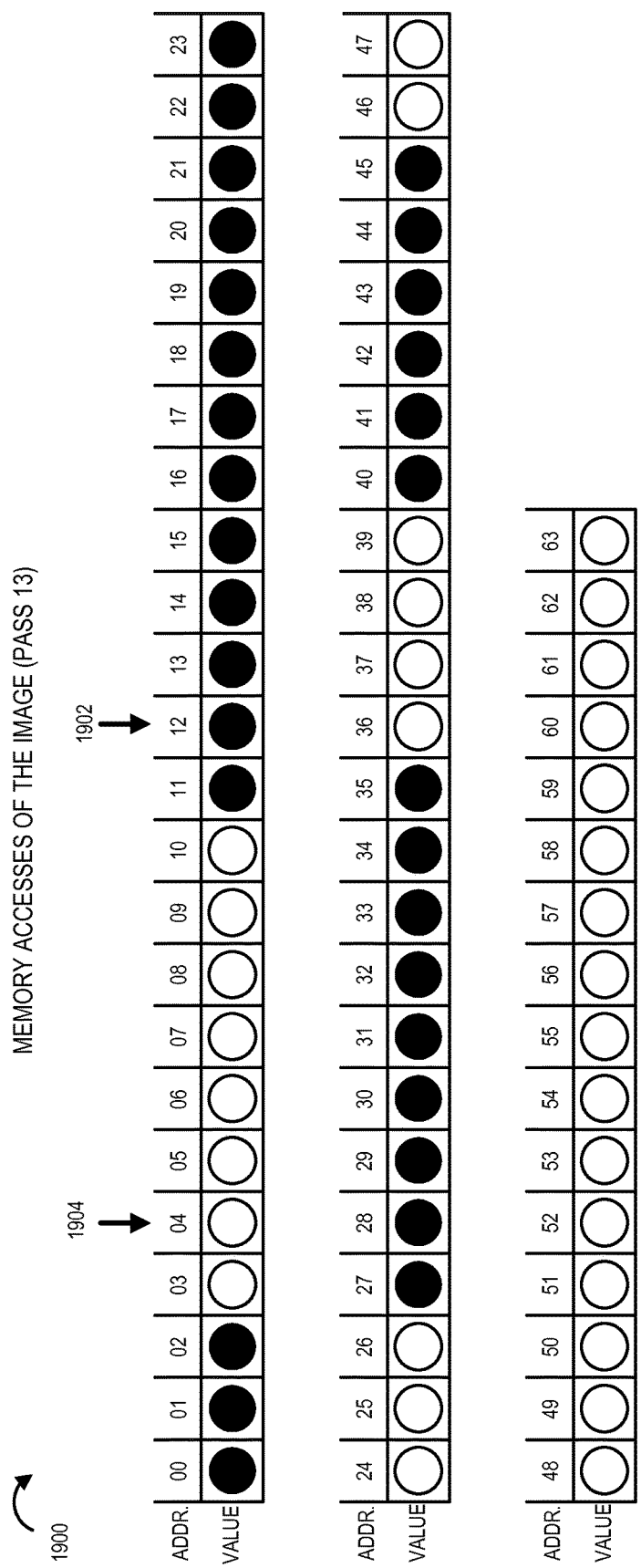
FIG. 19 is a drawing which identifies memory accesses of the exemplary image, corresponding to FIG. 5, for pass 13 using the novel approach.
Figure 20:
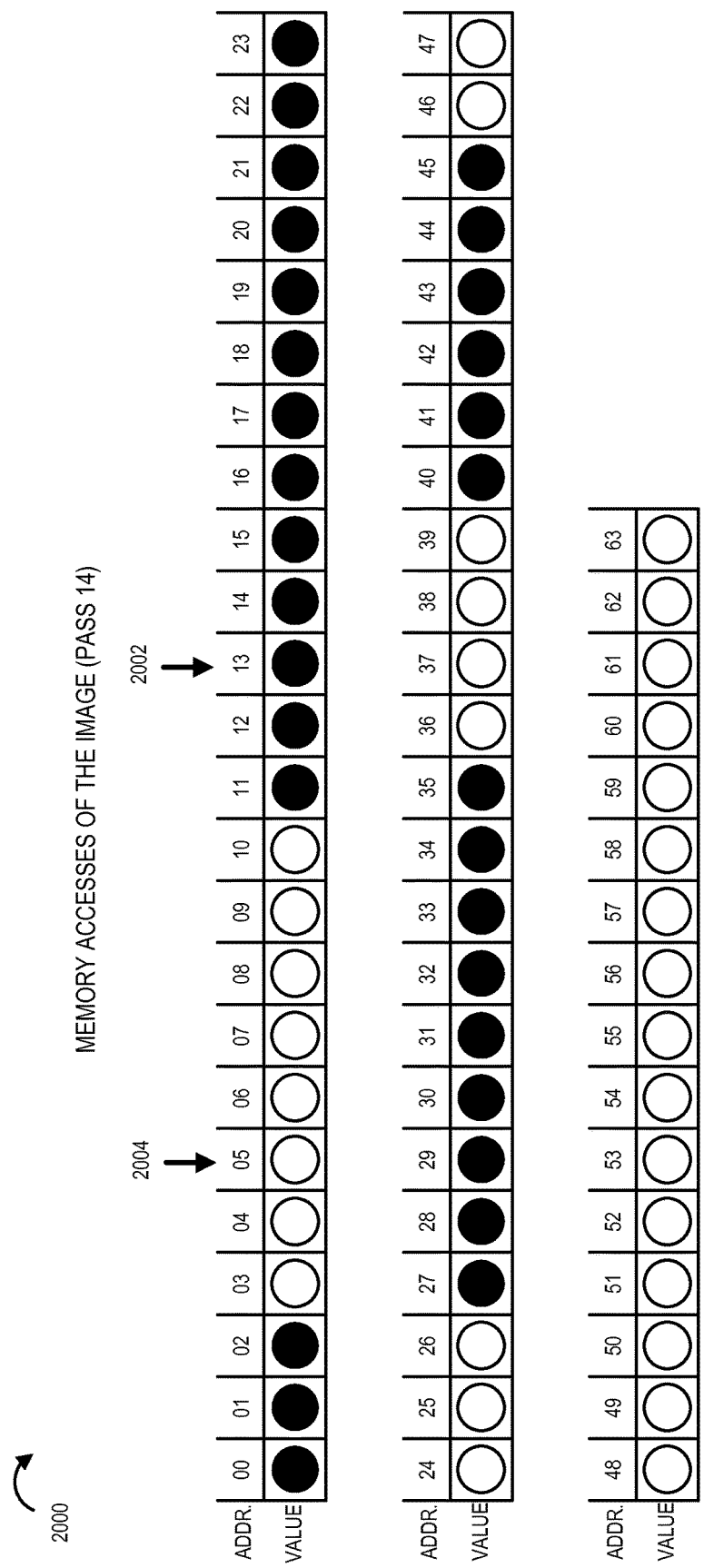
FIG. 20 is a drawing which identifies memory accesses of the exemplary image, corresponding to FIG. 5, for pass 14 using the novel approach.

Drawing 700 of FIG. 7 identifies memory accesses of the exemplary image, corresponding to FIG. 5, for pass 1 using the novel approach. The value corresponding to memory location address=00 is accessed as indicated by arrow 702. Drawing 800 of FIG. 8 identifies memory accesses of the exemplary image, corresponding to FIG. 5, for pass 2 using the novel approach. The value corresponding to memory location address=01 is accessed as indicated by arrow 802. Drawing 900 of FIG. 9 identifies memory accesses of the exemplary image, corresponding to FIG. 5, for pass 3 using the novel approach. The value corresponding to memory location address=02 is accessed as indicated by arrow 902. Drawing 1000 of FIG. 10 identifies memory accesses of the exemplary image, corresponding to FIG. 5, for pass 4 using the novel approach. The value corresponding to memory location address=03 is accessed as indicated by arrow 1002. Drawing 1100 of FIG. 11 identifies memory accesses of the exemplary image, corresponding to FIG. 5, for pass 5 using the novel approach. The value corresponding to memory location address=04 is accessed as indicated by arrow 1102. Drawing 1200 of FIG. 12 identifies memory accesses of the exemplary image, corresponding to FIG. 5, for pass 6 using the novel approach. The value corresponding to memory location address=05 is accessed as indicated by arrow 1202. Drawing 1300 of FIG. 13 identifies memory accesses of the exemplary image, corresponding to FIG. 5, for pass 7 using the novel approach. The value corresponding to memory location address=06 is accessed as indicated by arrow 1302. Drawing 1400 of FIG. 14 identifies memory accesses of the exemplary image, corresponding to FIG. 5, for pass 8 using the novel approach. The value corresponding to memory location address=07 is accessed as indicated by arrow 1402. Drawing 1500 of FIG. 15 identifies memory accesses of the exemplary image, corresponding to FIG. 5, for pass 9 using the novel approach. The value corresponding to memory location address=08 is accessed as indicated by arrow 1502 and the value corresponding to memory location address=00 is accessed as indicated by arrow 1504. Drawing 1600 of FIG. 16 identifies memory accesses of the exemplary image, corresponding to FIG. 5, for pass 10 using the novel approach. The value corresponding to memory location address=09 is accessed as indicated by arrow 1602, and the value corresponding to memory location address=01 is accessed as indicated by arrow 1604. Drawing 1700 of FIG. 17 identifies memory accesses of the exemplary image, corresponding to FIG. 5, for pass 11 using the novel approach. The value corresponding to memory location address=10 is accessed as indicated by arrow 1702 and the value corresponding to memory location address=02 is accessed as indicated by arrow 1704. Drawing 1800 of FIG. 18 identifies memory accesses of the exemplary image, corresponding to FIG. 5, for pass 12 using the novel approach. The value corresponding to memory location address=11 is accessed as indicated by arrow 1802, and the value corresponding to memory location address=03 is accessed as indicated by arrow 1804. Drawing 1900 of FIG. 19 identifies memory accesses of the exemplary image, corresponding to FIG. 5, for pass 13 using the novel approach. The value corresponding to memory location address=12 is accessed as indicated by arrow 1902 and the value corresponding to memory location address=04 is accessed as indicated by arrow 1904. Drawing 2000 of FIG. 20 identifies memory accesses of the exemplary image, corresponding to FIG. 5, for pass 14 using the novel approach. The value corresponding to memory location address=13 is accessed as indicated by arrow 2002, and the value corresponding to memory location address=05 is accessed as indicated by arrow 2004. The accessing of memory continues in a similar fashion, e.g., with the last pair being accessed corresponding to memory location address=63 and corresponding to memory location address=55.

Bitmaps are organized in memory in a horizontal fashion. It is desirable to organize pixel reads as close to a horizontal manner as possible, to increase spatial locality. In accordance with a feature of various embodiments of the present invention, pixel reads are intentionally organized close to a horizontal manner, to increase spatial locality. FIG. 21 includes a drawing 2102 which illustrates 64 memory addresses (00, 01, 02, . . . 63) mapping to the 64 corresponding pixels of an exemplary 8×8 pixel image, a drawing 2104 illustrating exemplary pixel values of the exemplary 8×8 pixel image, and a corresponding legend 2106. Legend 2106 indicates that an open circle 2108 represents a white pixel, e.g., with pixel value=0, and that a closed circle 2110 represents a black pixel, e.g., with a pixel value=1. In drawings (2102 and 2104) Y values 2112 represent row index values in the image. The set of row index values in the exemplary image={0, 1, 2, 3, 4, 5, 6, 7}. In drawings (2102 and 2104) X values 2114 represent column index values in the image. The set of column index values in the exemplary image={0, 1, 2, 3, 4, 5, 6, 7}.

FIGS. 22-38 illustrate an example of processing the exemplary image of FIG. 21 in accordance with an exemplary embodiment, e.g., implementing the method of flowchart 100 of FIG. 1, to obtain vertical run length information in an efficient manner.

Figure 22:
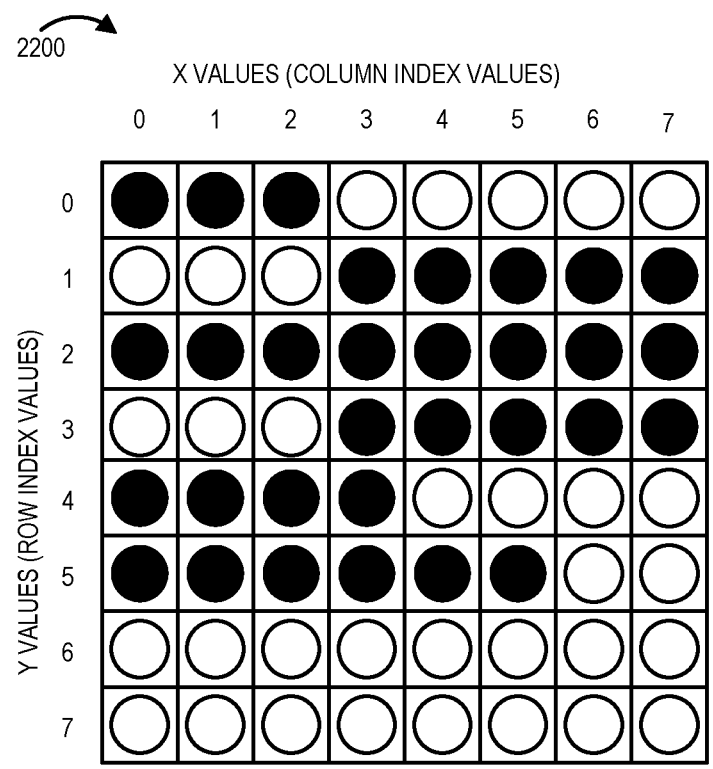
FIG. 22 includes an exemplary pixel image and a corresponding initialized Run Length Encoding (RLE) information list, in accordance with an exemplary embodiment.
Figure 22:
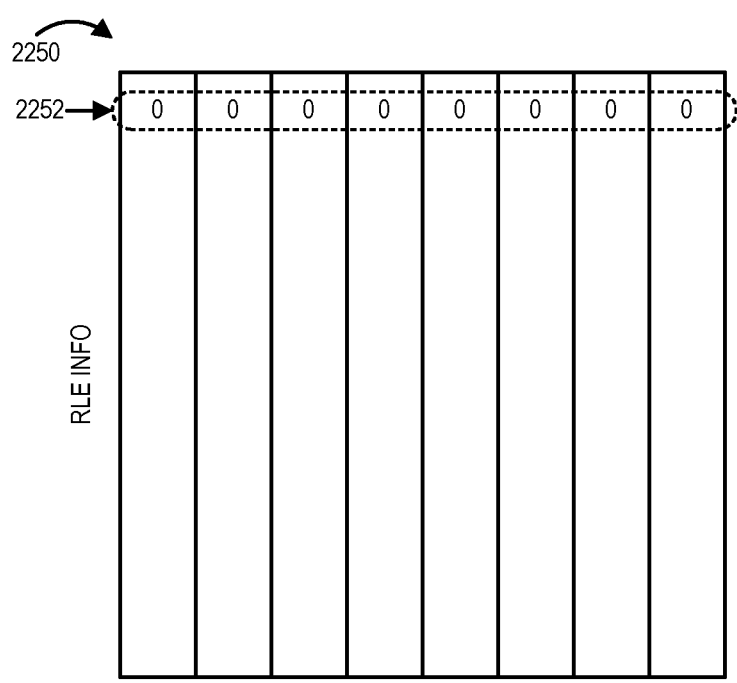

FIG. 22 includes an exemplary 8×8 pixel image and a corresponding RLE information list 2250. Each column of the RLE list info list is initialized to 0, as indicated by the initialized values shown in 2252.

Figure 23:
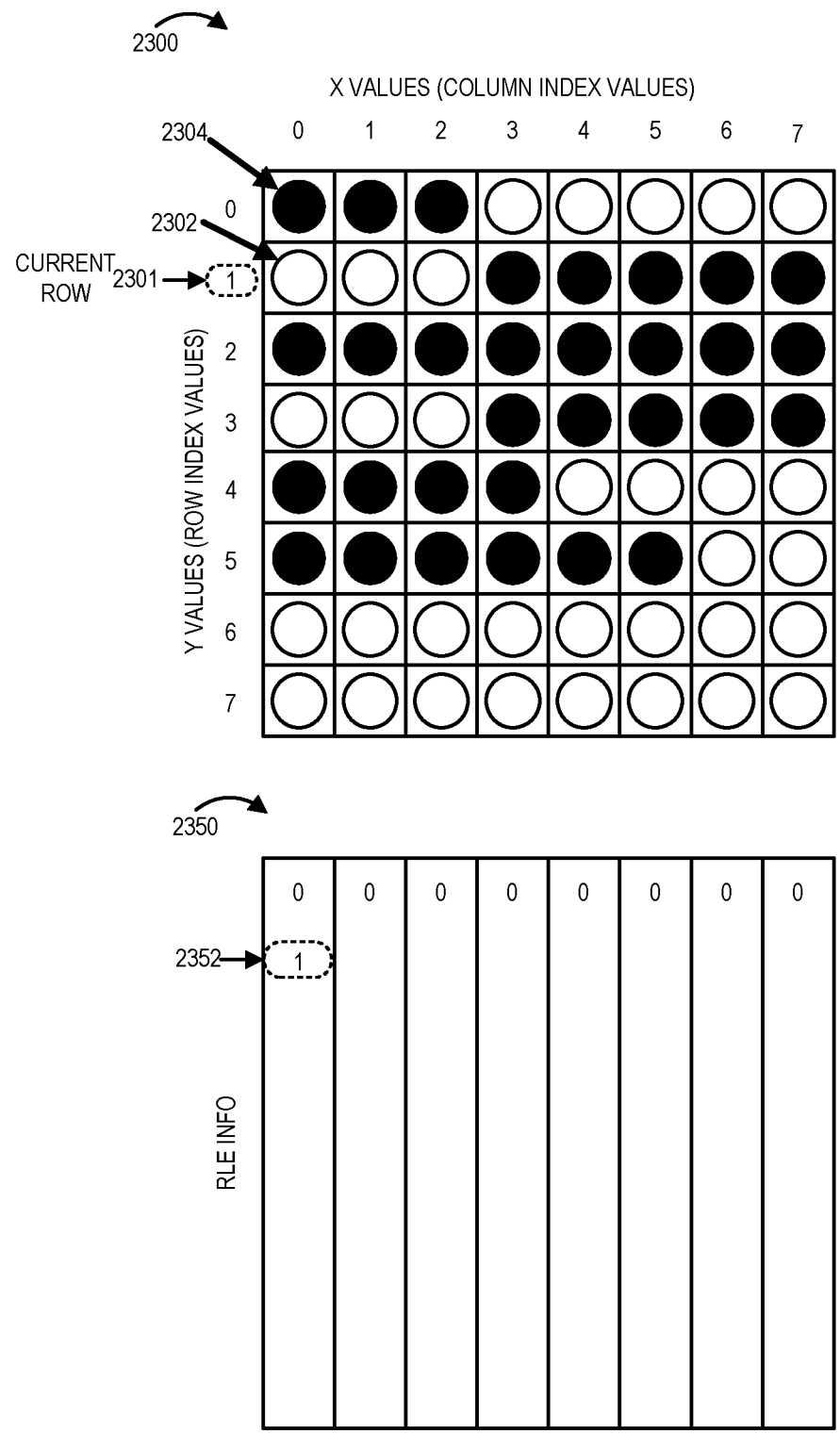
FIG. 23 includes an exemplary pixel image, memory access information, and a corresponding updated Run Length Encoding (RLE) information list, resulting from row 1 column 1 processing, in accordance with an exemplary embodiment.

FIG. 23 includes the exemplary 8×8 pixel image 2300, identifying memory accesses, and a corresponding updated RLE information list 2350. The current row is row with index number=1, as shown in 2301. The pixel value corresponding to memory address=8 is read, as indicated by arrow 2302; the pixel value corresponding to memory address=0 is read as indicated by arrow 2304, and the two values are compared. Because the comparison determines that the pixel value for address=8 is different from the pixel value for address=0, the current row index value, which is 1, is appended to the RLE information list for column 0, as shown in 2352.

Figure 24:
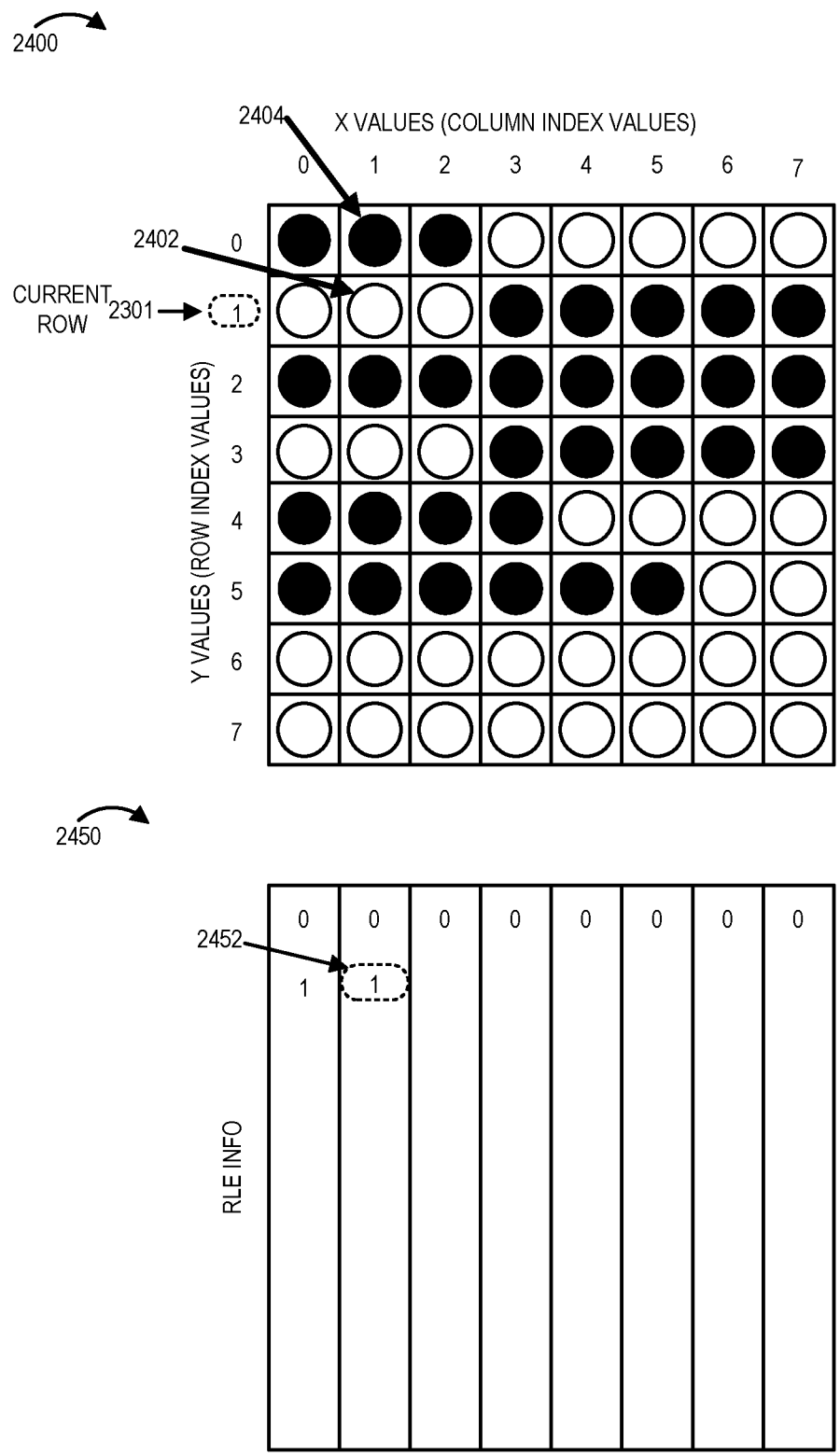
FIG. 24 includes an exemplary pixel image, memory access information, and a corresponding updated RLE information list, in accordance with an exemplary embodiment.

FIG. 24 includes the exemplary 8×8 pixel image 2400, identifying memory accesses, and a corresponding updated RLE information list 2450. The current row is row with index number=1, as shown in 2301. The pixel value corresponding to memory address=9 is read, as indicated by arrow 2402; the pixel value corresponding to memory address=1 is read as indicated by arrow 2404, and the two values are compared. Because the comparison determines that the pixel value for address=9 is different from the pixel value for address=1, the current row index value, which is 1, is appended to the RLE information list for column 1, as shown in 2452.

Figure 25:
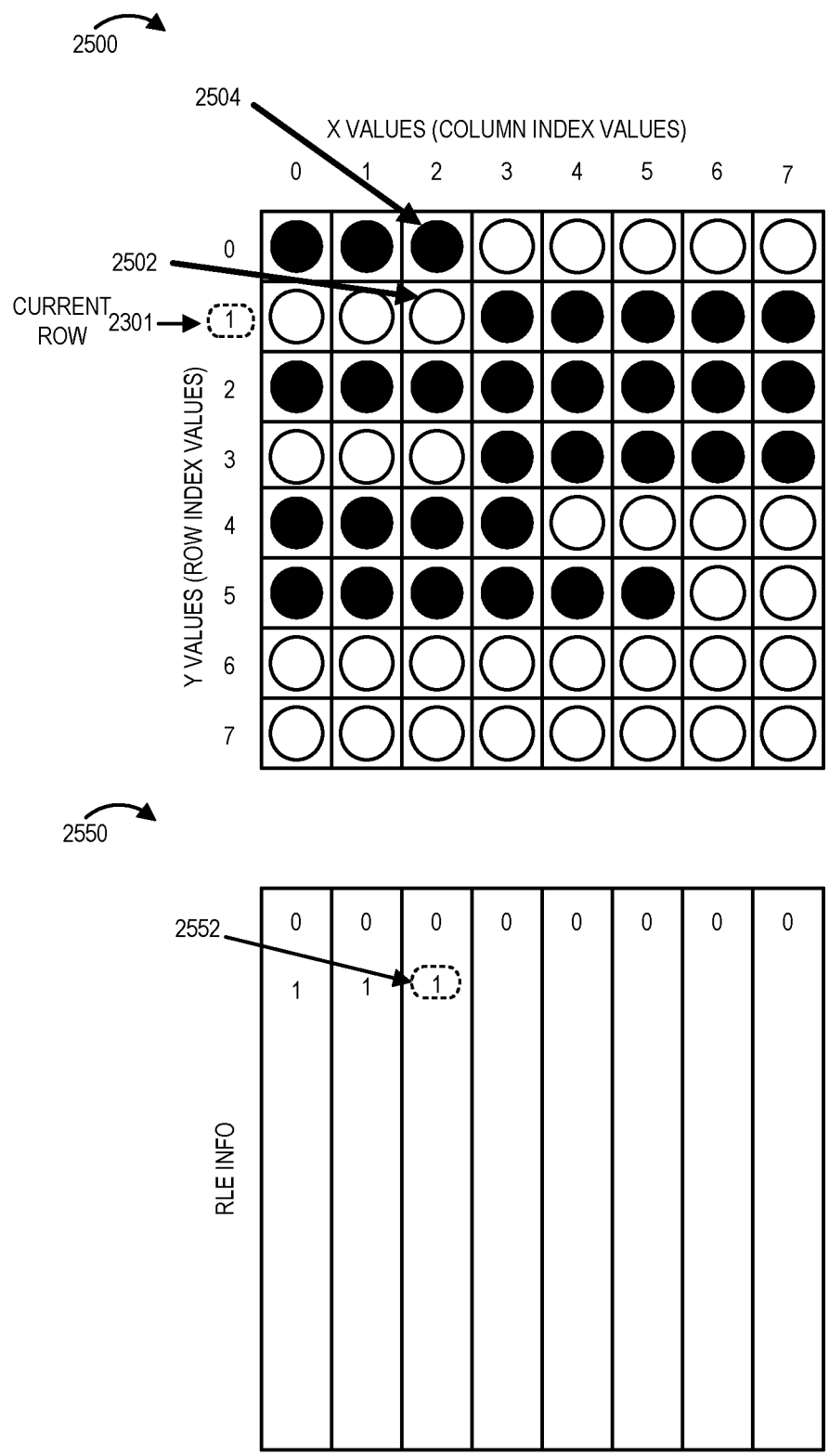
FIG. 25 includes an exemplary pixel image, memory access information, and a corresponding updated RLE information list, in accordance with an exemplary embodiment.

FIG. 25 includes the exemplary 8×8 pixel image 2500, identifying memory accesses, and a corresponding updated RLE information list 2550. The current row is row with index number=1, as shown in 2301. The pixel value corresponding to memory address=10 is read, as indicated by arrow 2502; the pixel value corresponding to memory address=2 is read as indicated by arrow 2504, and the two values are compared. Because the comparison determines that the pixel value for address=10 is different from the pixel value for address=2, the current row index value, which is 1, is appended to the RLE information list for column 2, as shown in 2552.

Figure 26:
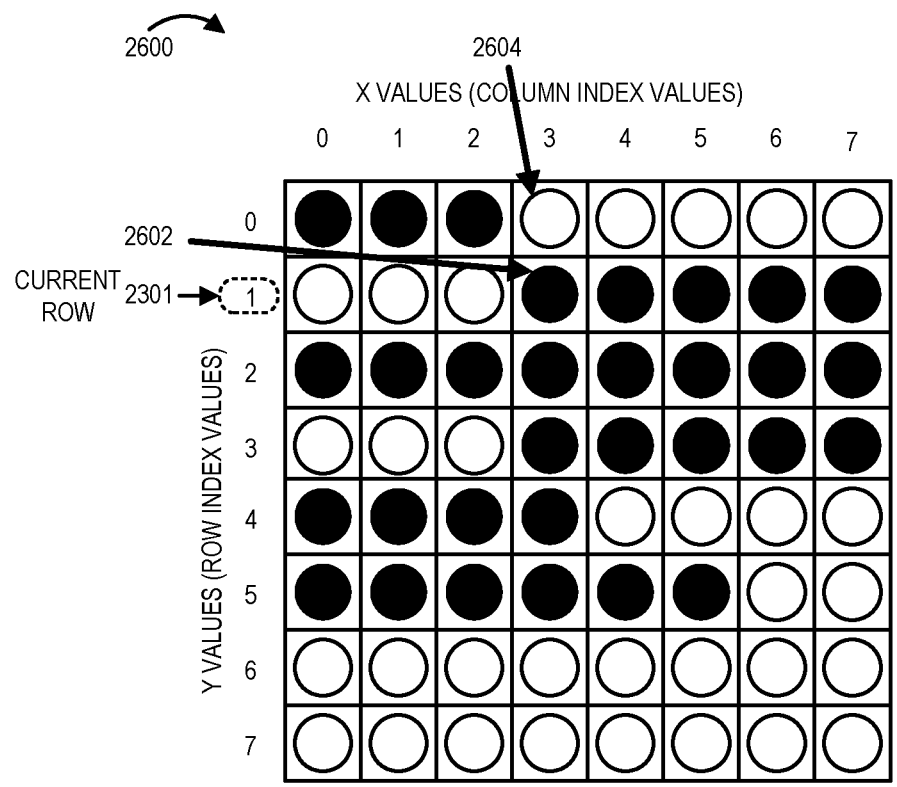
FIG. 26 includes an exemplary pixel image, memory access information, and a corresponding updated RLE information list, in accordance with an exemplary embodiment.
Figure 26:
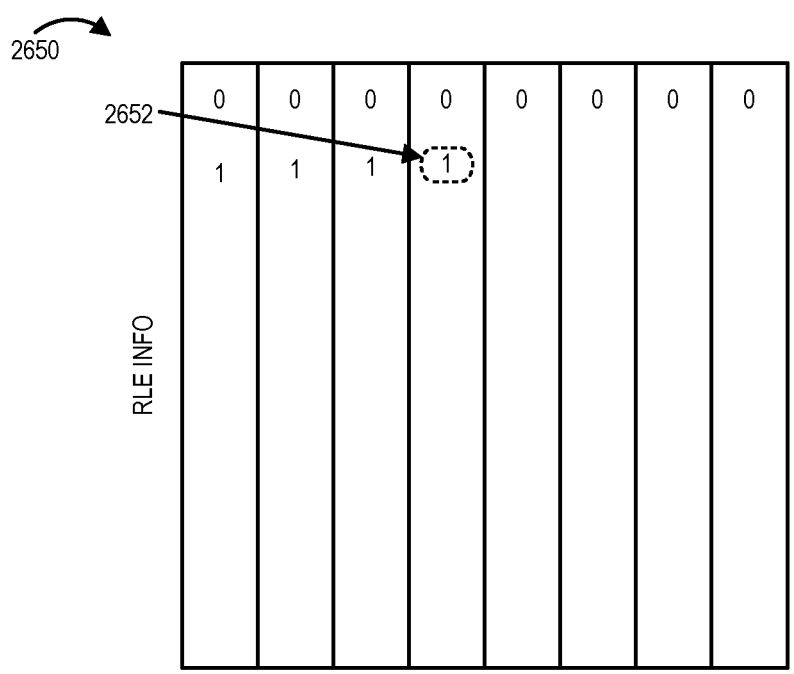

FIG. 26 includes the exemplary 8×8 pixel image 2600, identifying memory accesses, and a corresponding updated RLE information list 2650. The current row is row with index number=1, as shown in 2301. The pixel value corresponding to memory address=11 is read, as indicated by arrow 2602; the pixel value corresponding to memory address=3 is read as indicated by arrow 2604, and the two values are compared. Because the comparison determines that the pixel value for address=11 is different from the pixel value for address=3, the current row index value, which is 1, is appended to the RLE information list for column 3, as shown in 2652.

Figure 27:
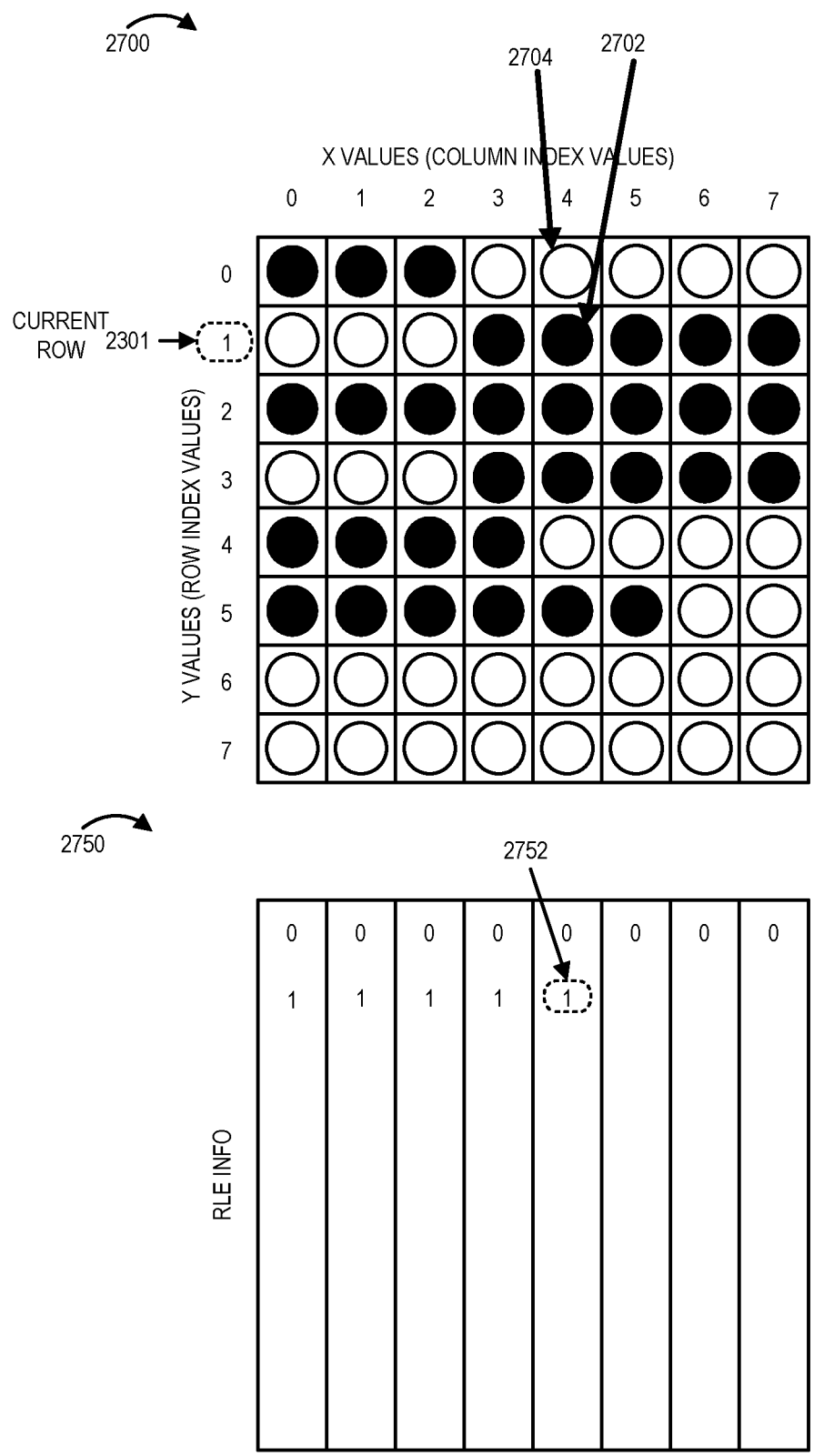
FIG. 27 includes an exemplary pixel image, memory access information, and a corresponding updated RLE information list, in accordance with an exemplary embodiment.

FIG. 27 includes the exemplary 8×8 pixel image 2700, identifying memory accesses, and a corresponding updated RLE information list 2750. The current row is row with index number=1, as shown in 2301. The pixel value corresponding to memory address=12 is read, as indicated by arrow 2702; the pixel value corresponding to memory address=4 is read as indicated by arrow 2704, and the two values are compared. Because the comparison determines that the pixel value for address=12 is different from the pixel value for address=4, the current row index value, which is 1, is appended to the RLE information list for column 4, as shown in 2752.

Figure 28:
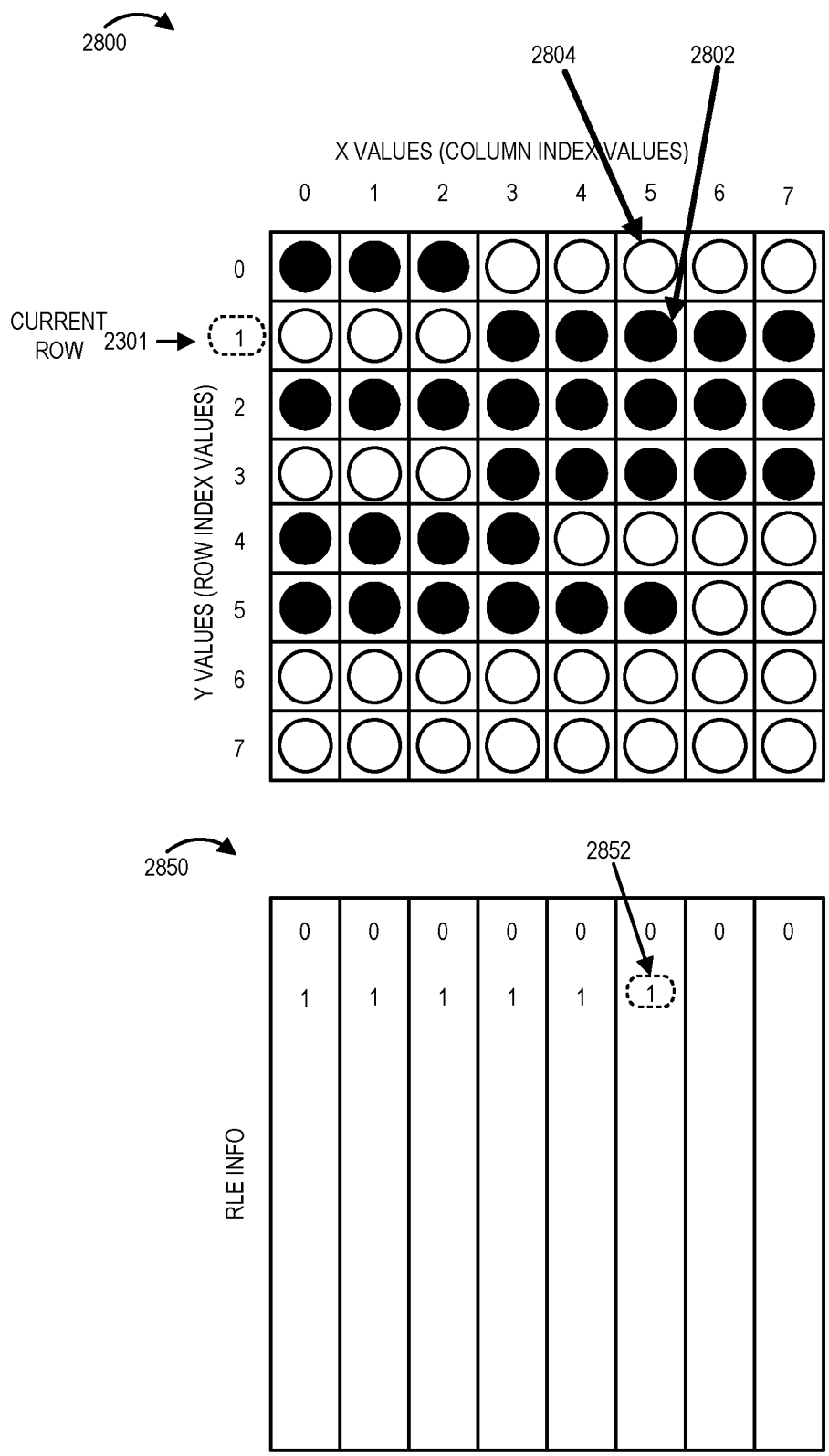
FIG. 28 includes an exemplary pixel image, memory access information, and a corresponding updated RLE information list, in accordance with an exemplary embodiment.

FIG. 28 includes the exemplary 8×8 pixel image 2800, identifying memory accesses, and a corresponding updated RLE information list 2850. The current row is row with index number=1, as shown in 2301. The pixel value corresponding to memory address=13 is read, as indicated by arrow 2802; the pixel value corresponding to memory address=5 is read as indicated by arrow 2804, and the two values are compared. Because the comparison determines that the pixel value for address=13 is different from the pixel value for address=5, the current row index value, which is 1, is appended to the RLE information list for column 5, as shown in 2852.

Figure 29:
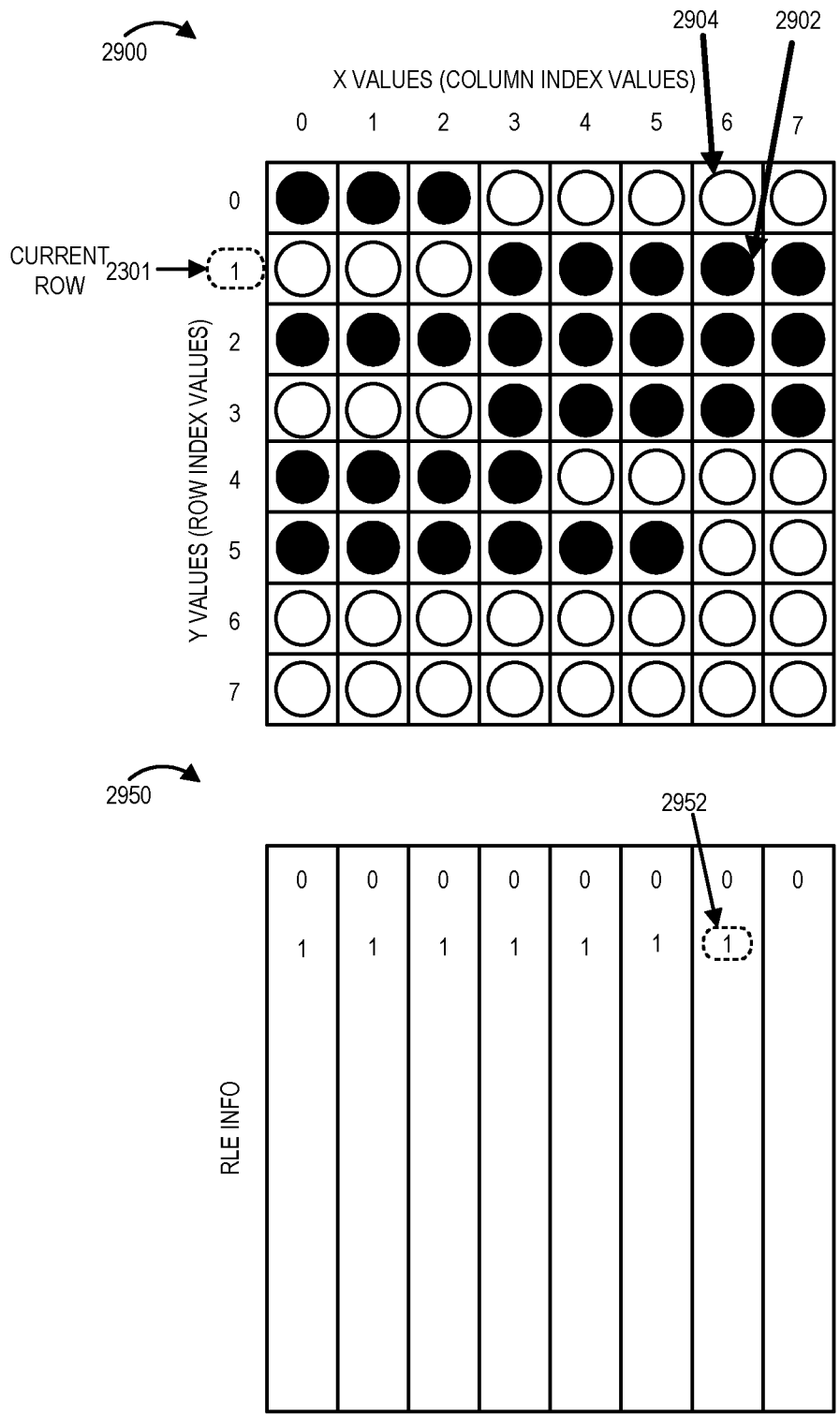
FIG. 29 includes an exemplary pixel image, memory access information, and a corresponding updated RLE information list, in accordance with an exemplary embodiment.

FIG. 29 includes the exemplary 8×8 pixel image 2900, identifying memory accesses, and a corresponding updated RLE information list 2950. The current row is row with index number=1, as shown in 2301. The pixel value corresponding to memory address=14 is read, as indicated by arrow 2902; the pixel value corresponding to memory address=6 is read as indicated by arrow 2904, and the two values are compared. Because the comparison determines that the pixel value for address=14 is different from the pixel value for address=6, the current row index value, which is 1, is appended to the RLE information list for column 6, as shown in 2952.

Figure 30:
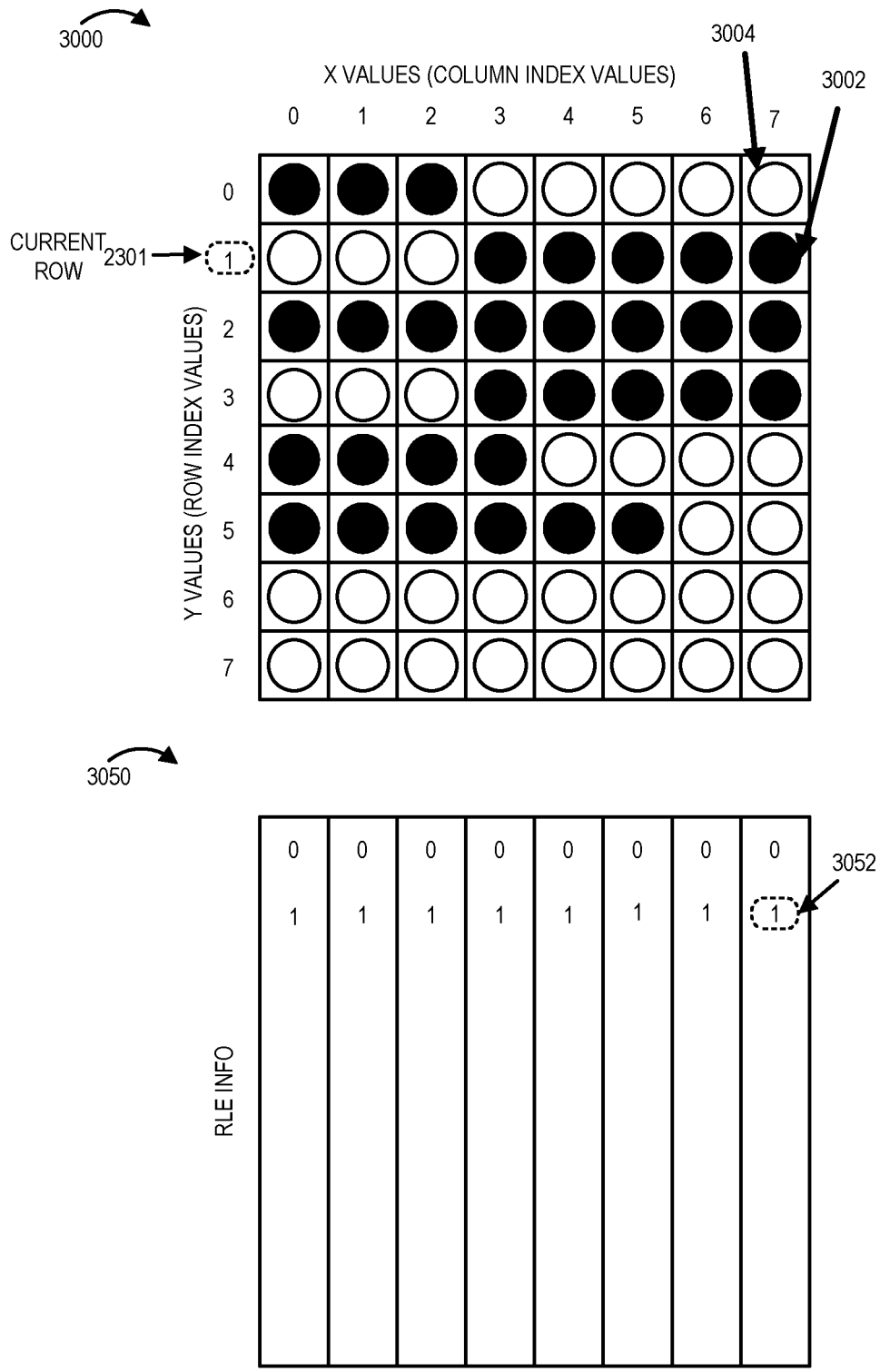
FIG. 30 includes an exemplary pixel image, memory access information, and a corresponding updated RLE information list, in accordance with an exemplary embodiment.

FIG. 30 includes the exemplary 8×8 pixel image 3000, identifying memory accesses, and a corresponding updated RLE information list 3050. The current row is row with index number=1, as shown in 2301. The pixel value corresponding to memory address=15 is read, as indicated by arrow 3002; the pixel value corresponding to memory address=7 is read as indicated by arrow 3004, and the two values are compared. Because the comparison determines that the pixel value for address=15 is different from the pixel value for address=7, the current row index value, which is 1, is appended to the RLE information list for column 7, as shown in 3052.

Figure 31:
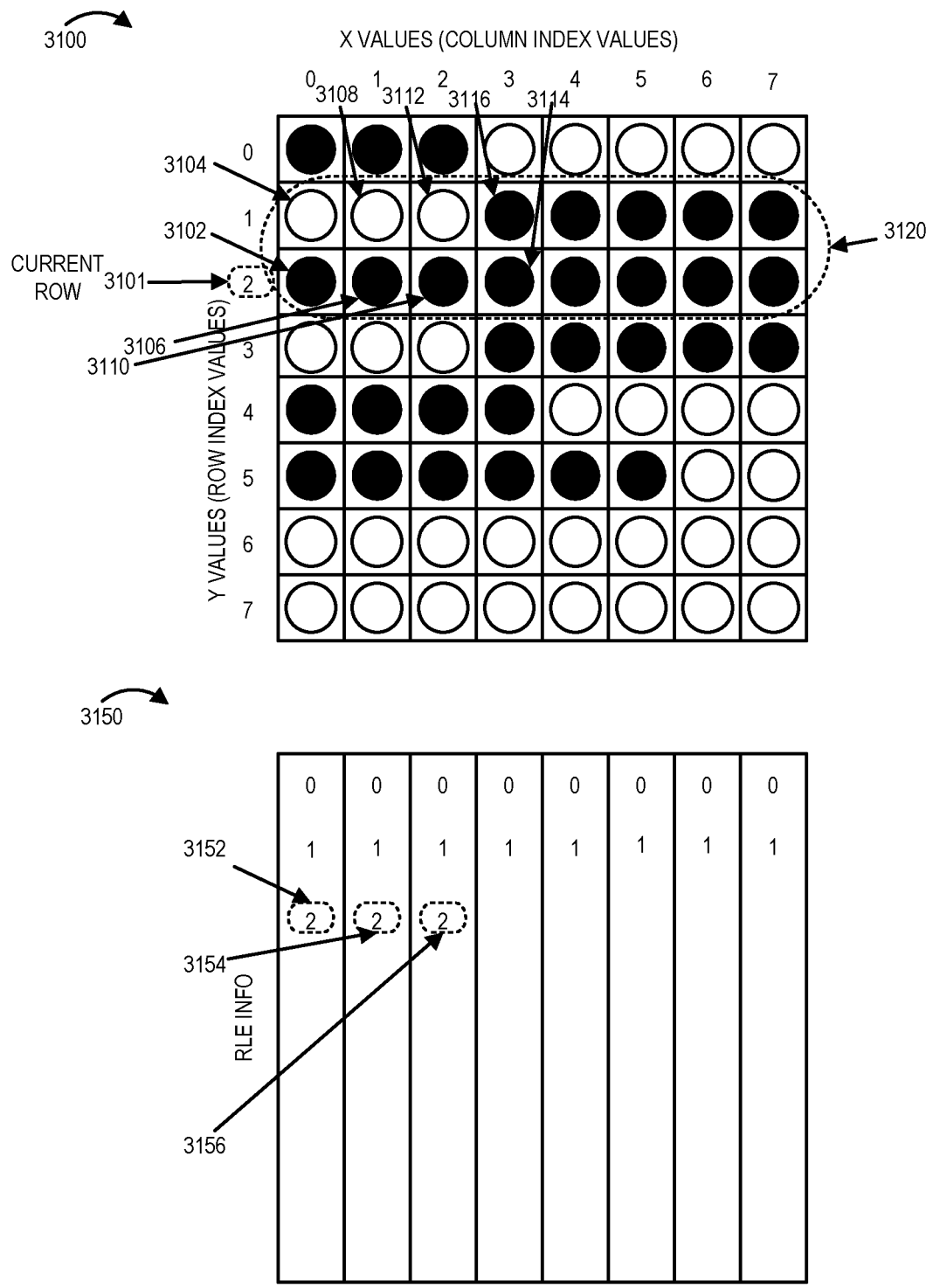
FIG. 31 includes an exemplary pixel image, memory access information, and a corresponding updated RLE information list in accordance with an exemplary embodiment.

FIG. 31 includes the exemplary 8×8 pixel image 3100, identifying memory accesses, and a corresponding updated RLE information list 3150. The current row is row with index number=2, as shown in 3101. While the exemplary method still processes things one pixel at a time, for the purpose of brevity, FIG. 31 shows one row worth of processing at once, i.e., processing for current row=2 which compares values in row 2 to values in row 1, as indicated by 3120.

The pixel value corresponding to memory address=16 is read, as indicated by arrow 3102; the pixel value corresponding to memory address=8 is read as indicated by arrow 3104, and the two values are compared. Because the comparison determines that the pixel value for address=16 is different from the pixel value for address=8, the current row index value, which is 2, is appended to the RLE information list for column 0, as shown in 3152. The pixel value corresponding to memory address=17 is read, as indicated by arrow 3106; the pixel value corresponding to memory address=9 is read as indicated by arrow 3108, and the two values are compared. Because the comparison determines that the pixel value for address=17 is different from the pixel value for address=9, the current row index value, which is 2, is appended to the RLE information list for column 1, as shown in 3154. The pixel value corresponding to memory address=18 is read, as indicated by arrow 3110; the pixel value corresponding to memory address=10 is read as indicated by arrow 3112, and the two values are compared. Because the comparison determines that the pixel value for address=18 is different from the pixel value for address=10, the current row index value, which is 2, is appended to the RLE information list for column 2, as shown in 3156.

The pixel value corresponding to memory address=19 is read, as indicated by arrow 3114; the pixel value corresponding to memory address=11 is read as indicated by arrow 3116, and the two values are compared. Because the comparison determines that the pixel value for address=19 is the same as the pixel value for address=11, no action is taken regarding updating the RLE information list for column 3.

The pixel value corresponding to memory address=20 is read; the pixel value corresponding to memory address=12 is read, and the two values are compared. Because the comparison determines that the pixel value for address=20 is the same as the pixel value for address=12, no action is taken regarding updating the RLE information list for column 4.

The pixel value corresponding to memory address=21 is read; the pixel value corresponding to memory address=13 is read, and the two values are compared. Because the comparison determines that the pixel value for address=21 is the same as the pixel value for address=13, no action is taken regarding updating the RLE information list for column 5.

The pixel value corresponding to memory address=22 is read; the pixel value corresponding to memory address=14 is read, and the two values are compared. Because the comparison determines that the pixel value for address=22 is the same as the pixel value for address=14, no action is taken regarding updating the RLE information list for column 6.

The pixel value corresponding to memory address=23 is read; the pixel value corresponding to memory address=15 is read, and the two values are compared. Because the comparison determines that the pixel value for address=23 is the same as the pixel value for address=15, no action is taken regarding updating the RLE information list for column 7.

The comparisons for each of columns (0, 1 and 2) determined that the compared pixel values were different; so the current row index number, 2, was appended to the RLE information list for those columns (0, 1, and 2). The comparisons for each of columns (3, 4, 5, 6, and 7) determined that the pixel values were the same; so no action was taken with regard to appending the RLE information list for those columns (3, 4, 5, 6, and 7).

Figure 32:
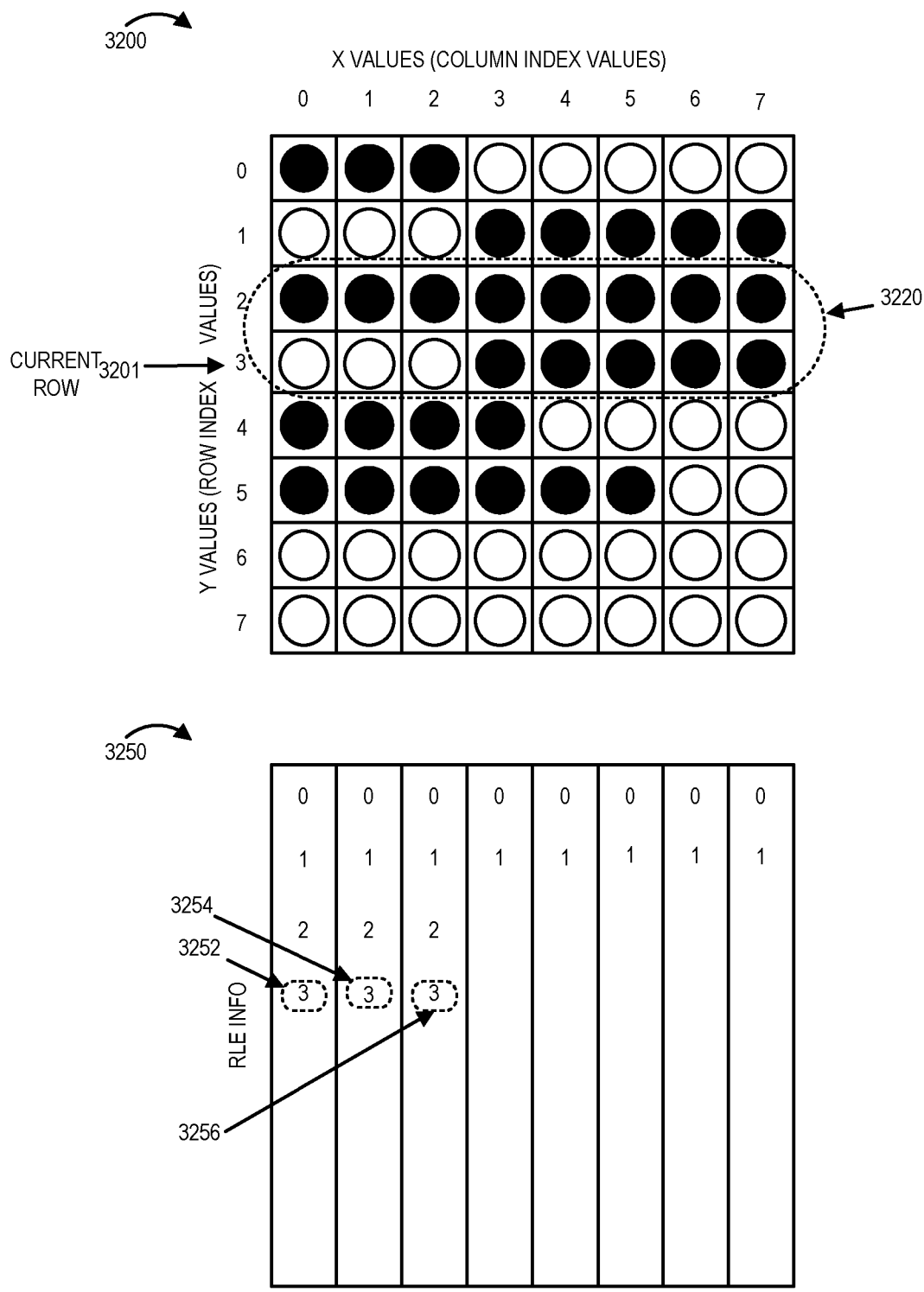
FIG. 32 includes an exemplary pixel image, memory access information, and a corresponding updated RLE information list in accordance with an exemplary embodiment.

FIG. 32 includes the exemplary 8×8 pixel image 3200, identifying memory accesses, and a corresponding updated RLE information list 3250. The current row is row with index number=3, as shown in 3201. While the exemplary method still processes things one pixel at a time, for the purpose of brevity, FIG. 32 shows one row worth of processing at once, i.e., processing for current row=3 which compares values in row 3 to values in row 2, as indicated by 3320. The accessing of memory and comparisons of values is performed in the same manner as previously described.

The comparisons for each of columns (0, 1, and 2) determine that the pixel values being compared are different; so the current row index number, 3, is appended to the RLE information list for those columns (0, 1, and 2), as indicated by 3252. 3254 and 3256. The comparisons for each of columns (3, 4, 5, 6, and 7) determined that the pixel values were the same; so no action was taken with regard to appending the RLE information list for those columns (3, 4, 5, 6, and 7).

Figure 33:
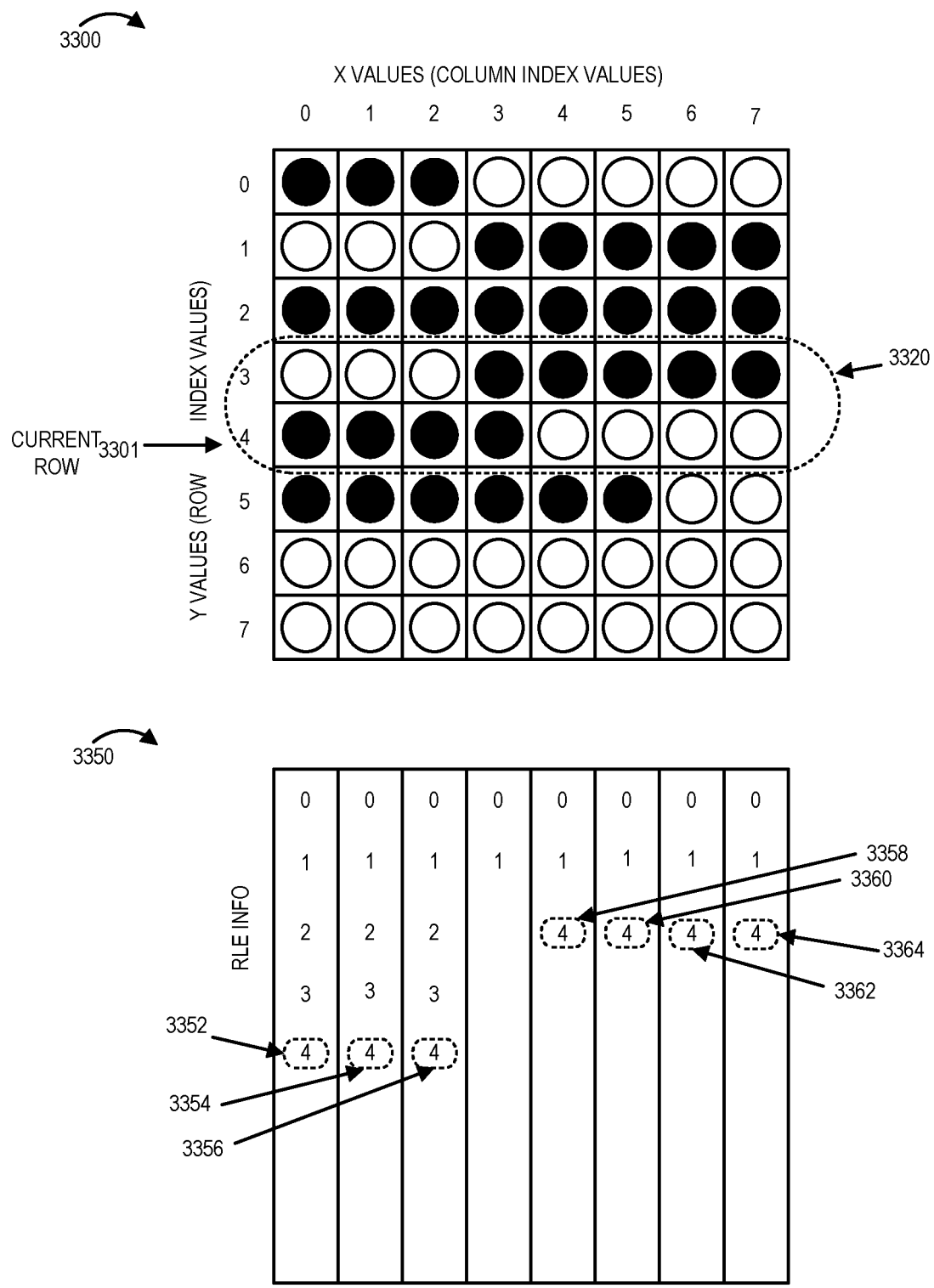
FIG. 33 includes an exemplary pixel image, memory access information, and a corresponding updated RLE information list in accordance with an exemplary embodiment.

FIG. 33 includes the exemplary 8×8 pixel image 3300, identifying memory accesses, and a corresponding updated RLE information list 3350. The current row is row with index number=4, as shown in 3301. While the exemplary method still processes things one pixel at a time, for the purpose of brevity, FIG. 33 shows one row worth of processing at once, i.e., processing for current row=4 which compares values in row 4 to values in row 3, as indicated by 3320. The accessing of memory and comparisons of values is performed in the same manner as previously described.

The comparisons for each of columns (0, 1, 2, 4, 5, 6 and 7) determine that the pixel values being compared are different; so the current row index number, 4, is appended to the RLE information list for those columns (0, 1, 2, 4, 5, 6, and 7), as indicated by (3352, 3354, 3356, 3358, 3360, 3362, and 3364). The comparison for columns 3 determined that the pixel values were the same; so no action was taken with regard to appending the RLE information list for column 3.

Figure 34:
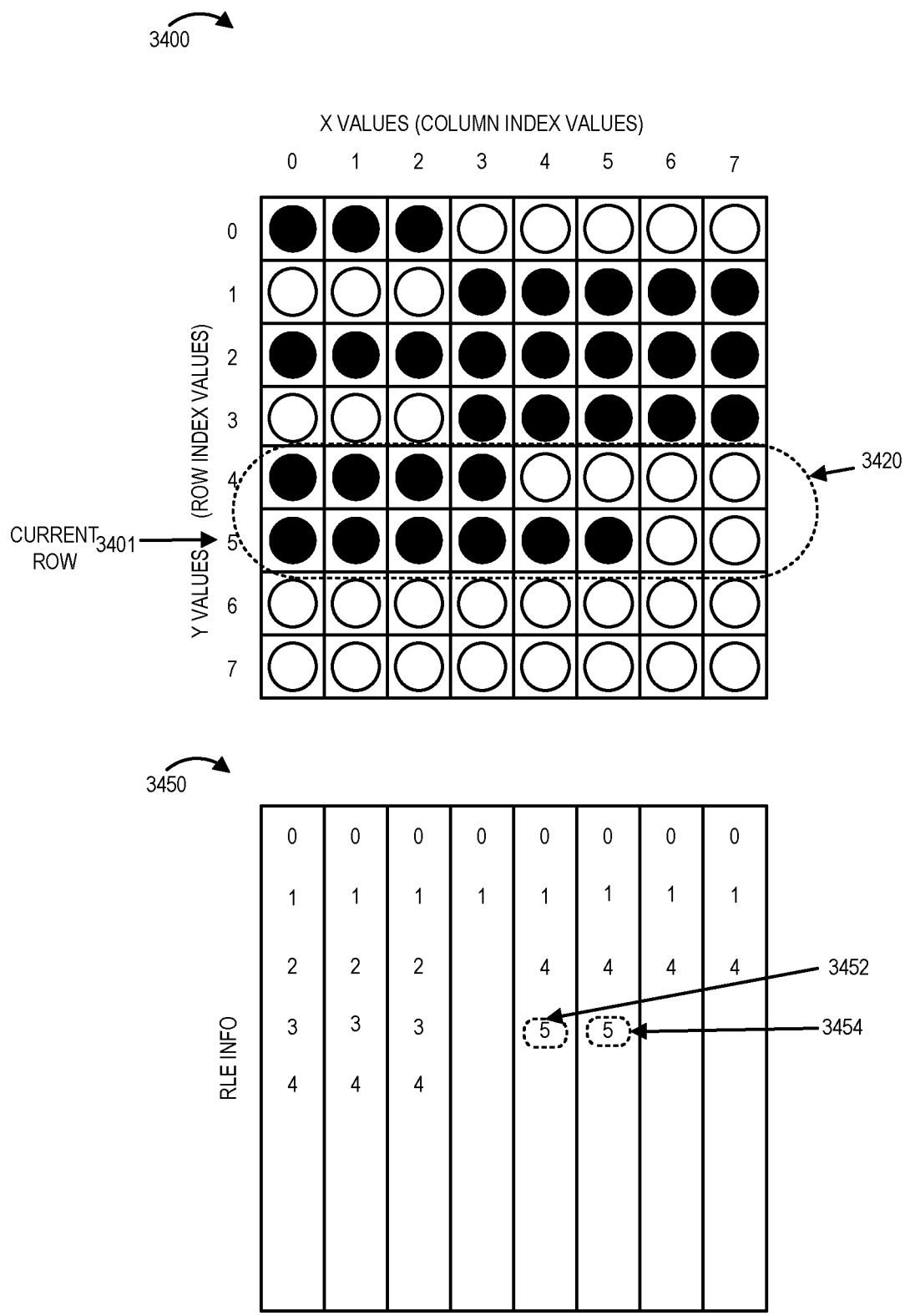
FIG. 34 includes an exemplary pixel image, memory access information, and a corresponding updated RLE information list in accordance with an exemplary embodiment.

FIG. 34 includes the exemplary 8×8 pixel image 3400, identifying memory accesses, and a corresponding updated RLE information list 3450. The current row is row with index number=5, as shown in 3401. While the exemplary method still processes things one pixel at a time, for the purpose of brevity, FIG. 34 shows one row worth of processing at once, i.e., processing for current row=5 which compares values in row 5 to values in row 4, as indicated by 3420. The accessing of memory and comparisons of values is performed in the same manner as previously described.

The comparisons for each of columns (4 and 5) determine that the pixel values being compared are different; so the current row index number, 5, is appended to the RLE information list for those columns (4 and 5), as indicated by (3452 and 3454). The comparisons for each of columns (0, 1, 2, 3, 6, and 7) determine that the pixel values were the same; so no action was taken with regard to appending the RLE information list for those columns (0, 1, 2, 3, 4, 6, and 7).

Figure 35:
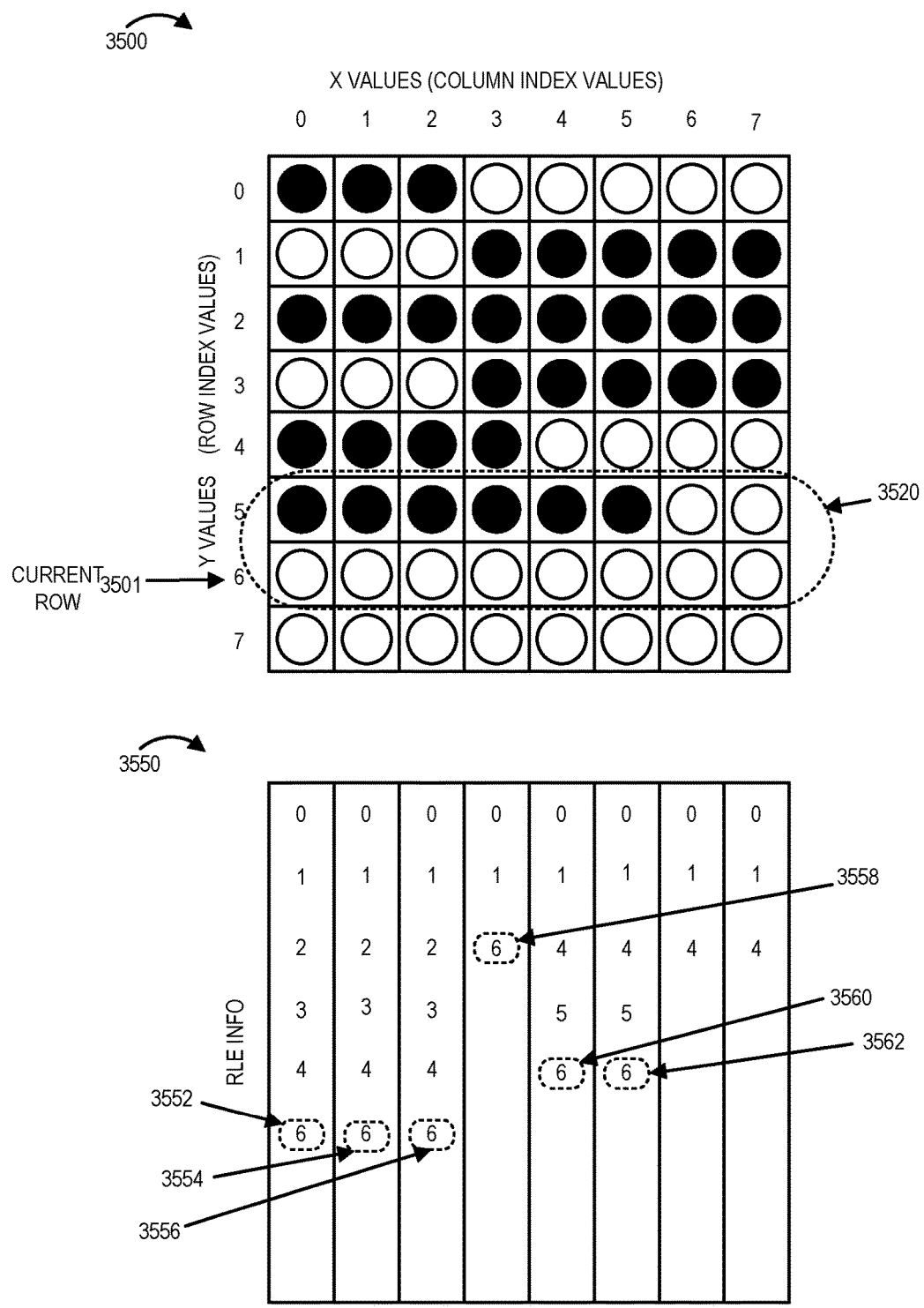
FIG. 35 includes an exemplary pixel image, memory access information, and a corresponding updated RLE information list in accordance with an exemplary embodiment.

FIG. 35 includes the exemplary 8×8 pixel image 3500, identifying memory accesses, and a corresponding updated RLE information list 3550. The current row is row with index number=6, as shown in 3501. While the exemplary method still processes things one pixel at a time, for the purpose of brevity, FIG. 35 shows one row worth of processing at once, i.e., processing for current row=6 which compares values in row 6 to values in row 5, as indicated by 3520. The accessing of memory and comparisons of values is performed in the same manner as previously described.

The comparisons for each of columns (0, 1, 2, 3, 4 and 5) determine that the pixel values being compared are different; so the current row index number, 6, is appended to the RLE information list for those columns (0, 1, 2, 3, 4, and 5), as indicated by (3552, 3554, 3556, 3558, 3560, 3562). The comparisons for each of columns (6, and 7) determine that the pixel values were the same; so no action was taken with regard to appending the RLE information list for those columns (6 and 7).

Figure 36:
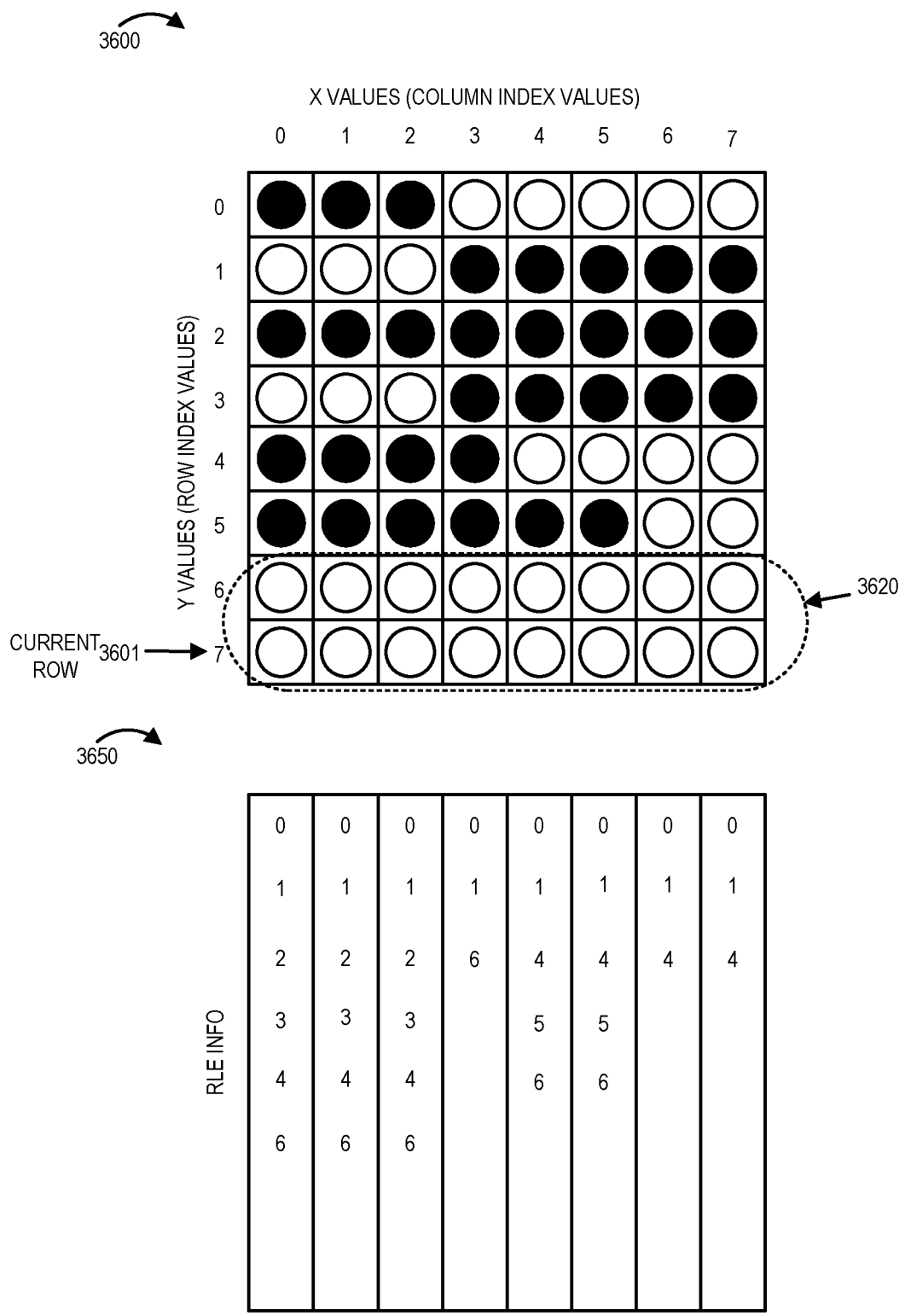
FIG. 36 includes an exemplary pixel image, memory access information, and a corresponding updated RLE information list in accordance with an exemplary embodiment.

FIG. 36 includes the exemplary 8×8 pixel image 3600, identifying memory accesses, and a corresponding updated RLE information list 3650. The current row is row with index number=7, as shown in 3601. While the exemplary method still processes things one pixel at a time, for the purpose of brevity, FIG. 36 shows one row worth of processing at once, i.e., processing for current row=7 which compares values in row 7 to values in row 6, as indicated by 3620. The accessing of memory and comparisons of values is performed in the same manner as previously described.

The comparisons for each of columns (0, 1, 2, 3, 4, 5, 6, and 7) determine that the pixel values were the same for each comparison; so no action was taken with regard to appending the RLE information list for those columns (0, 1, 2, 3, 4, 5, 6 and 7). Since no pixel values were different in the comparisons corresponding to current row=7, there is nothing to append to the RLE list. Thus, the row value=7 does not appear in the RLE list.

Figure 37:
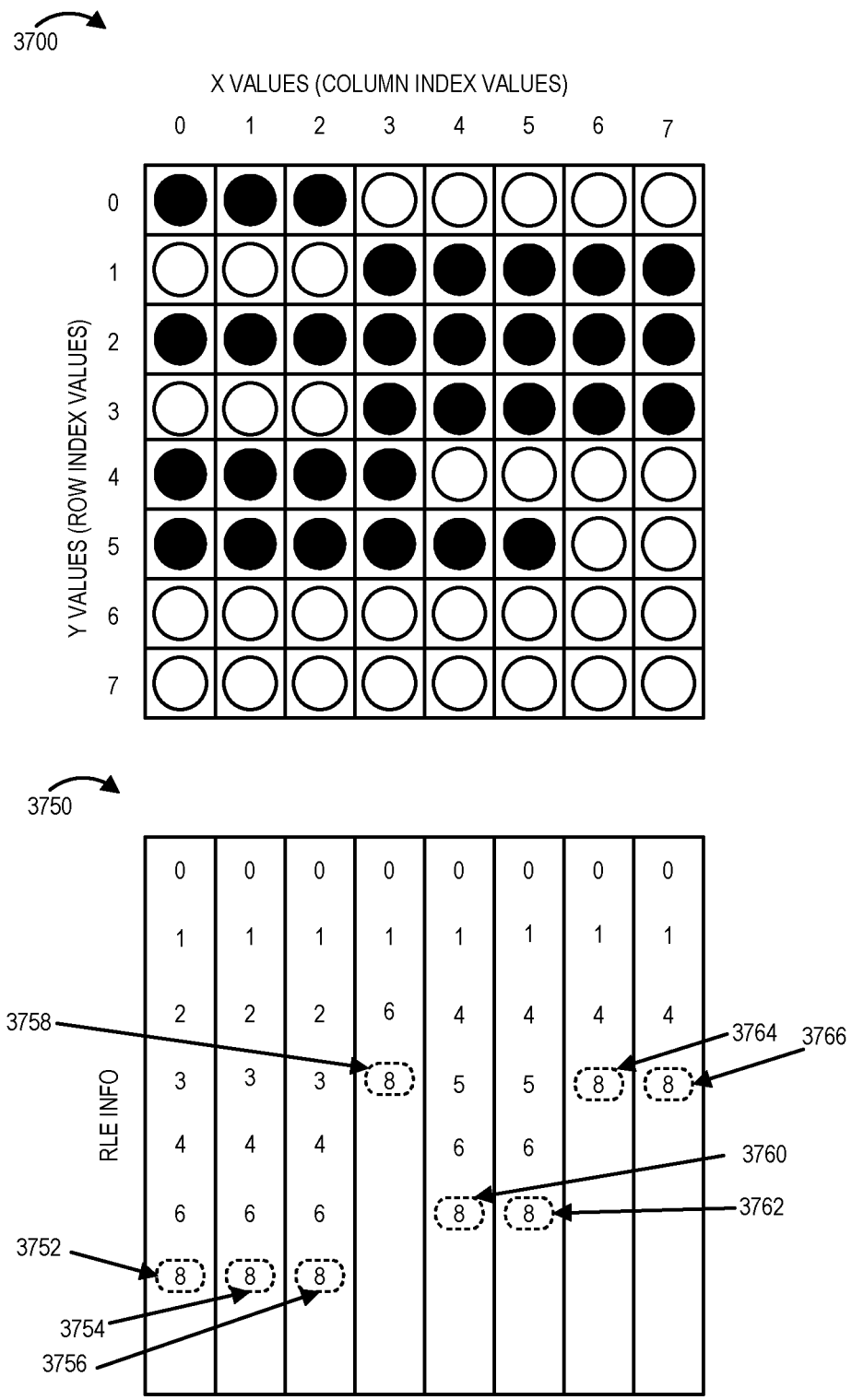
FIG. 37 includes an exemplary pixel image, and corresponding updated RLE information list in which each column of the RLE information list has been updated to include a final value, e.g., a value corresponding to the index number of the last row of the image plus 1.

FIG. 37 includes the exemplary 8×8 pixel image 3700, and a corresponding updated RLE information list 3750. At this point, each of the rows of the image have been processed. Each of the columns of the RLE info list are appended with appended value=index value of the last row+1. In this case, the appended value=7+1=8, as indicated by (3752, 3754, 3756, 3758, 3760, 3762, 3764, 3766).

Now that the RLE information list has been filled out, processing is performed to find the difference between each subsequent element (vertically) in each column of the list. FIG. 38 illustrates that filled out RLE information list 3802, which is the same as RLE information list 3750, is subjected to processing including difference calculations of each subsequent element (vertically) in each column of the list, as indicated by arrow 3804. For example, with regard to the run length information for the first column, column with index number=0, the following calculations are performed and results obtained: 8−6=2, as indicated by 3870; 6−4=2, as indicated by 3872; 4−3=1, as indicated by 3874; 3−2=1, as indicated by 3876; 2−1=1, as indicated by 3878; and 1−0=1, as indicated by 3880. Similar difference calculations are performed for each of the other columns (second column with column index number=1, third column with column index number=2, fourth column with column index number=3, fifth column with column index number=4, sixth column with column index number=5, seventh column with column index number=6, and eighth (last) column with column index number=7).

This processing results in a processed RLE information list 3806, which includes the run length information for each column of the exemplary image which was processed (3850, 3852, 3854, 3856, 3858, 3860, 3862, 3864). The obtained vertical run length information can be, and in various embodiments, is compared to vertical run length information corresponding to known image patterns, e.g., bar patterns or QR code patterns, to find a match.

Various aspects and/or features of some embodiments of the present inventions are further described below. An exemplary method in accordance with some embodiments of the present invention calculates run length image with a tradeoff of increased spatial locality at the cost of a minor amount of memory.

In some embodiments, variables include "BMP", "RLE", "X", "Y", and "I". "BMP" is Bitmap image structure including metadata, e.g., width, height, etc., and a pointer to image data in memory. This is the source image that is to be searched. "RLE" is an array of lists of integer values (RLE). "X", "Y" and "I" are integers.

An overview of an exemplary method, in accordance with some embodiments of the present invention will now be described. An array is kept of each column of the image area that includes the last y a vertical change of color (i.e. 1→0 or 0→1) occurred. Scanning horizontally across each row, the bitmap is processed in a horizontal fashion, the same way bitmap pixels are laid out in memory. By ensuring the bitmap-accesses are sequential, it is possible to vastly improve spatial locality of the memory accesses and cache performance is increased as compared to systems which compute vertical run lengths one column at a time without taking into consideration the effect that vertical access of binary image data results in non-sequential memory access of memory locations spaced far apart may have on performance. In accordance with a feature of various embodiments of the current invention, the order of bitmap accesses is such that the spatial locality of the code is vastly improved, and the cache performance increases greatly in comparison to a tradition approach.

Pseudocode corresponding to an exemplary method in accordance with some embodiments of the present invention will now be presented.

For every horizontal row (Y):
  For each vertical column (X):
    Perform a bitwise comparison of current row's pixel (the point (X, Y) against the previous row's pixel (X, Y−1)).
    If there is a difference:
      Add the current Y value to X-index list of RLE.
For every vertical column (X):
Let L be the X-index list of RLE
Let N be the number of elements in L
For every integer I in the range of N−1 to 1, decreasing:
Set L[I]=L[I]−L[I−1].

The techniques of various embodiments may be implemented using software, hardware and/or a combination of software and hardware. Various embodiments are directed to apparatus, e.g., an image processing device or system. Various embodiments are also directed to methods, e.g., a method of processing bi-level pixel values from a set of input pixel values corresponding to an image. Various embodiments are also directed to machine, e.g., computer, readable medium, e.g., ROM, RAM, CDs, hard discs, etc., which include machine readable instructions for controlling a machine to implement one or more steps of a method.

In various embodiments apparatus described herein are implemented using one or more modules to perform the steps corresponding to one or more methods. Thus, in some embodiments various features are implemented using modules. Such modules may be implemented using software, hardware or a combination of software and hardware. In some embodiments in which the modules are implemented in hardware, the modules are implemented as circuits, e.g., of a processor. In many or all of the above described embodiments, methods and/or method steps can, and in some embodiments are, implemented using computer executable instructions, such as software, included in a computer readable medium, e.g., a non-transitory computer readable medium, such as a memory device, e.g., RAM, floppy disk, etc. which when executed control a machine, e.g., general purpose computer or processor, with or without additional hardware, to implement all or portions of the above described methods. Accordingly, among other things, various embodiments are directed to a computer readable medium including computer executable instructions for causing a machine, e.g., processor or computer system, to perform one or more of the steps of the above-described method(s).

Some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., an image processing device or system. In some embodiments the image processing device is a portable device including a camera, e.g., a cell phone including a camera with a processor that implements the method.

In some embodiments modules are implemented using software, in other embodiments modules are implemented in hardware, in still other embodiments the modules are implemented using a combination of hardware and/or software.

Numerous additional variations on the methods and apparatus of the various embodiments described above will be apparent to those skilled in the art in view of the above description. Such variations are to be considered within the scope of the invention.

What is claimed is:

1. A method of processing image data, the method comprising:
    loading at least a portion of each of two horizontal rows of pixel values into memory, each horizontal row of pixel values including a plurality of N pixel values, each pixel value in a row corresponding to one of N different columns of pixel values;
    designating a second row of pixel values to be a current set of pixel values;
    comparing a pixel value of the first column of the current row of pixel values to a pixel value of the first column of the immediately preceding row of pixel value to determine if the pixel value of the first column of the current row is different from the pixel value of the first column of the immediately preceding row;
    if it is determined that the pixel value of the first column of the current row of pixel values is different from the pixel value of the first column of the immediately preceding row, updating a set of detected pixel value change location information indicating, for the first column, that a change in pixel values was detected in the first column at the current row;
    comparing a pixel value of the second column of the current row of pixel values to a pixel value of the second column of the immediately preceding row of pixel value to determine if the pixel value of the second column of the current row is different from the pixel value of the second column of the immediately preceding row;
    if it is determined that the pixel value of the second column of the current row of pixel values is different from the pixel value of the second column of the immediately preceding row, updating a set of detected pixel value change location information indicating, for the second column, that a change in pixel values was detected in the second column at the current row; and
    generating vertical pixel value run length information for the first column of pixel values from the set of detected pixel value change location information corresponding to the first column,
        wherein the vertical pixel value run length information includes information indicating the number of consecutive rows a pixel value remains unchanged in the vertical column of pixel values to which the vertical pixel run length information corresponds; and
        wherein generating the vertical pixel value run length information includes subtracting a number of a preceding row in which a change was detected from a number of a row in which a change was detected, said difference indicating the number of rows for which the pixel value remained unchanged.

2. The method of claim 1, further comprising:
    generating vertical pixel value run length information for the second column of pixel values from the set of detected pixel value change location information corresponding to the second column.

3. The method of claim 2, wherein comparing a pixel value of the last column of a current row of pixel values to a pixel value of the last column of the immediately preceding row of pixel values is performed prior to processing the next row of pixel values to determine if it includes pixel values with different values from the preceding row of pixel values.

4. The method of claim 2, further comprising:
    updating the current row of pixel values to be the next row of pixel values; and
    performing the steps of:
    comparing a pixel value of the first column of the current row of pixel values to a pixel value of the first column of the immediately preceding row of pixel value to determine if the pixel value of the first column of the current row is different from the pixel value of the first column of the immediately preceding row; and
    if it is determined that the pixel value of the first column of the current row of pixel values is different from the pixel value of the first column of the immediately preceding row, updating a set of detected pixel value change location information indicating, for the first column, that a change in pixel values was detected in the first column at the current row.

5. The method of claim 4, further comprising:
    comparing a pixel value of the second column of the current row of pixel values to a pixel value of the second column of the immediately preceding row of pixel values to determine if the pixel value of the second column of the current row is different from the pixel value of the second column of the immediately preceding row;
    if it is determined that the pixel value of the second column of the current row of pixel values is different from the pixel value of the second column of the immediately preceding row, updating the set of detected pixel value change location information indicating, for the second column, that a change in pixel values was detected in the second column at the current row;
    comparing a pixel value of the last column of the current row of pixel values to a pixel value of the last column of the immediately preceding row of pixel values to determine if the pixel value of the last column of the current row is different from the pixel value of the last column of the immediately preceding row; and if it is determined that the pixel value of the last column of the current row of pixel values is different from the pixel value of the last column of the immediately preceding row, updating a set of detected pixel value change location information indicating, for the last column, that a change in pixel values was detected in the last column at the current row.

6. The method of claim 1, further comprising:
comparing a pixel value of the last column of the current row of pixel values to a pixel value of the last column of the immediately preceding row of pixel values to determine if the pixel value of the last column of the current row is different from the pixel value of the last column of the immediately preceding row; and
if it is determined that the pixel value of the last column of the current row is different from the pixel value of the last column of the immediately preceding row, updating a set of detected pixel value change location information indicating, for the last column, that a change in pixel values was detected in the last column at the current row.

7. The method of claim 1, further comprising:
comparing the vertical pixel value run length information to vertical run length information corresponding to one or more known image patterns; and
identifying an image pattern which matches the image based on a match between the vertical pixel value run length information and vertical run length information corresponding to one of the one or more known image patterns.

8. The method of claim 7, wherein the image pattern is one of a bar pattern and a QR code.

9. A method of processing image data, the method comprising:
loading at least a portion of each of two horizontal rows of pixel values into memory, each horizontal row of pixel values including a plurality of N pixel values, each pixel value in a row corresponding to one of N different columns of pixel values;
designating a second row of pixel values to be a current set of pixel values;
comparing a pixel value of the first column of the current row of pixel values to a pixel value of the first column of the immediately preceding row of pixel value to determine if the pixel value of the first column of the current row is different from the pixel value of the first column of the immediately preceding row;
if it is determined that the pixel value of the first column of the current row of pixel values is different from the pixel value of the first column of the immediately preceding row, updating a set of detected pixel value change location information indicating, for the first column, that a change in pixel values was detected in the first column at the current row;
comparing a pixel value of the second column of the current row of pixel values to a pixel value of the second column of the immediately preceding row of pixel value to determine if the pixel value of the second column of the current row is different from the pixel value of the second column of the immediately preceding row;
if it is determined that the pixel value of the second column of the current row of pixel values is different from the pixel value of the second column of the immediately preceding row, updating a set of detected pixel value change location information indicating, for the second column, that a change in pixel values was detected in the second column at the current row;
updating the current row of pixel values to be the next row of pixel values;
comparing a pixel value of the first column of the current row of pixel values to a pixel value of the first column of the immediately preceding row of pixel value to determine if the pixel value of the first column of the current row is different from the pixel value of the first column of the immediately preceding row; and
if it is determined that the pixel value of the first column of the current row of pixel values is different from the pixel value of the first column of the immediately preceding row, updating a set of detected pixel value change location information indicating, for the first column, that a change in pixel values was detected in the first column at the current row;
comparing a pixel value of the second column of the current row of pixel values to a pixel value of the second column of the immediately preceding row of pixel values to determine if the pixel value of the second column of the current row is different from the pixel value of the second column of the immediately preceding row;
if it is determined that the pixel value of the second column of the current row of pixel values is different from the pixel value of the second column of the immediately preceding row, updating the set of detected pixel value change location information indicating, for the second column, that a change in pixel values was detected in the second column at the current row;
comparing a pixel value of the last column of the current row of pixel values to a pixel value of the last column of the immediately preceding row of pixel values to determine if the pixel value of the last column of the current row is different from the pixel value of the last column of the immediately preceding row; and
if it is determined that the pixel value of the last column of the current row of pixel values is different from the pixel value of the last column of the immediately preceding row, updating a set of detected pixel value change location information indicating, for the last column, that a change in pixel values was detected in the last column at the current row; and
wherein said memory into which the at least a portion of each of two horizontal rows of pixel values is loaded is a cache memory, the method further comprising:
replacing, in said memory, at least a portion of the pixel values corresponding to said at least a portion of each of two horizontal rows of pixel values with pixel values corresponding to a different row of said image prior to processing a last row of pixel values of said image;
generating vertical pixel value run length information for the first column of pixel values from the set of detected pixel value change location information corresponding to the first column; and
generating vertical pixel value run length information for the second column of pixel values from the set of detected pixel value change location information corresponding to the second column.

10. The method of claim 9, where said cache memory is not large enough to store all of the pixel values of said image at the same time.

11. An image processing device comprising:
a memory loading module configured to load at least a portion of each of two horizontal rows of pixel values into memory, each horizontal row of pixel values including a plurality of N pixel values, each pixel value in a row corresponding to one of N different columns of pixel values;

a current row designation module configured to designate a second row of pixel values to be a current set of pixel values;

a pixel value comparison module configured to compare a pixel value of the first column of the current row of pixel values to a pixel value of the first column of the immediately preceding row of pixel value to determine if the pixel value of the first column of the current row is different from the pixel value of the first column of the immediately preceding row;

a change location updating module configured to update a set of detected pixel value change location information indicating, for the first column, that a change in pixel values was detected in the first column at the current row, if it is determined that the pixel value of the first column of the current row of pixel values is different from the pixel value of the first column of the immediately preceding row;

wherein said pixel value comparison module is further configured to compare a pixel value of the second column of the current row of pixel values to a pixel value of the second column of the immediately preceding row of pixel values to determine if the pixel value of the second column of the current row is different from the pixel value of the second column of the immediately preceding row; and wherein said change location updating module is further configured update a set of detected pixel value change location information indicating, for the second column, that a change in pixel values was detected in the second column at the current row, if it is determined that the pixel value of the second column of the current row of pixel values is different from the pixel value of the second column of the immediately preceding row;

wherein said memory into which the at least two horizontal rows of pixel values is loaded is a cache memory, the image processing device further comprising:

a cache updating module configured to replace, in said memory, at least a portion of the pixel values corresponding to said at least a portion of each of two horizontal rows of pixel values with pixel values corresponding to a different row of said image prior to processing a last row of pixel values of said image; and a vertical pixel value run length information generation module configured to generate vertical pixel value run length information for the first column of pixel values from the set of detected pixel value change location information corresponding to the first column.

12. The image processing device of claim 11, wherein said vertical pixel value run length information generation module includes a subtraction module configured to subtract a number of a preceding row in which a change was detected from a number of a row in which a change was detected, said difference indicating the number of rows for which the pixel value remained unchanged.

13. The image processing device of claim 12, further comprising:

a run length information comparison module configured to compare the vertical pixel value run length information to vertical run length information corresponding to one or more known image patterns; and an image pattern identification module configured to identify an image pattern which matches the image based on a match between the vertical pixel value run length information and vertical run length information corresponding to one of the one or more known image patterns.

14. A computer program product for use in a computer, the computer program product comprising:

a non-transitory computer readable medium comprising:

code for causing said computer to load at least a portion of each of two horizontal rows of pixel values into memory, each horizontal row of pixel values including a plurality of N pixel values, each pixel value in a row corresponding to one of N different columns of pixel values;

code for causing said computer to designate a second row of pixel values to be a current set of pixel values;

code for causing said computer to compare a pixel value of the first column of the current row of pixel values to a pixel value of the first column of the immediately preceding row of pixel value to determine if the pixel value of the first column of the current row is different from the pixel value of the first column of the immediately preceding row;

code for causing said computer to update a set of detected pixel value change location information indicating, for the first column, that a change in pixel values was detected in the first column at the current row, if it is determined that the pixel value of the first column of the current row of pixel values is different from the pixel value of the first column of the immediately preceding row;

code for causing said computer to compare a pixel value of the second column of the current row of pixel values to a pixel value of the second column of the immediately preceding row of pixel value to determine if the pixel value of the second column of the current row is different from the pixel value of the second column of the immediately preceding row; and code for causing said computer to update a set of detected pixel value change location information indicating, for the second column, that a change in pixel values was detected in the second column at the current row, if it is determined that the pixel value of the second column of the current row of pixel values is different from the pixel value of the second column of the immediately preceding row;

code for causing said computer to generate vertical pixel value run length information for the first column of pixel values from the set of detected pixel value change location information corresponding to the first column, wherein the vertical pixel value run length information includes information indicating the number of consecutive rows a pixel value remains unchanged in the vertical column of pixel values to which the vertical pixel run length information corresponds; and wherein said code for causing said computer to generate the vertical pixel value run length information includes code for causing said computer to subtract a number of a preceding row in which a change was detected from a number of a row in which a change was detected, said difference indicating the number of rows for which the pixel value remained unchanged.

15. An image processing device comprising:
at least one processor configured to:
- load at least a portion of each of two horizontal rows of pixel values into memory, each horizontal row of pixel values including a plurality of N pixel values, each pixel value in a row corresponding to one of N different columns of pixel values;
- designate a second row of pixel values to be a current set of pixel values;
- compare a pixel value of the first column of the current row of pixel values to a pixel value of the first column of the immediately preceding row of pixel value to determine if the pixel value of the first column of the current row is different from the pixel value of the first column of the immediately preceding row;
- if it is determined that the pixel value of the first column of the current row of pixel values is different from the pixel value of the first column of the immediately preceding row, update a set of detected pixel value change location information indicating, for the first column, that a change in pixel values was detected in the first column at the current row;
- compare a pixel value of the second column of the current row of pixel values to a pixel value of the second column of the immediately preceding row of pixel values to determine if the pixel value of the second column of the current row is different from the pixel value of the second column of the immediately preceding row;
- if it is determined that the pixel value of the second column of the current row of pixel values is different from the pixel value of the second column of the immediately preceding row, update a set of detected pixel value change location information indicating, for the second column, that a change in pixel values was detected in the second column at the current row;
- generate vertical pixel value run length information for the first column of pixel values from the set of detected pixel value change location information corresponding to the first column,
- wherein the vertical pixel value run length information includes information indicating the number of consecutive rows a pixel value remains unchanged in the vertical column of pixel values to which the vertical pixel run length information corresponds; and
wherein said at least one processor is further configured to:
- subtract a number of a preceding row in which a change was detected from a number of a row in which a change was detected, as part of being configured to generate the vertical pixel value run length information, said difference indicating the number of rows for which the pixel value remained unchanged; and
memory coupled to said at least one processor.

* * * * *